(12) United States Patent
Simon

(10) Patent No.: US 6,536,921 B1
(45) Date of Patent: *Mar. 25, 2003

(54) ARCHITECTURAL LIGHTING DISTRIBUTED FROM CONTAINED RADIALLY COLLIMATED LIGHT AND COMPACT EFFICIENT LUMINAIRES

(76) Inventor: Jerome H. Simon, 70 Sumner St., Newton Centre, MA (US) 02159

( * ) Notice: Subject to any disclaimer, the term of this patent is extended or adjusted under 35 U.S.C. 154(b) by 0 days.

This patent is subject to a terminal disclaimer.

(21) Appl. No.: 09/520,272

(22) Filed: Mar. 7, 2000

Related U.S. Application Data

(63) Continuation of application No. PCT/US98/18419, filed on Sep. 3, 1998, which is a continuation-in-part of application No. 08/201,466, filed on Feb. 25, 1994, now Pat. No. 5,897,201, which is a continuation-in-part of application No. 08/006,623, filed on Jan. 21, 1993, now abandoned.

(60) Provisional application No. 60/058,195, filed on Sep. 8, 1997.

(51) Int. Cl.$^7$ .............................. F21V 13/04; F21V 17/02
(52) U.S. Cl. ........................ 362/277; 362/302; 362/304; 362/308; 362/268; 362/294
(58) Field of Search ................................ 362/187, 188, 362/268, 277, 281, 283, 217, 218, 294, 285, 297, 346, 453, 456, 308, 302, 304

(56) References Cited

U.S. PATENT DOCUMENTS

| | | | |
|---|---|---|---|
| 1,377,184 A | | 5/1921 | Comstock .................. 362/299 |
| 2,344,221 A | * | 3/1944 | Trautner ..................... 362/309 |
| 2,867,716 A | * | 1/1959 | Ream ......................... 362/281 |
| 3,739,169 A | * | 6/1973 | Weinreich .................. 362/542 |
| 3,786,248 A | | 1/1974 | Compton .................... 362/296 |
| 4,111,564 A | * | 9/1978 | Trice, Jr. .................... 356/247 |
| 4,159,511 A | * | 6/1979 | Dejonc ....................... 362/309 |
| 4,263,641 A | | 4/1981 | Ferro ........................... 362/293 |
| 4,388,674 A | * | 6/1983 | Sano ........................... 362/187 |
| 4,575,786 A | * | 3/1986 | Roberts ...................... 362/281 |
| 4,817,163 A | * | 3/1989 | Stastny ....................... 362/281 |
| 4,933,813 A | * | 6/1990 | Berger ........................ 362/268 |
| 5,128,848 A | | 7/1992 | Enders et al. ............... 362/268 |
| 5,258,896 A | | 11/1993 | Dreyer ........................ 362/307 |
| 5,299,101 A | | 3/1994 | Serizawa .................... 362/510 |
| 5,574,328 A | | 11/1996 | Okuchi ....................... 313/114 |
| 5,581,347 A | | 12/1996 | Le Saux et al. ............ 356/124 |
| 5,765,934 A | | 6/1998 | Okamori et al. ............. 353/94 |
| 5,808,759 A | | 9/1998 | Okamori et al. ............. 359/15 |
| 5,897,201 A | * | 4/1999 | Simon ........................ 362/268 |

* cited by examiner

Primary Examiner—Alan Cariaso
(74) Attorney, Agent, or Firm—Perkins, Smith & Cohen; Jerry Cohen; Harvey Kaye

(57) ABSTRACT

From a quasi point source, light distribution means produce a selected one or ones of broadly distributed ambient light, non-shadowing task illumination, multi-beam display lighting, projective lineal lighting and projective surface washing illumination lineally or radially distributed. Collimation optics shape light from a quasi point source into a disc of selected axial thickness. Containment optics contain divergence of and direct light from the collimation optics to distribution optics. The distribution optics modulates and redirects the radiant energy into a shape or shapes useful in illuminating architectural space. The distribution optics may reflect or refract light to direct and shape it for a particular architectural illumination requirement. The efficient combination of the optics provides for a system of minimized thickness, permitting maximum flexibility in integration with or within shelves, soffits and other structural members. Collimating means may surround the light source and one or more light direction changing means provided to redirect the light into desired directions and patterns. There can be two reflector, and the light source can be movable with respect to one of the reflectors whereby the amount of upward and downward lighting can be continuously varied. Options are available for having the light directed all in one direction and for using refractors in lieu of reflectors in selected arrangements.

45 Claims, 37 Drawing Sheets

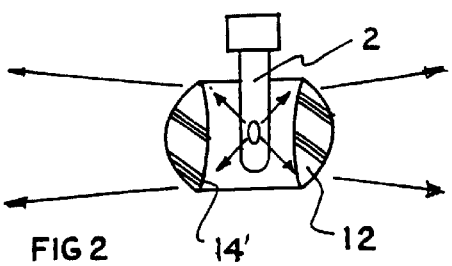
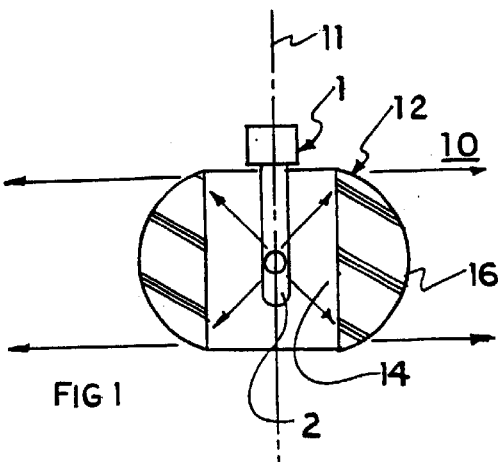
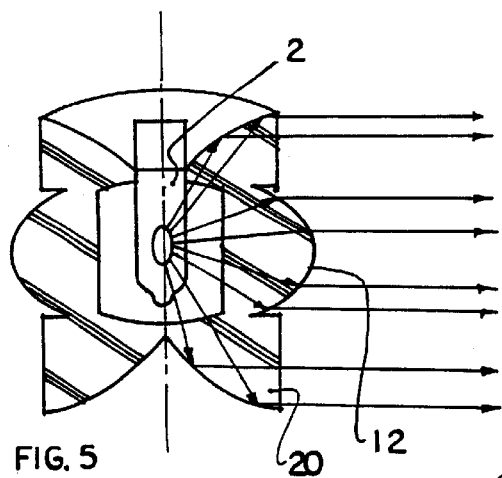
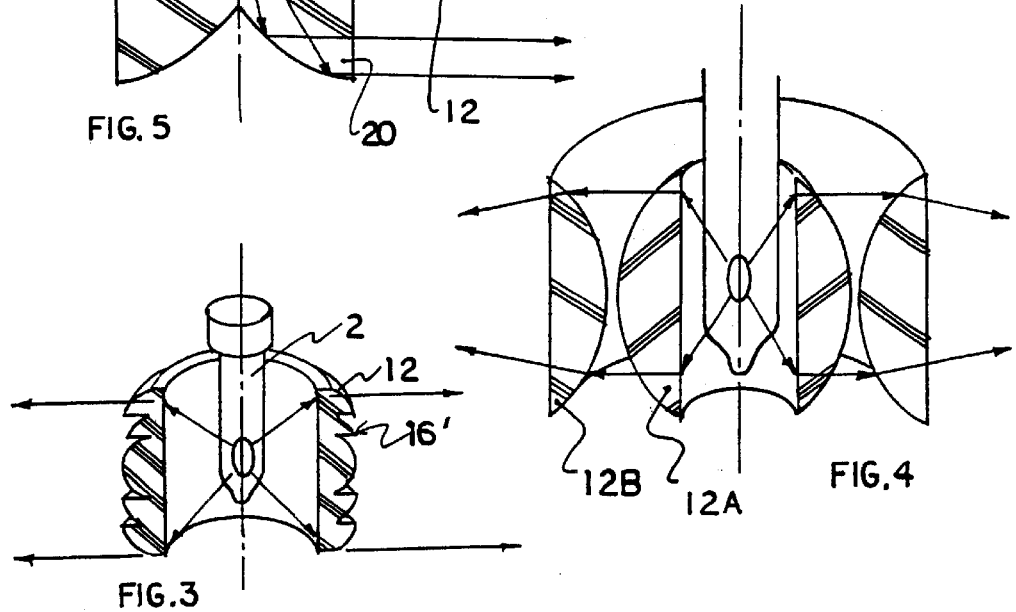

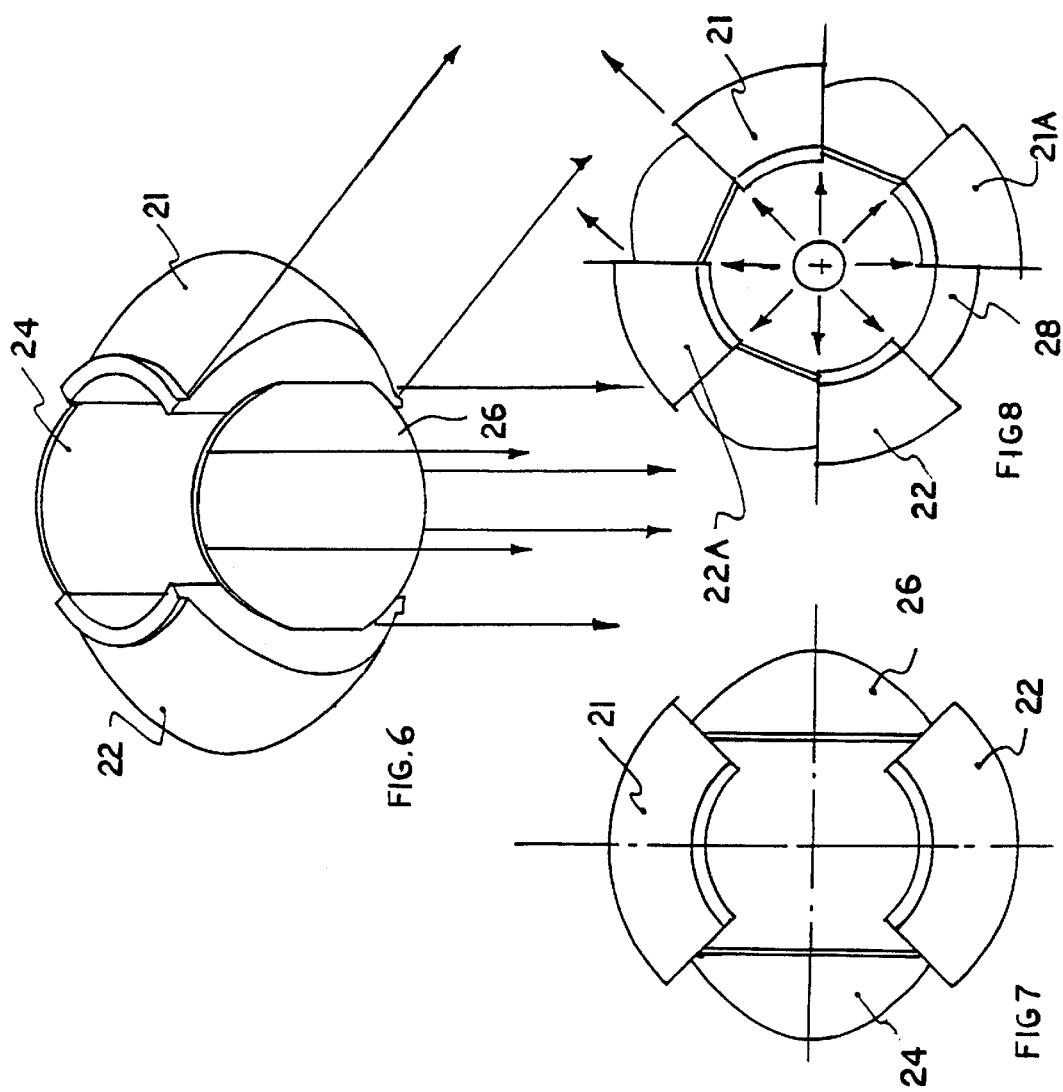

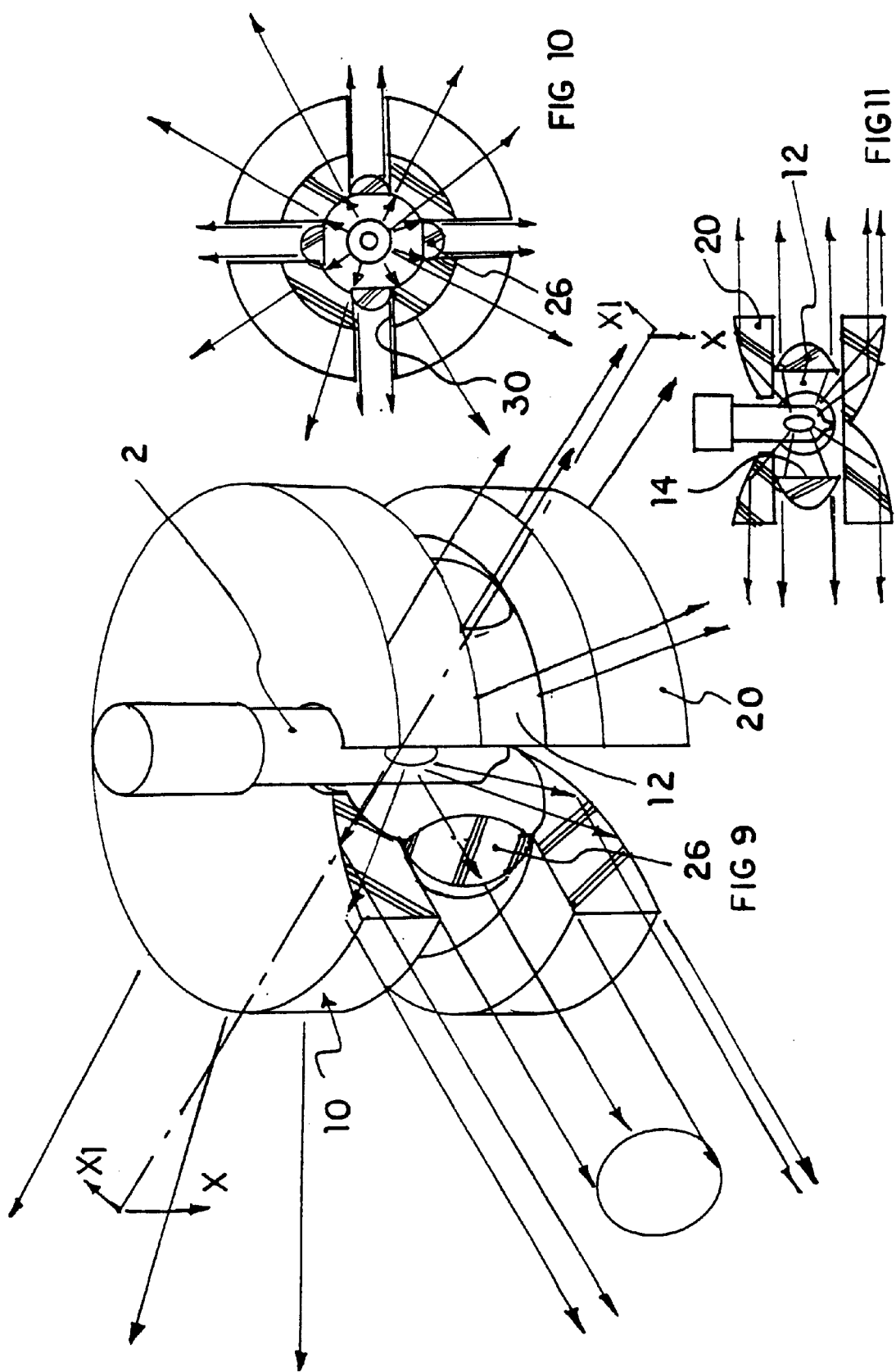

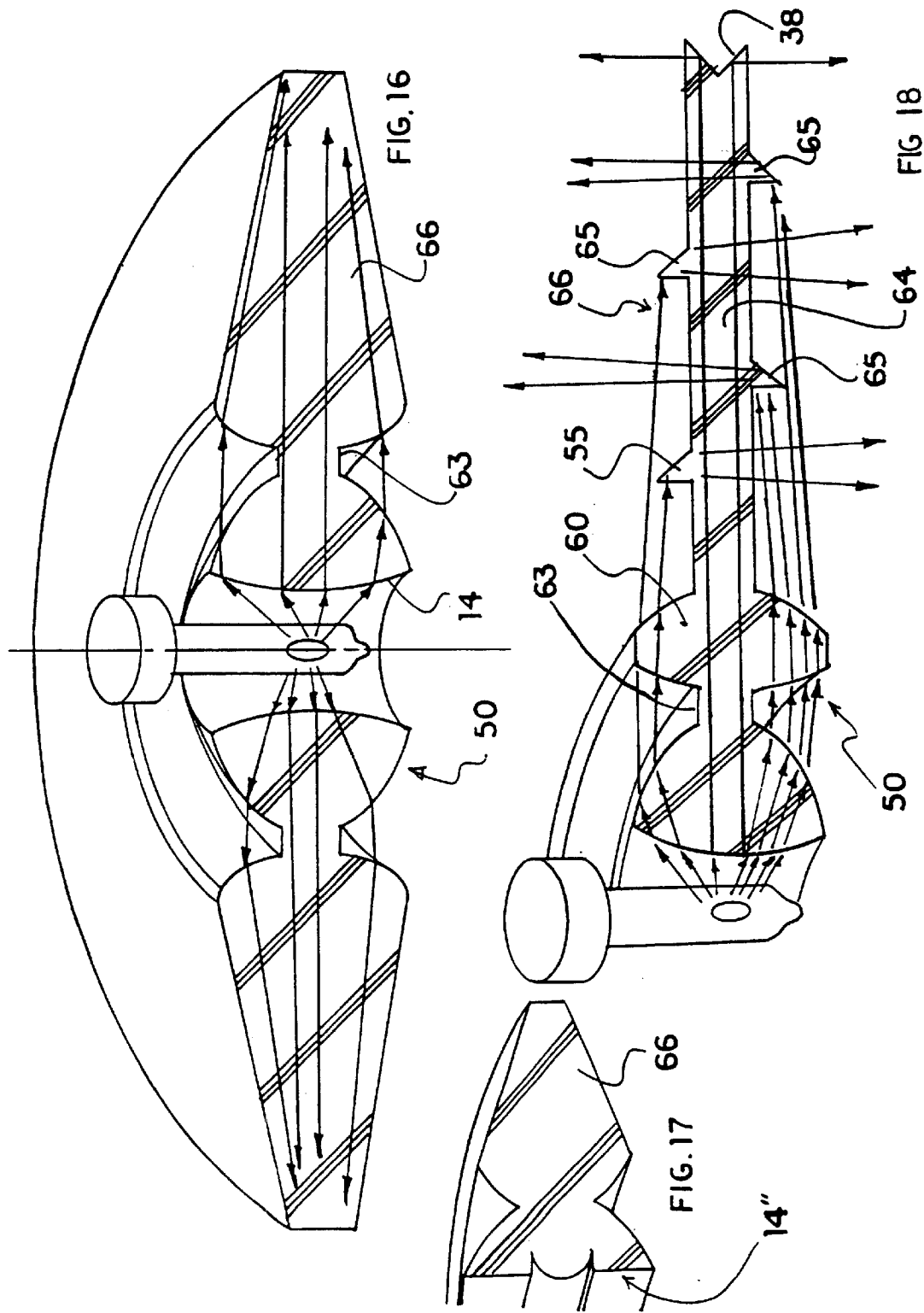

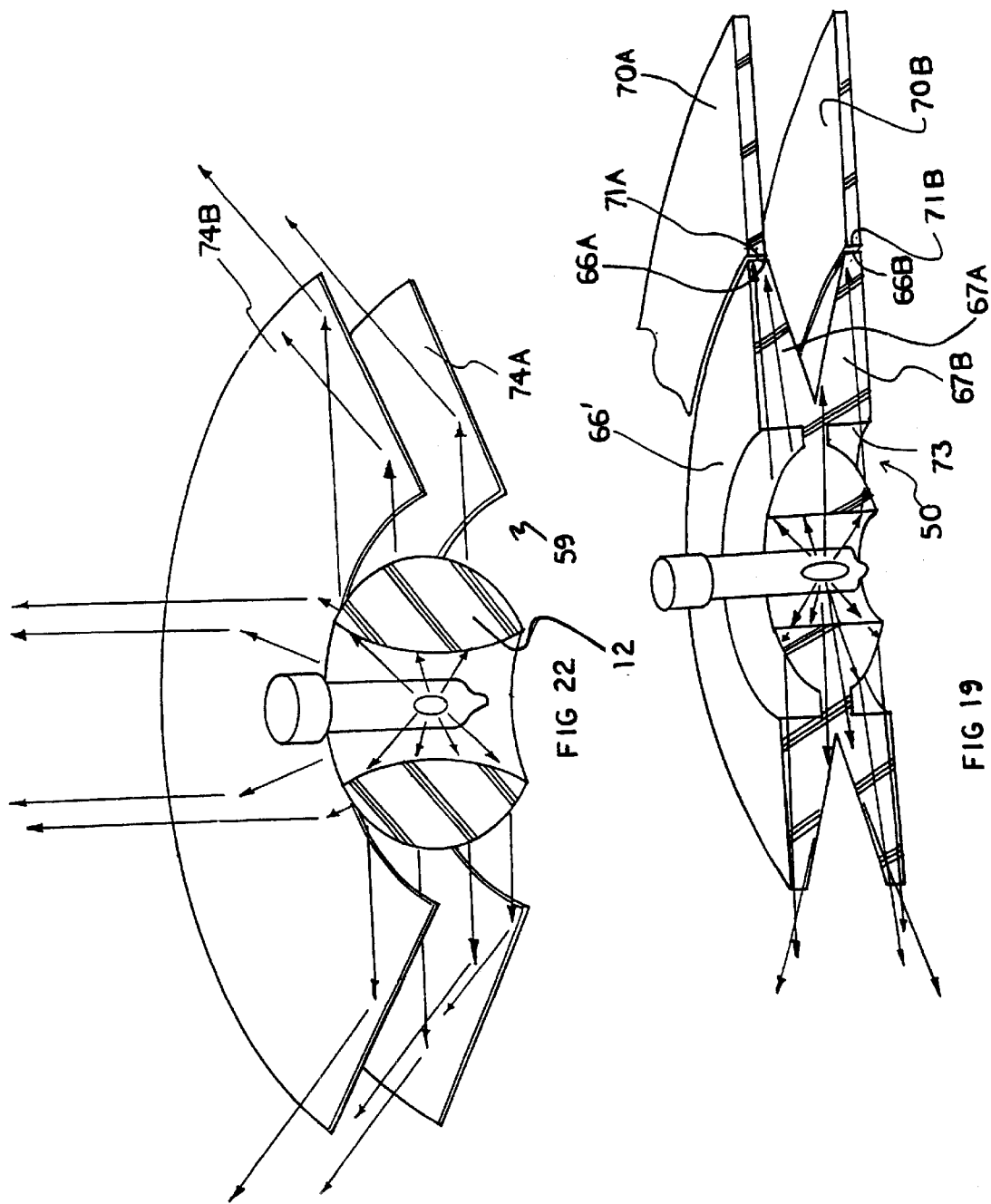

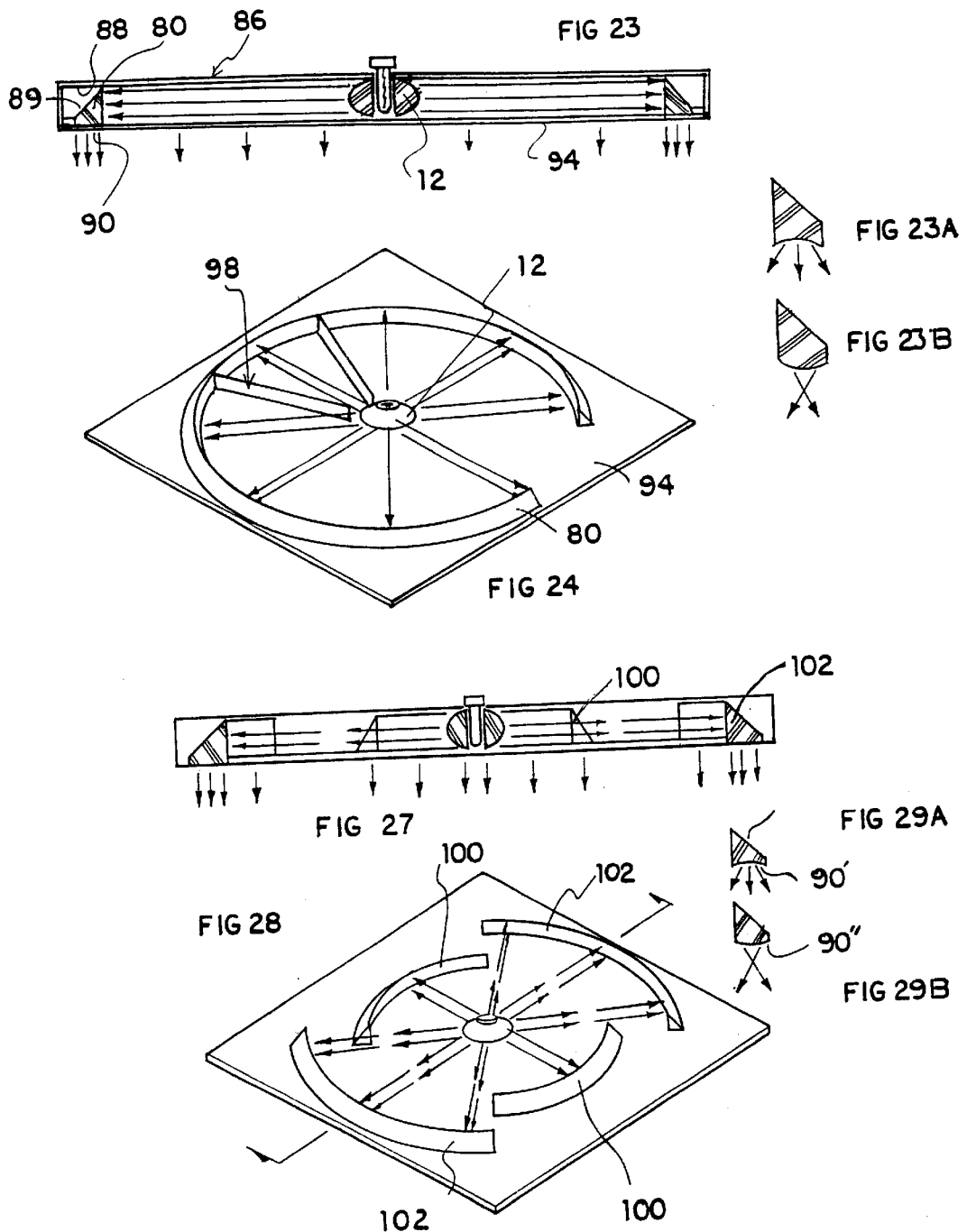

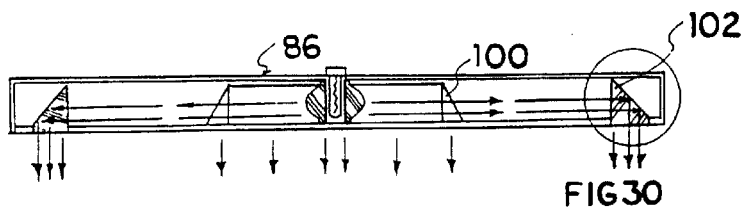
FIG 30
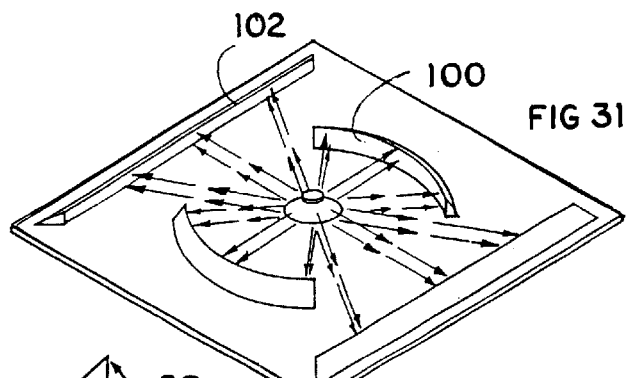
FIG 31
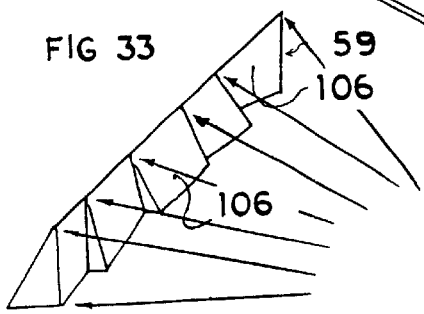
FIG 33
FIG 34
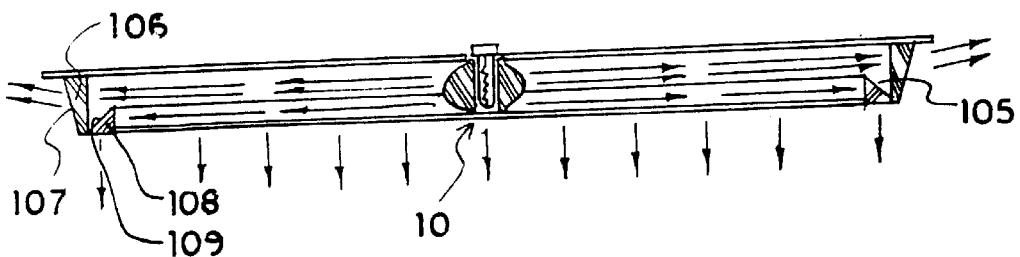
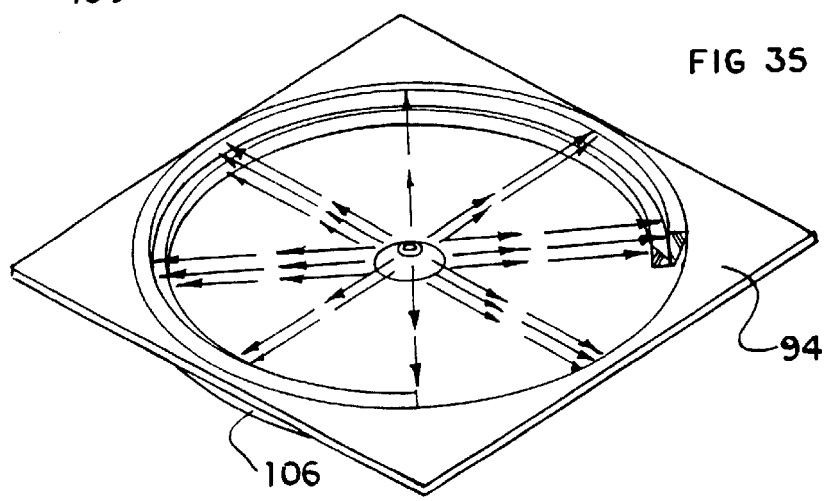
FIG 35

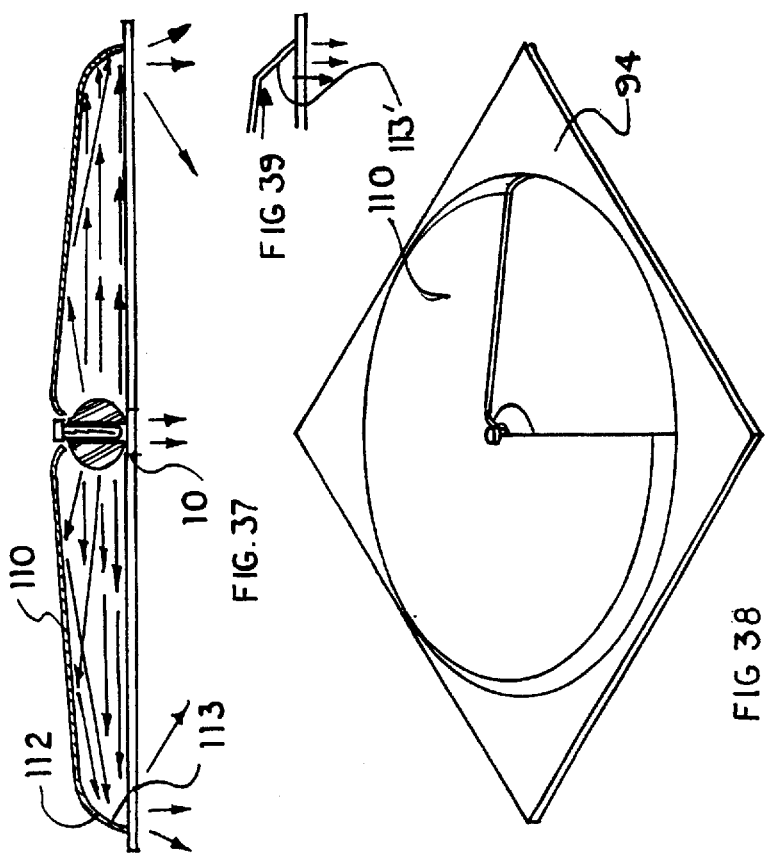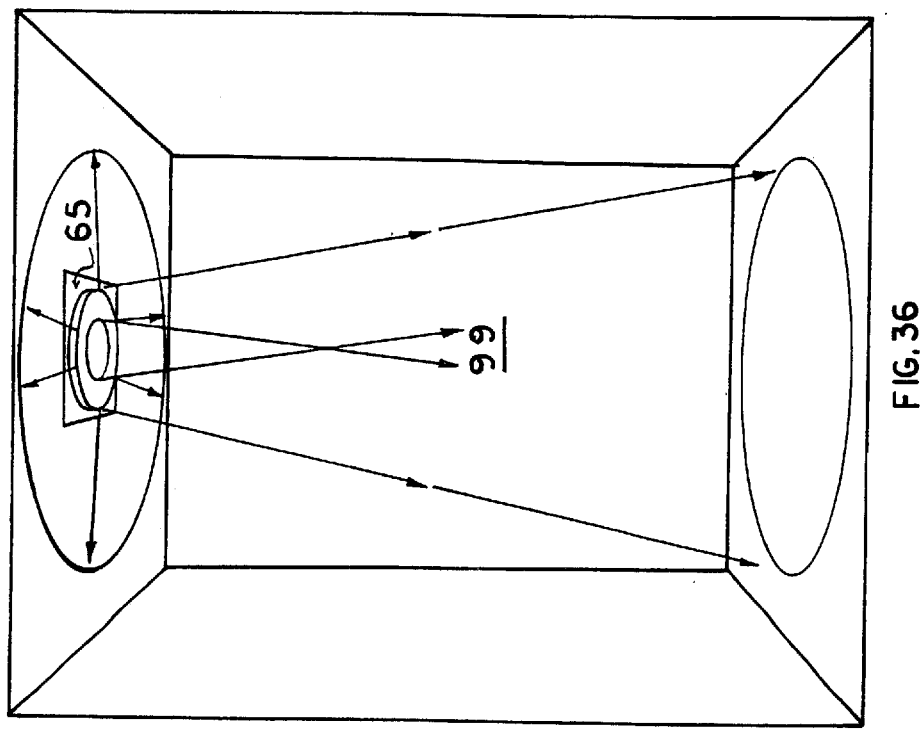

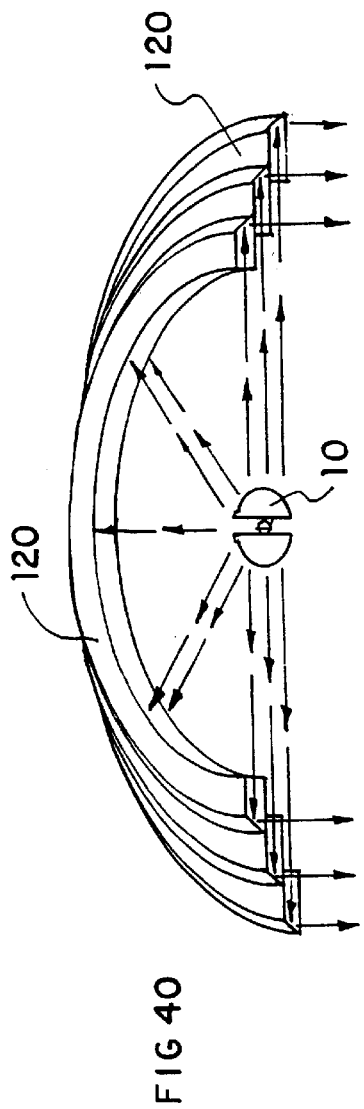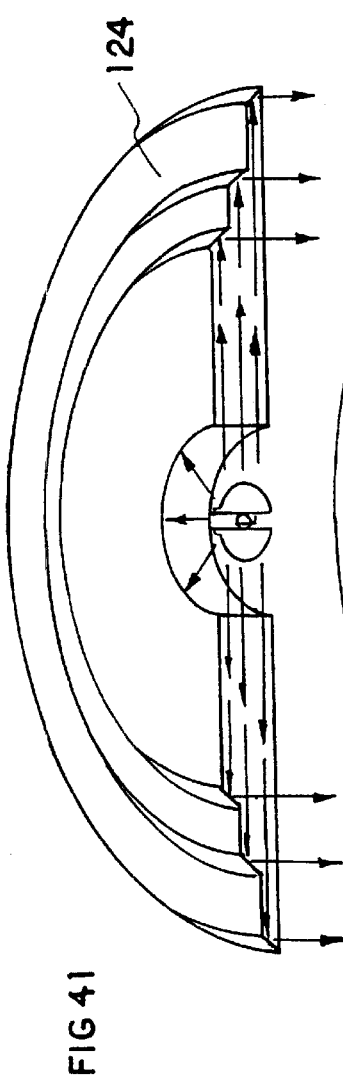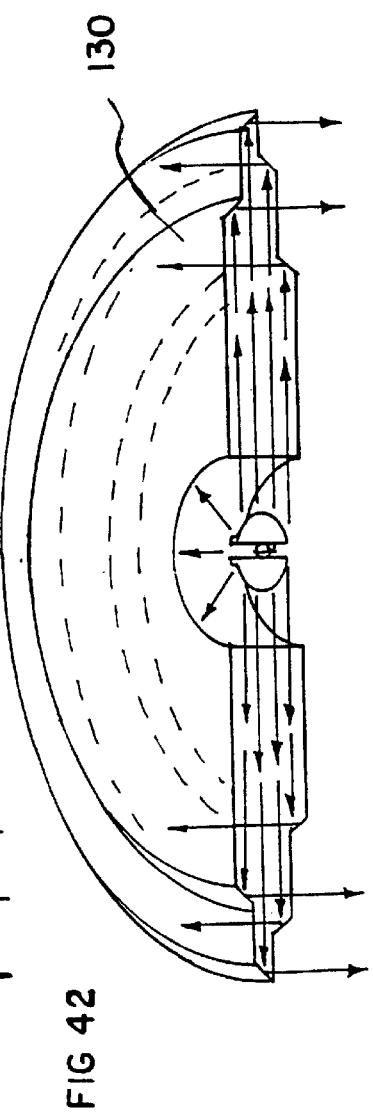

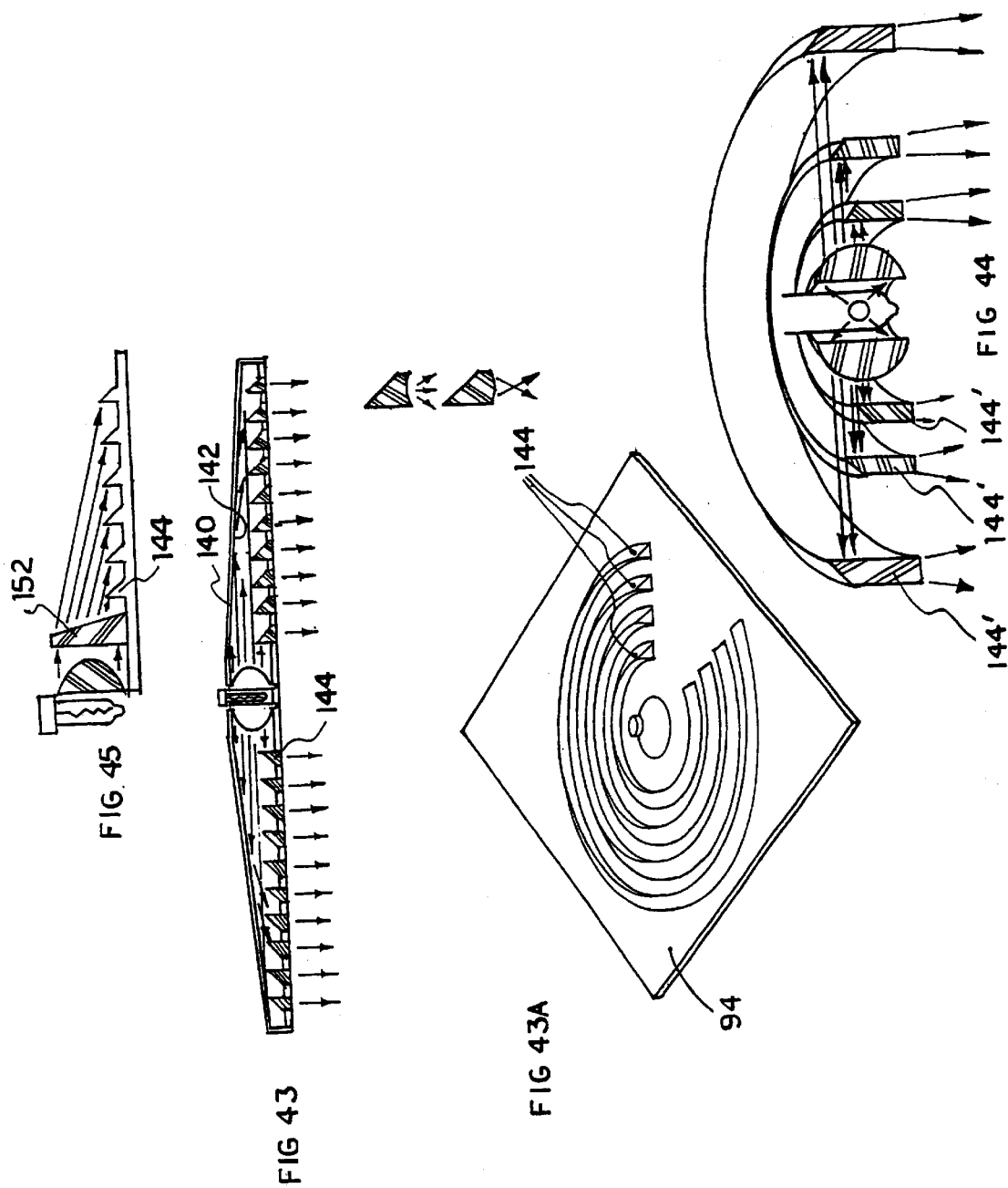

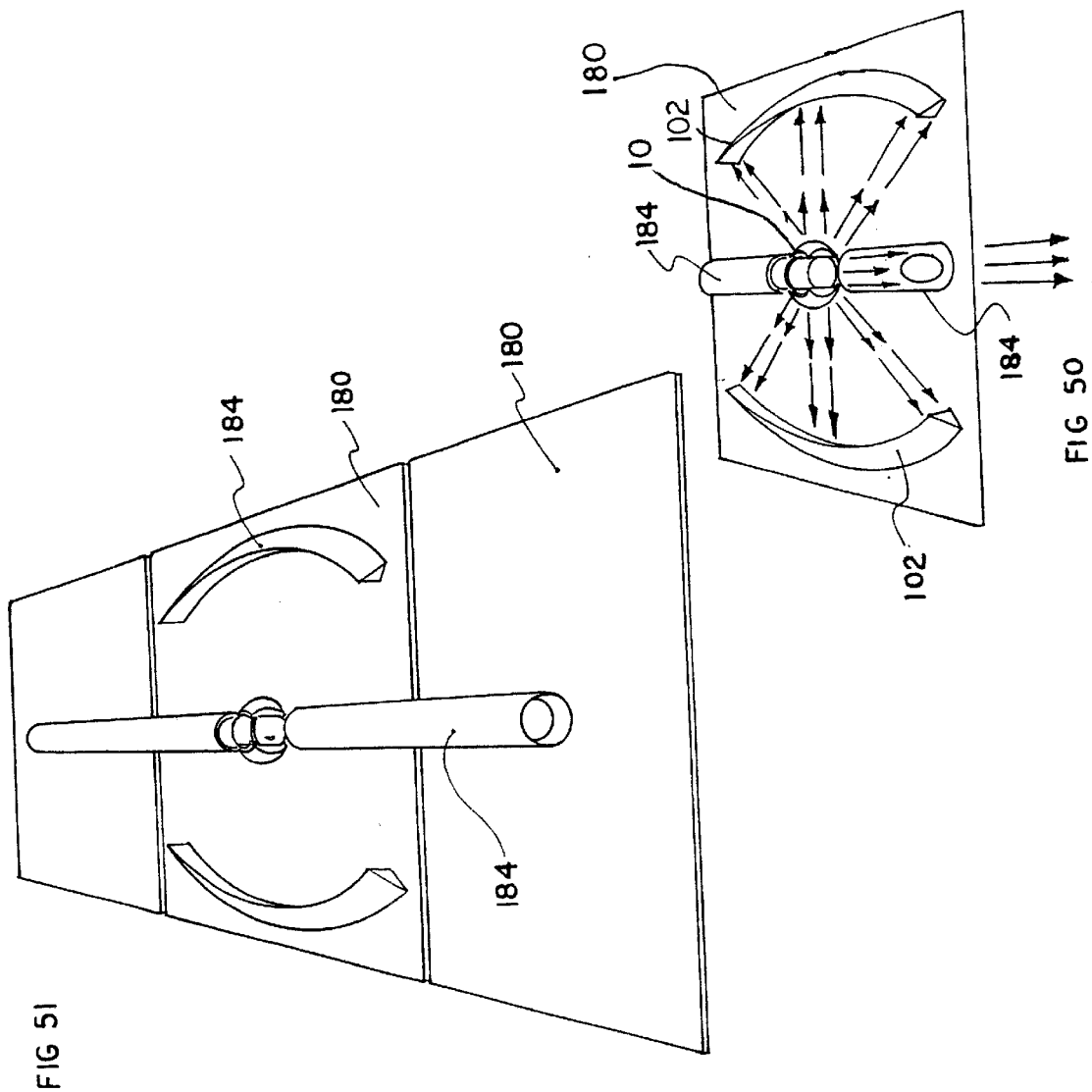

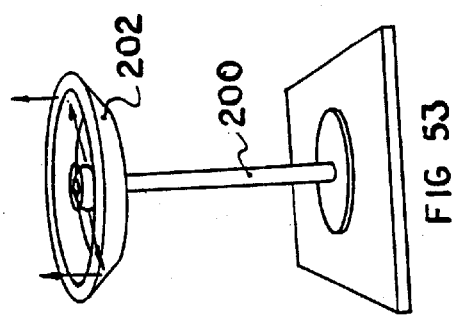
FIG 52
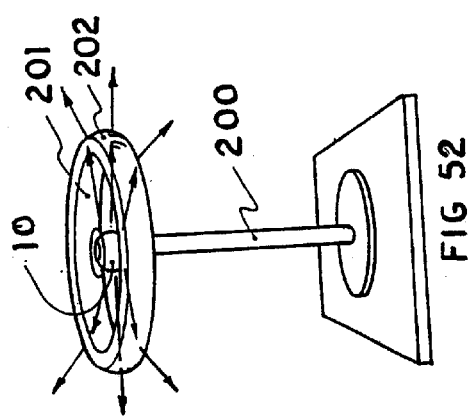
FIG 53
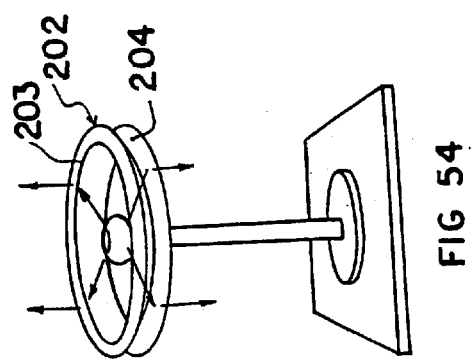
FIG 54
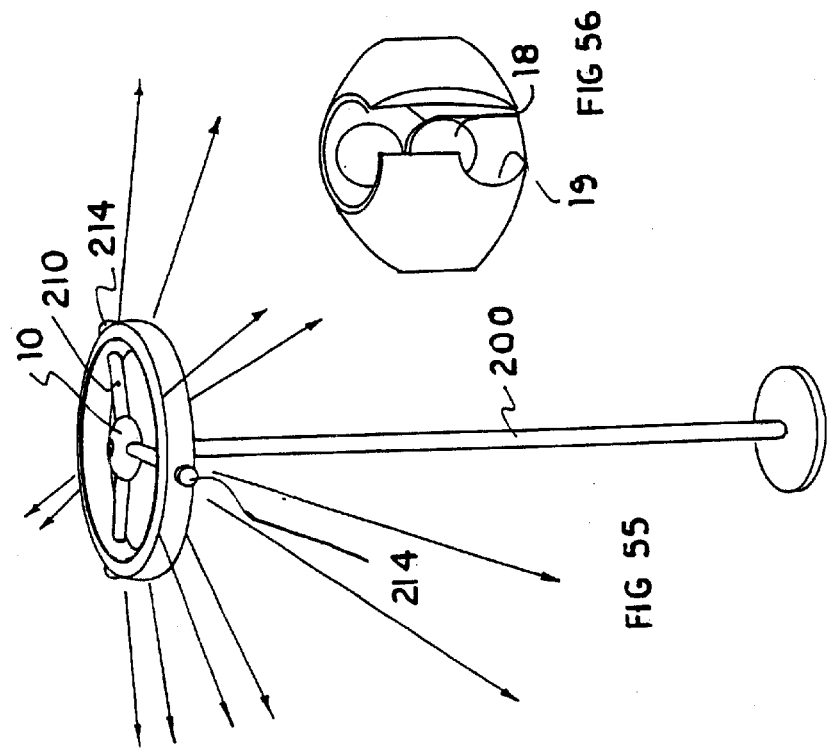
FIG 55
FIG 56

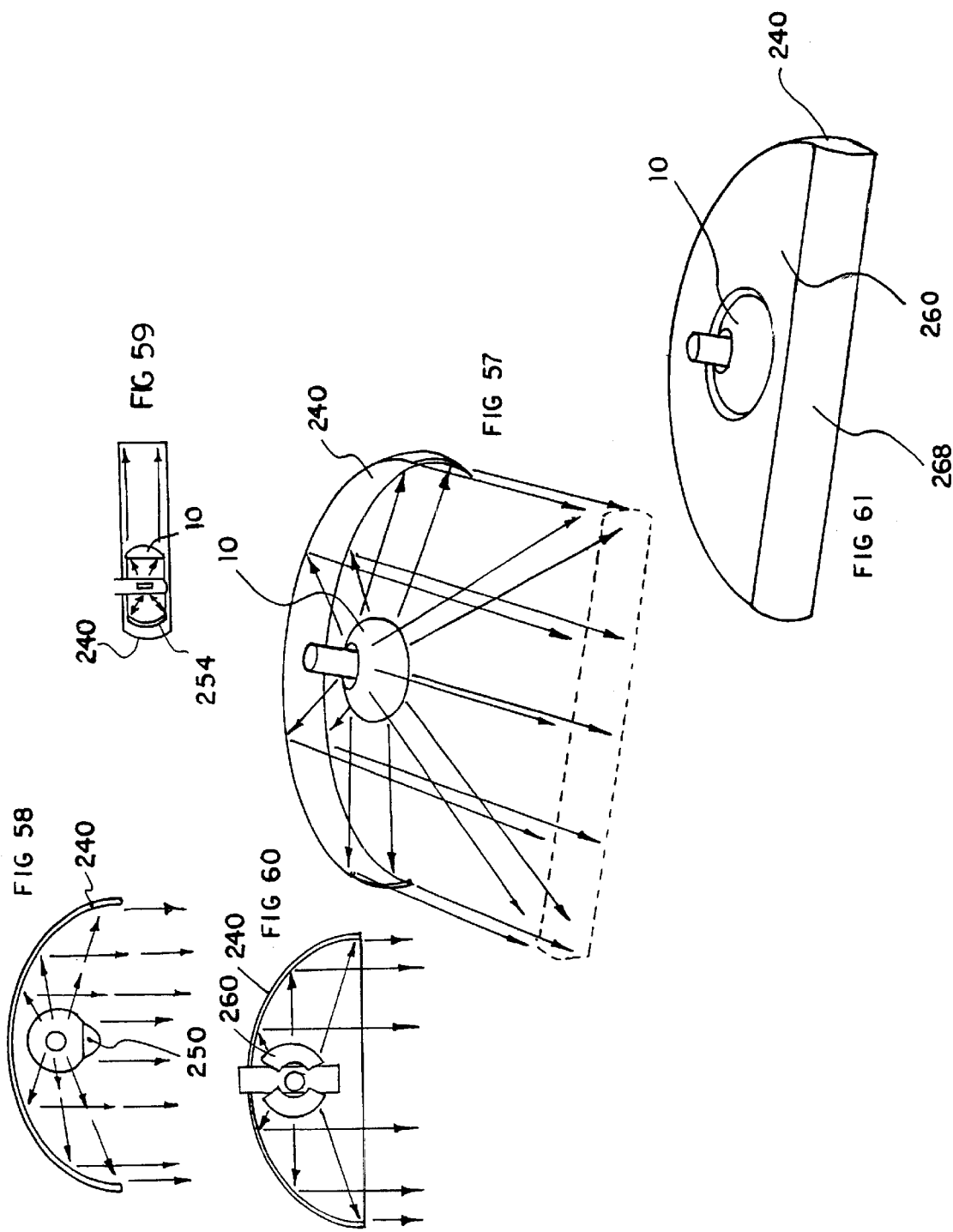

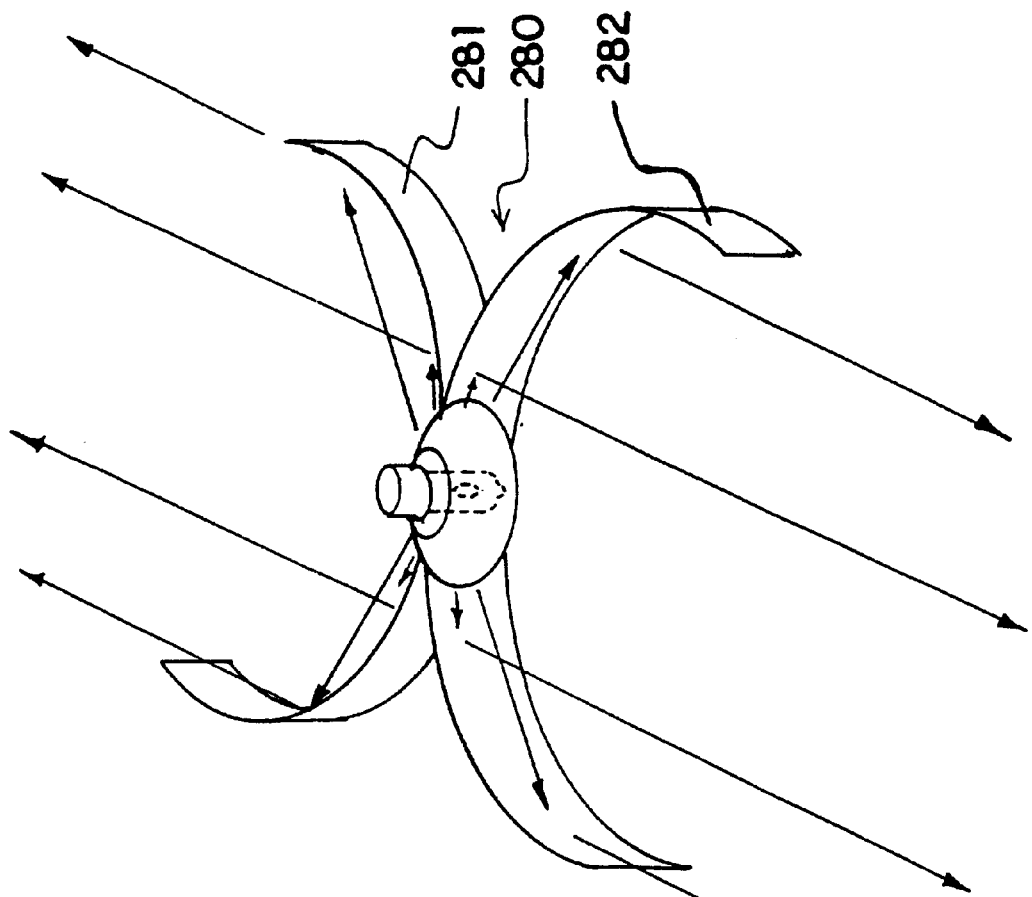
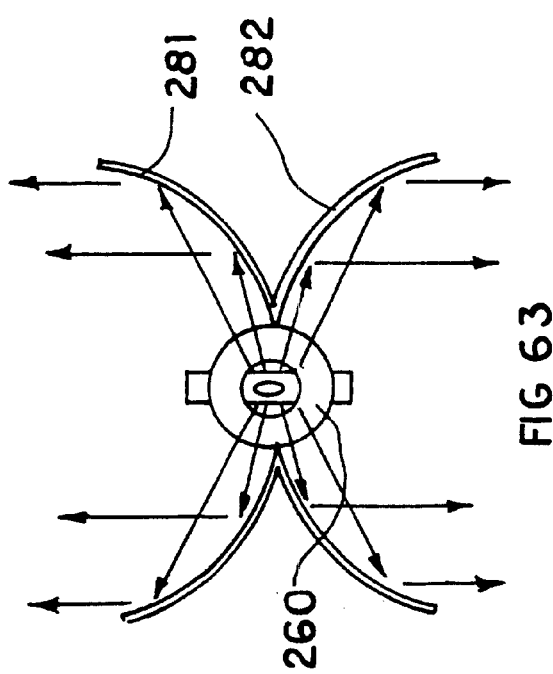
FIG 62
FIG 63

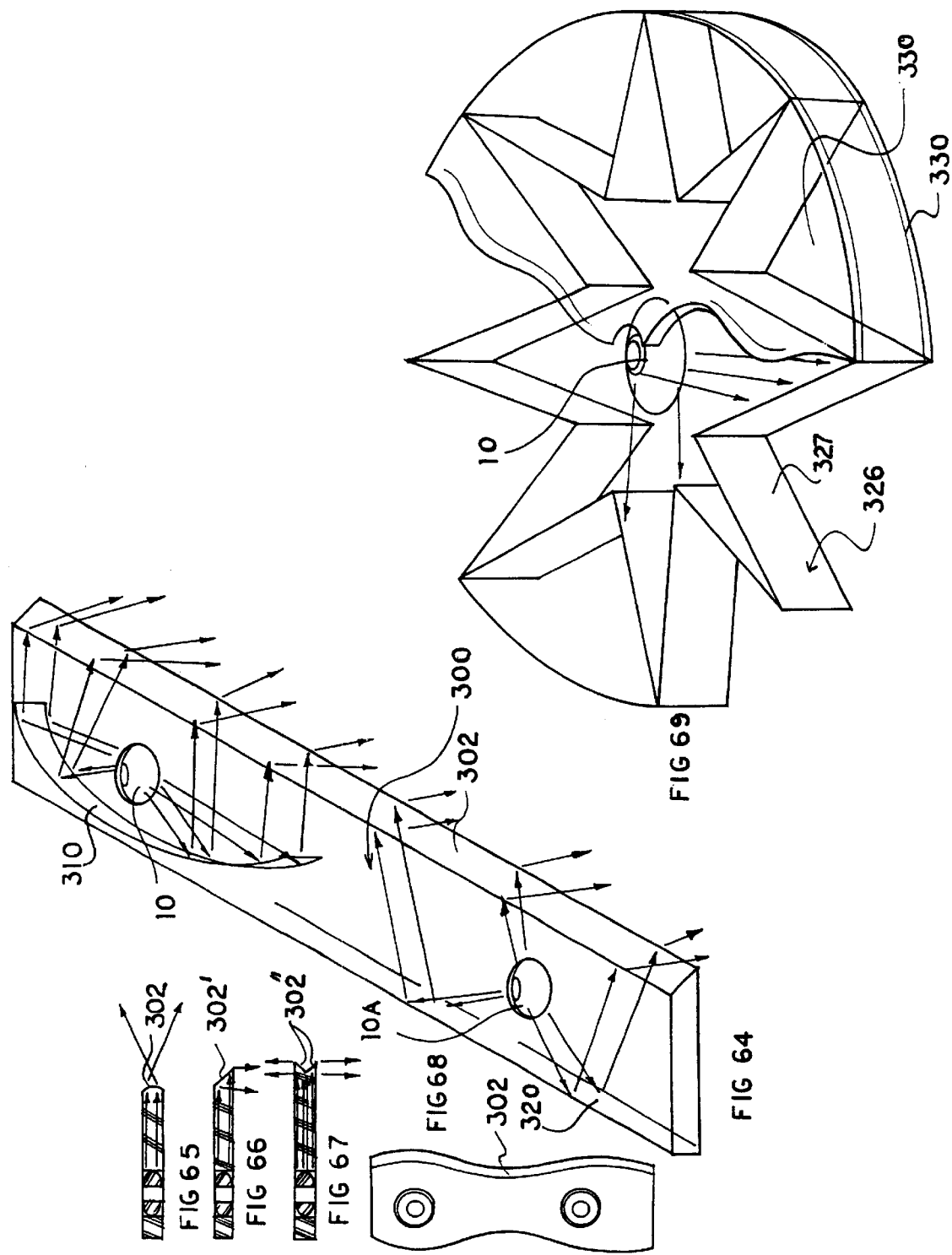

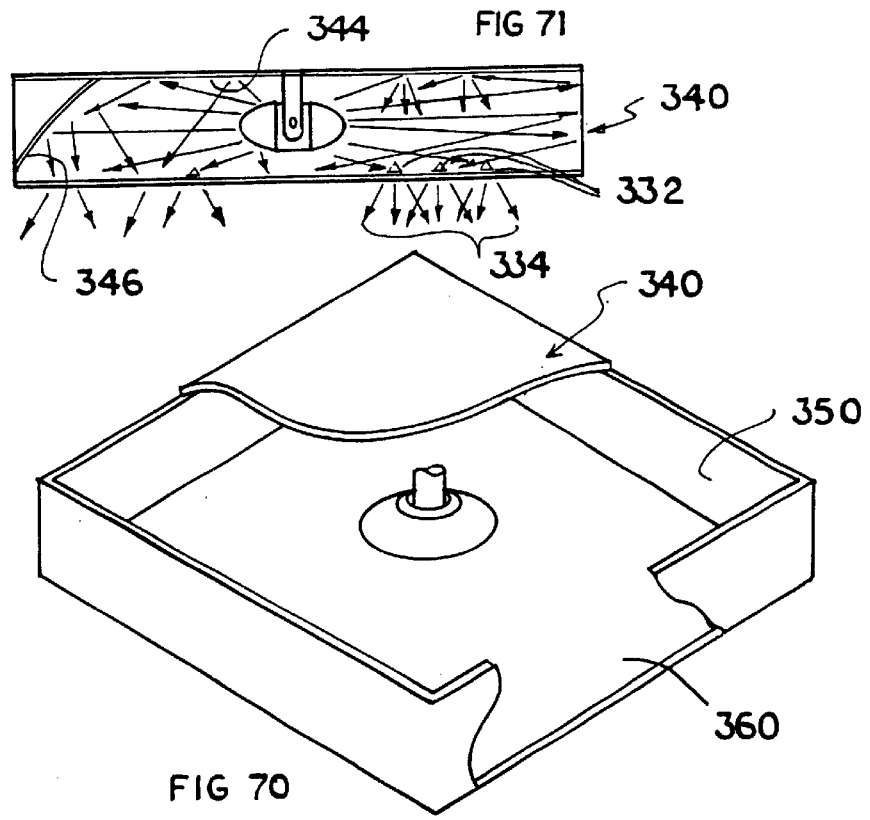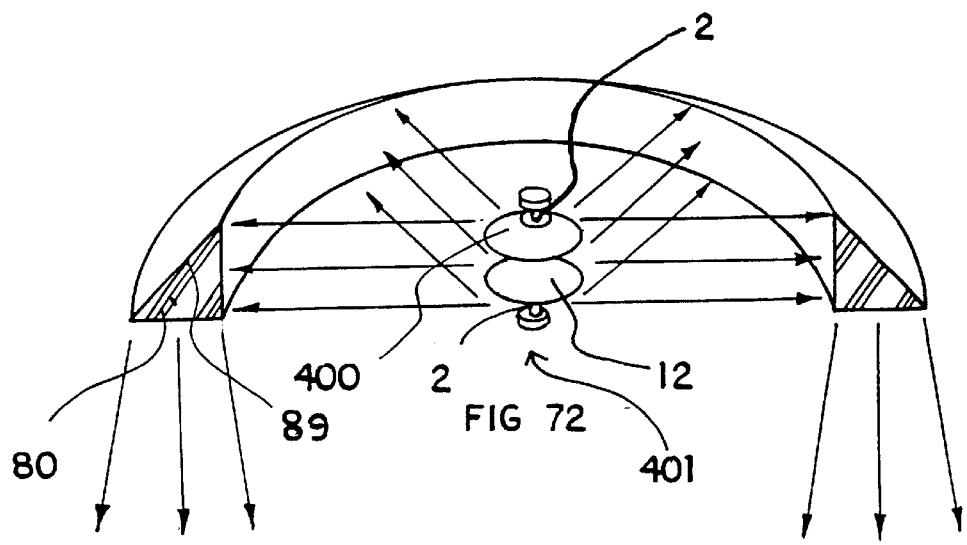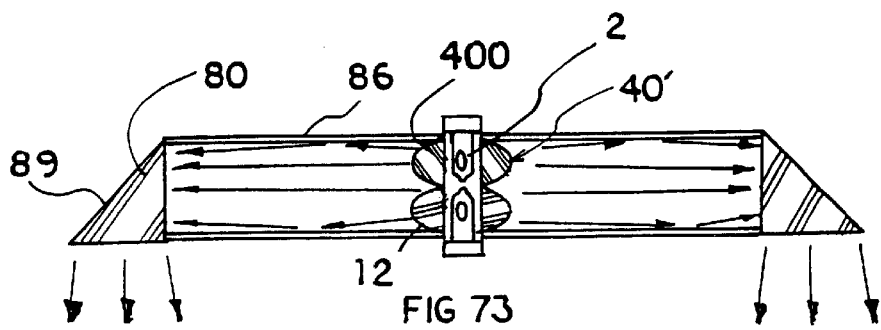

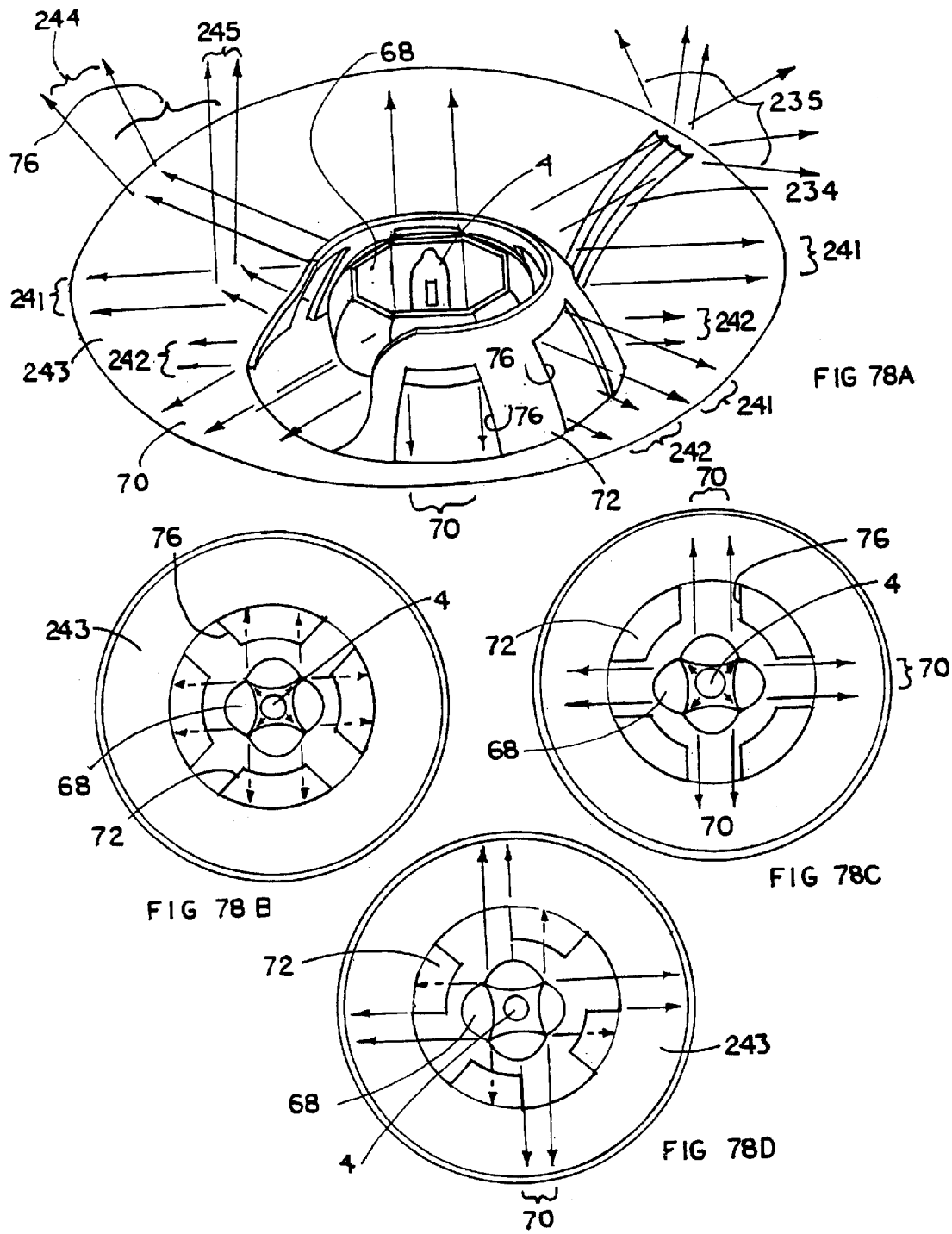

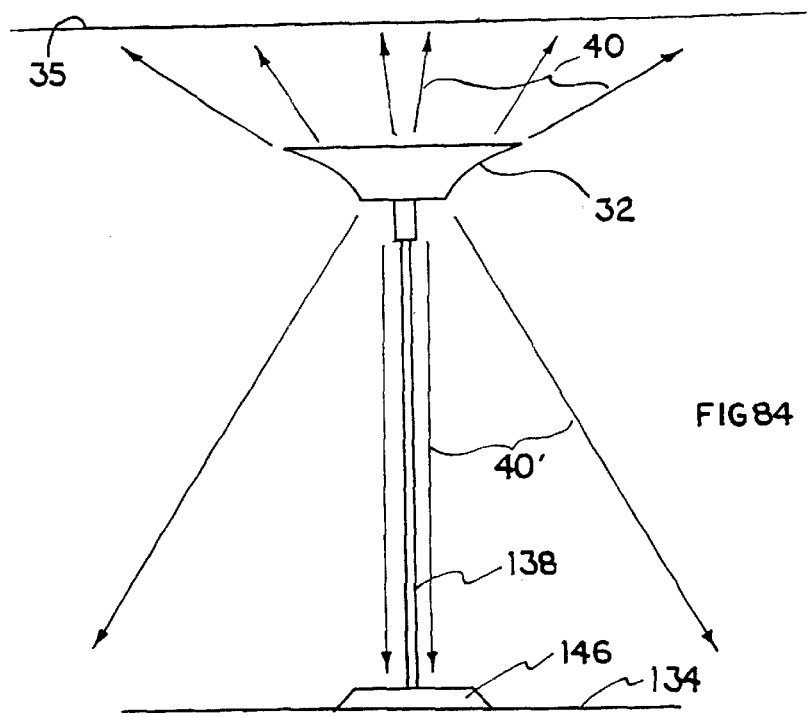
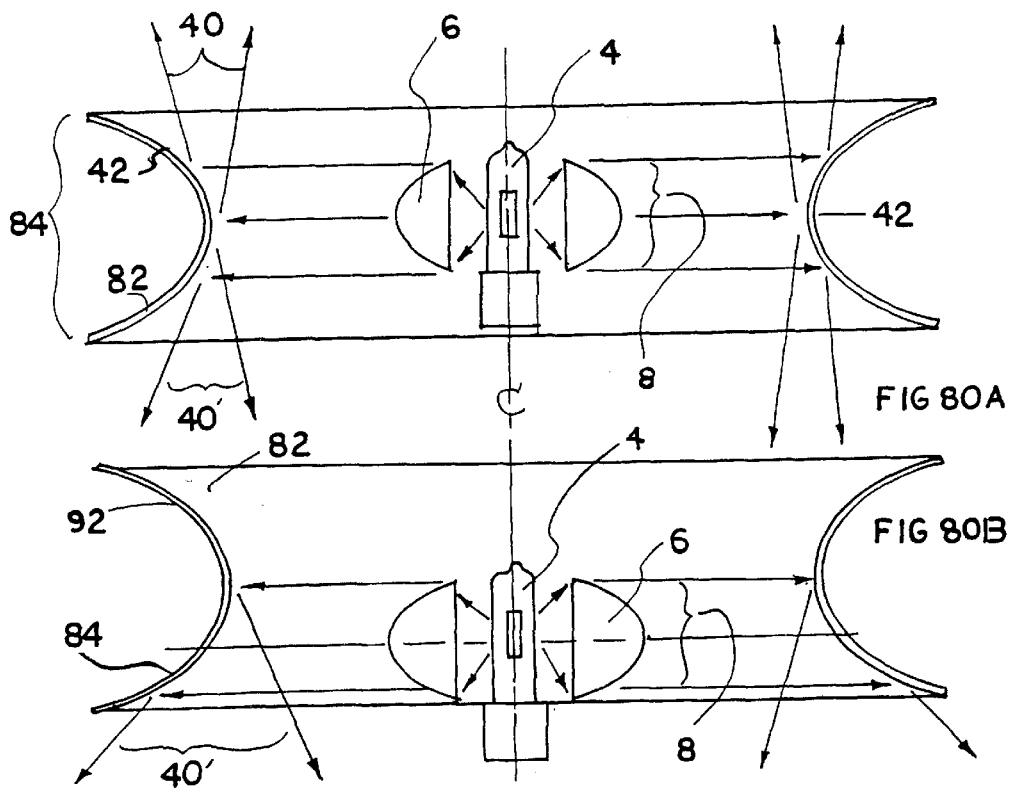

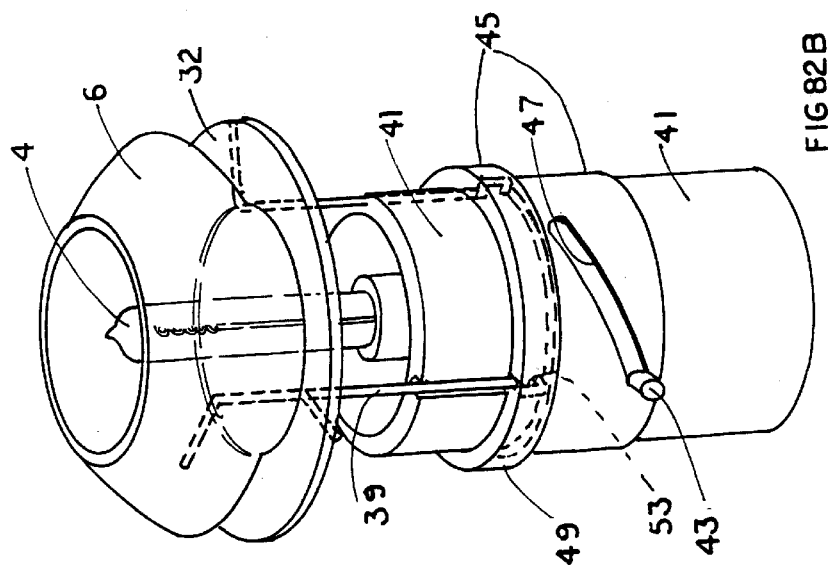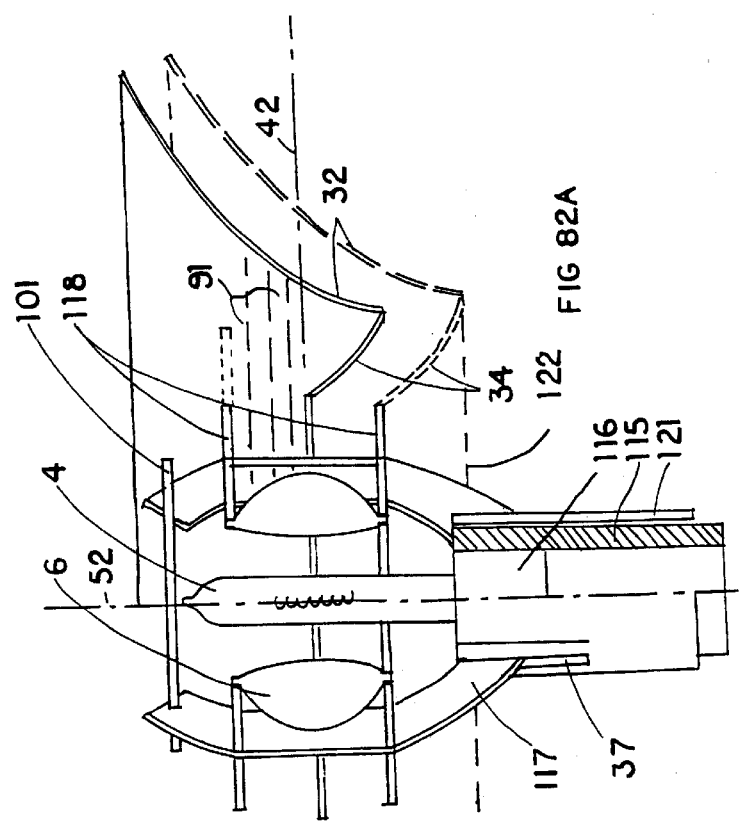

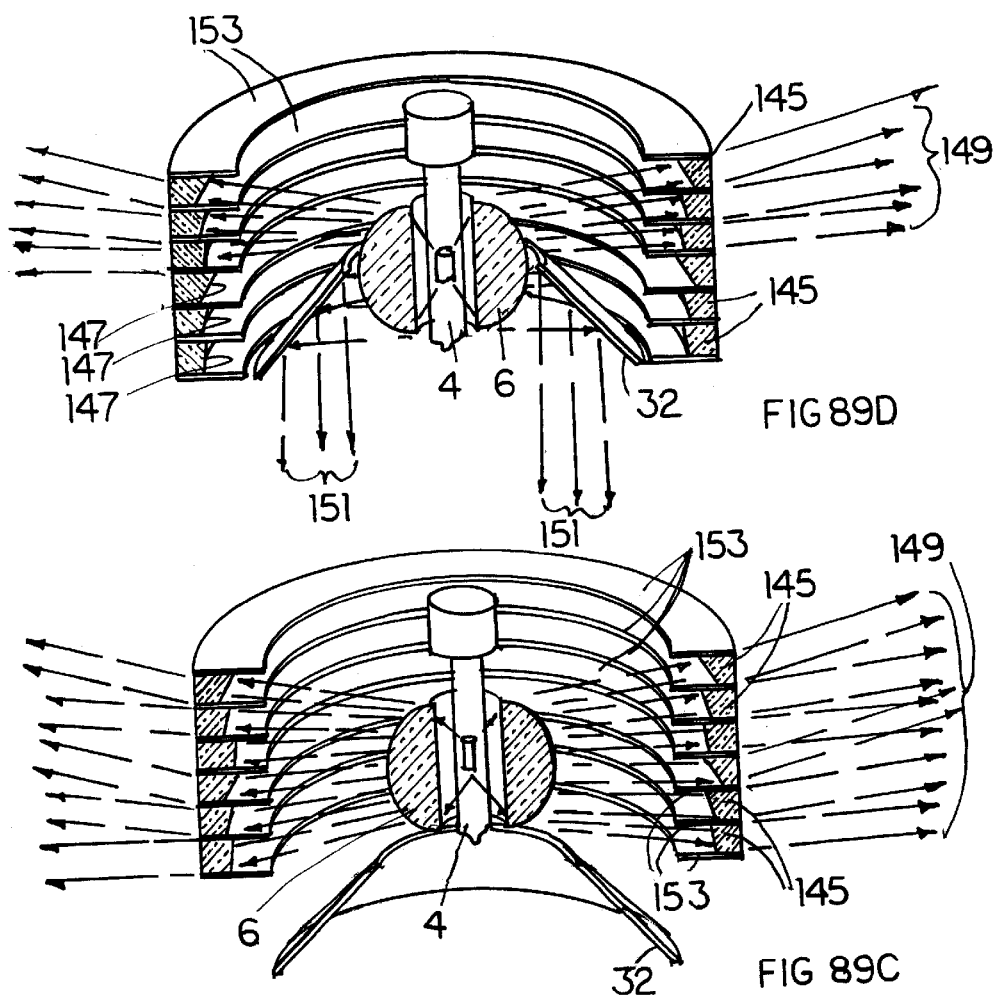

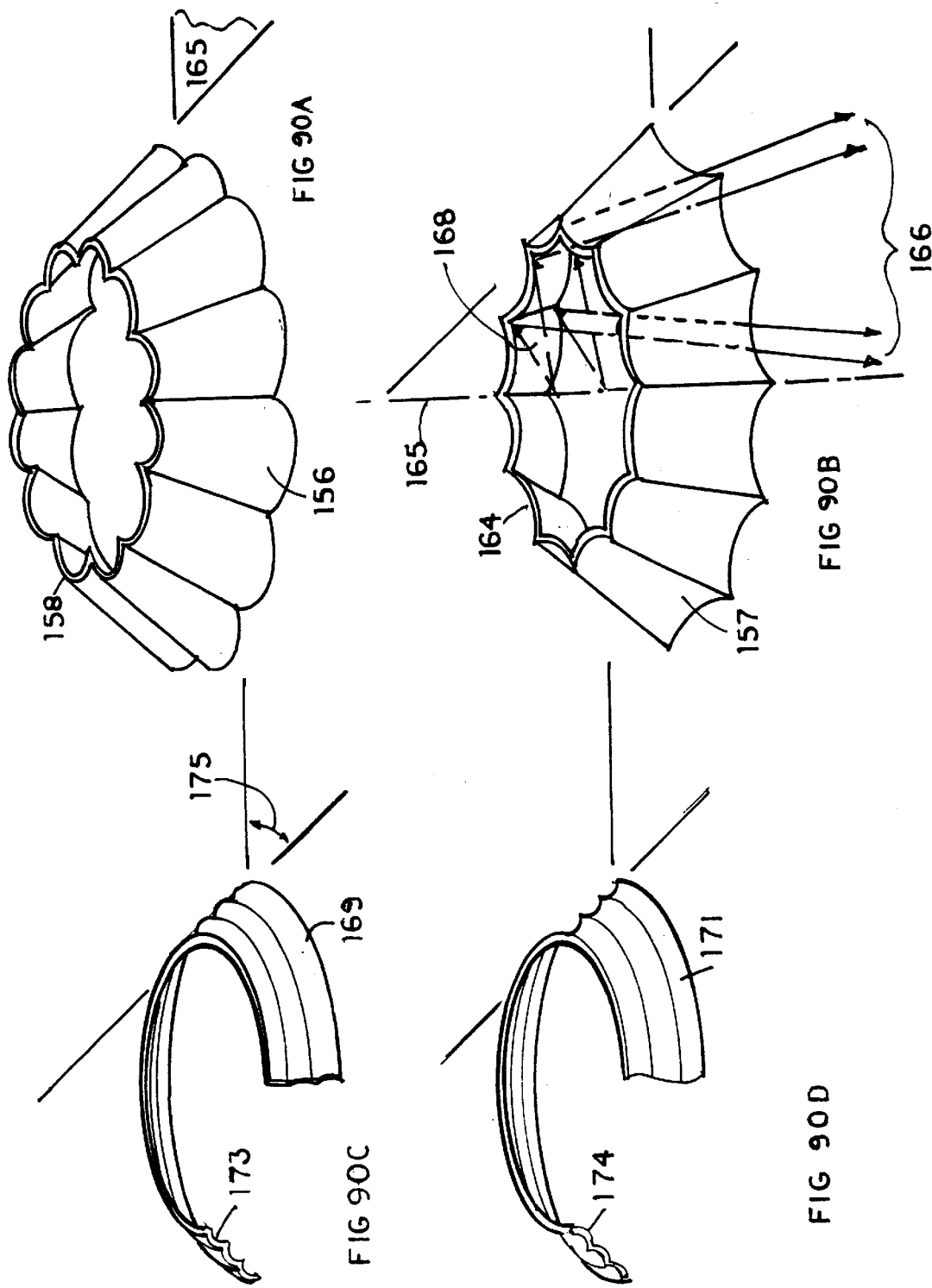

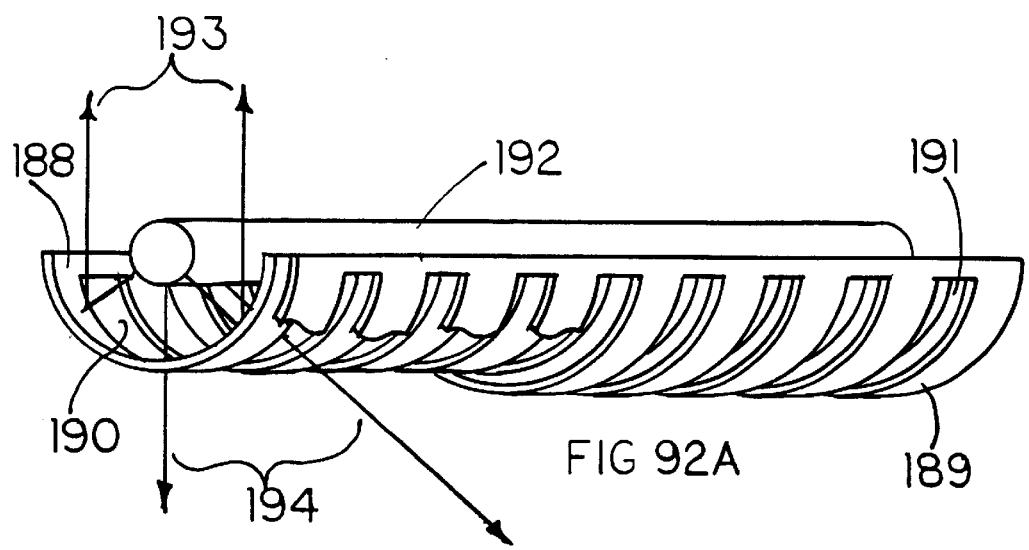
FIG 92A
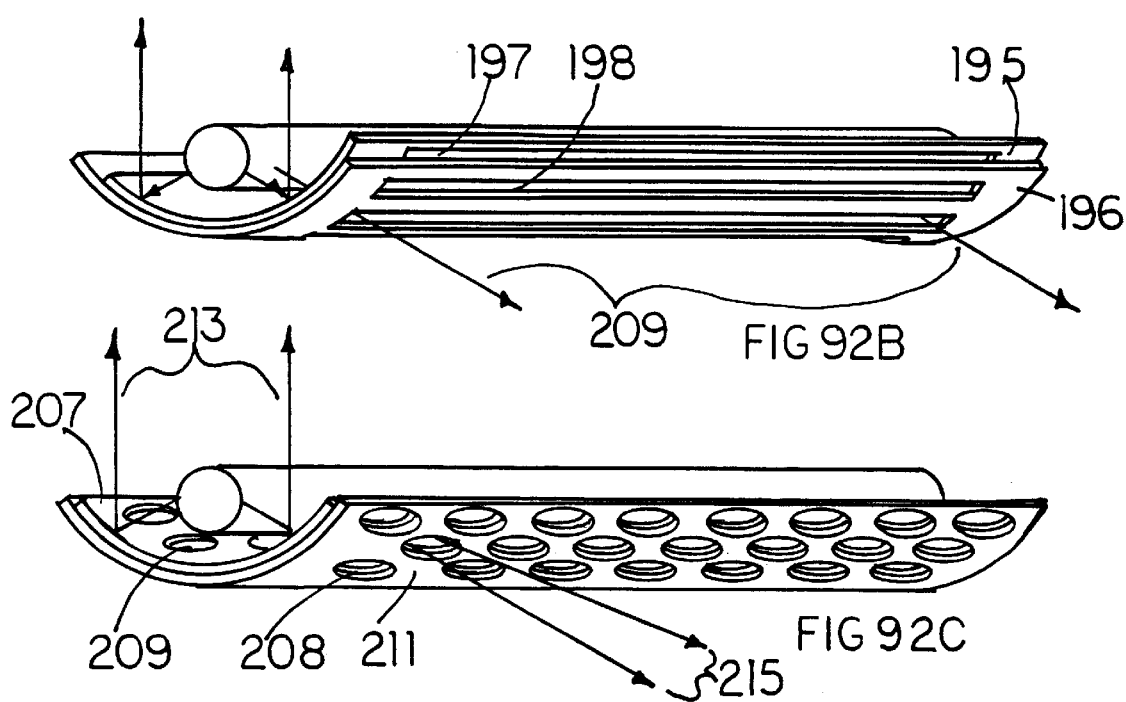
FIG 92B
FIG 92C

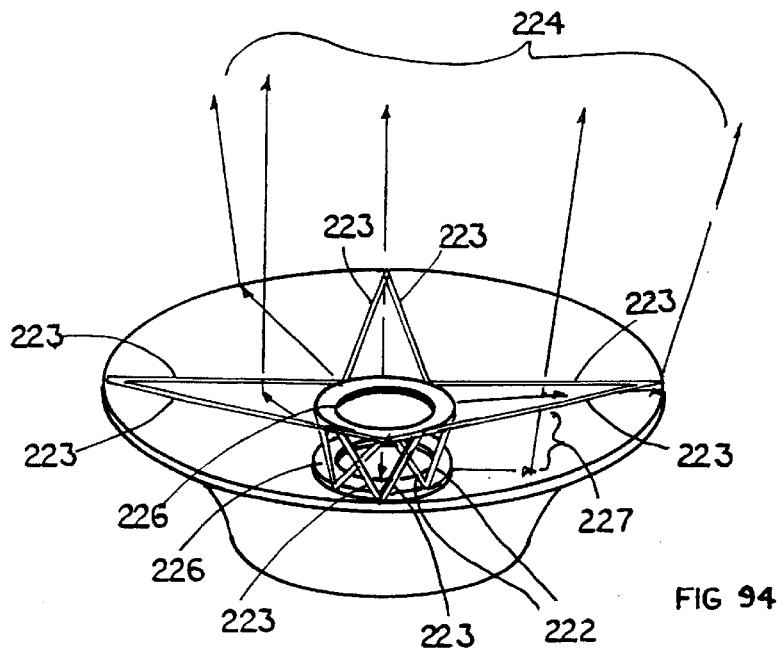
FIG 94
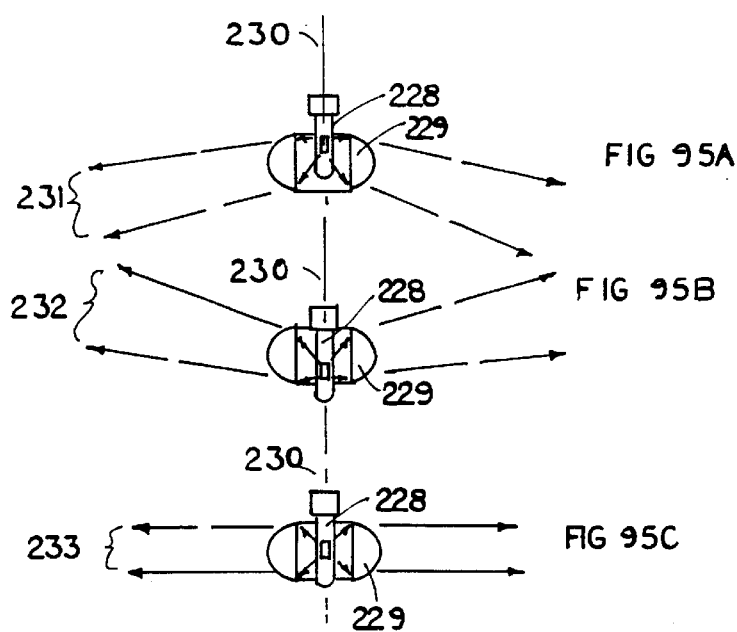
FIG 95A
FIG 95B
FIG 95C

ARCHITECTURAL LIGHTING DISTRIBUTED FROM CONTAINED RADIALLY COLLIMATED LIGHT AND COMPACT EFFICIENT LUMINAIRES

CROSS REFERENCE TO RELATED APPLICATIONS

This application is a continuation of international application number PCT/US98/18419, filed Sep. 3, 1998.

This application is a continuation-in-part of my co-pending application. Ser. No. 08/201,466 filed Feb. 25, 1994, now U.S. Pat. No. 5,897,201, which was a continuation-in-part of my application Ser. No. 08/006,623, filed Jan. 21, 1993, now abandoned.

This application is also based upon and claims the priority of Provisional application Serial No. 60/058,195 filed Sep. 8, 1997.

FIELD OF THE APPLICATION

The present invention relates generally to lighting systems and arrangements, and, more particularly, to a system for producing shaped and directed light from a quasi point source to provide broadly distributed ambient light, non-shadowing task illumination, multi-beam display lighting, projective lineal lighting and projective surface washing illumination lineally or radially distributed as well as to provide efficiently distributed illumination from a compact luminaire and to provide lighting which reduces the heat level above the light source.

BACKGROUND OF THE INVENTION

The present invention relates to improved use of radiant energy from a quasi point source. The present specification primarily discusses collimation and shaping of visible light, since this is the collimation application for the invention at the present time, but other forms of radiant energy, for example infrared energy for heating, could be similarly distributed. The quasi point source may conveniently comprise a metal halide lamp. For simplicity in description, the terms radiant energy and light will be used interchangeably in the present description. In my patent application Ser. No. 08/006,623, I have described means for utilizing collimation means to provide radial collimation for a quasi point source, and producing a cylinder of light which is transmitted for distribution by further means. The present invention provides advancements in distribution and shaping of light utilizing distribution optics in conjunction with radial collimation means. In further embodiments, further improvements are provided wherein an "f" number is minimized, where the "f" number is inversely proportional to efficiency of light capture of the source by the radial collimation means.

There is a need to provide high intensity, efficient, directed, non-glare illumination to cover a large area or a plurality of spaces. Typical current solutions require the use of a plurality of sources such as separate bulbs in separate down-lights. One system may need to contain one group of light bulbs of a first wattage as well as other bulbs of differing types in order to meet particular lighting requirements. For example, a spotlight is almost invariably provided with an incandescent source, while relatively low power ambient lighting is provided by fluorescent tubes. This results in complexity and expense in installation and in inconvenience and expense in maintenance.

Typical prior art systems for distributing light from a source commonly lack flexibility in the number of different directions in which light may be directed from a single source. They are also characterized by complexity and lack of efficiency. In most existing lighting systems, energy is gathered by a parabolic or ellipsoidal reflector and distributed in a conical shape. The system of the present invention does not need such reflectors as a collimation means of collection. A radially formed collimation device feeds modulation means. The present invention provides for a simplicity in construction and compactness in layout for any of a number of different types of systems. Systems constructed in accordance with the present invention may provide for lighting the interior of a room, the exterior of a vehicle or other space.

In making devices using radially collimated light, it would be highly desirable to provide lighting fixtures able to be constructed in flat or thin shapes. A significant characteristic in many applications is thickness. Means that capture collimated light for further distribution are referred to in the present invention as distribution optics.

Means that collimate light in at least a radial degree of freedom are referred to in the context of the present invention as collimation optics. In typical prior art systems, in order to capture a desired percentage of radially collimated light for further distribution, means which may be viewed as corresponding to the distribution optics must of necessity be significantly thicker in an axial direction than the prior art means which correspond to the present invention's collimation optics. This will result in a light distribution means constructed in accordance with prior art principles for a particular light shaping other application being significantly thicker than such means constructed in accordance with the present invention. The present invention will allow integration of means for producing a given light distribution into an architectural member. For example, a shelf may be provided which produces illumination on areas or items below it. A ceiling or wall panel that would be otherwise totally impractical due to its thickness may be produced with dimensions for maximizing flexibility in its utilization. Use of a high efficiency high intensity light source is permitted from which light may be distributed over a broad area or into a plurality or separate volumes with minimized glare and lamps not being visible.

SUMMARY OF THE INVENTION

It is therefore a general object of the present invention to provide an illumination means including radial light collimation optics, containment optics and optics for distributing and shaping collimated light to illuminate the interior or exterior of an architectural space, which could be a vehicle.

It is an additional general object of the present invention to provide an illumination means of the type described wherein the collimation, containment and distribution optics are matched to each other to provide maximum efficiency of light distribution from the quasi point source.

It is also a general object of the present invention to provide a highly controlled light distribution system wherein optics are provided by the system, and not by a source such as a flood-lamp which includes both light emitting and reflecting means, whereby disposability of portions of a lighting system is reduced.

It is another object of the present invention to provide illumination means of the type describe to reduce the number of sources to illuminate a broad space by permitting the use of a single, high efficiency, high intensity source.

It is also a general object of the present invention to reduce the complexity of a light distribution system by elimination of the need to utilize differing types of lamps for differing types of lighting, e.g. task, ambient or display.

It is an additional general object of the present invention to provide an illumination means of the type described to minimize the complexity of maintenance by eliminating the need to use different types of bulbs for different types of illumination.

It is a specific objective of the present invention to provide an illumination system of the type described in which bulbs providing illumination are not visible to observers in the illuminated space.

It is an object of the present invention in one form to provide for a fixture, which may be attached to a wall, ceiling or other architectural surface, which is of minimized thickness with respect to the proportion of the light captured from the source for distribution.

It is an objective of the present invention in a further form to provide for a fixture which is of minimized thickness with respect to the proportion of the light captured from the source for distribution by virtue of minimized axial dispersion so that the fixture which may be embedded in a wall, ceiling or other architectural surface.

It is a still further objective of the invention to provide a system of the type described in which inputs from more than one source may be combined, one input of which could be solar.

It is a still further specific objective in a the form of system of the type described to permit the combination of different light sources which may have differing "warm" or cool" spectra.

It is also an object of the present invention to Provide illumination means of the type described which may be embodied in an low profile architectural devices with respect to a surface to which it is mounted.

It is a more particular object of the present invention to provide a system in which the axial dimension may be minimized while maintaining efficiency in capture of radiation by distribution optics that receive radially collimated light from collimation optics.

It is another object to provide illumination means of the type described in which the distribution optics may provide a plurality of different forms of illumination or separately directed volumes of light of a similar type of illumination.

It is also another object to provide illumination means of the type described in which the containment optics and or the distribution optics may be formed to receive and transmit a plurality of different forms of illumination or separately directed volumes of light of a similar type of illumination.

It is a further object of the present invention in one form to provide compound radial collimators to provide highly efficient capture of radiant flux form the source.

It is yet another object of the present invention to a system of the type described in which light having a t least another forms of collimation provided for distribution in addition to radially collimated light so that different types of illumination, e.g. task or ambient, may be provided from one light distribution means.

It is another specific object of the present invention in one form to shape radially collimated light in a continuous lineal beam, whereby convention "scalloping" of a light pattern produced by prior art distribution systems may be avoided.

It is also an additional object of the present invention to provide illumination systems of the type described in which collimation, containment and/or distribution optics may be segmented, whereby additional ability for providing a plurality of separately shaped light segments is provided.

It is another object in illumination systems of the type described to spread illumination from an aperture in illumination means of the type described, whereby glare is reduced.

It is still another object to provide illumination means of the type described which can shape light to meet constraints of a particular environment by selection of interacting forms of collimation and distribution optics.

It is also an another object of the present invention to provide illumination systems of the type described in a panel which is evenly illuminated and which can function as an artificial skylight.

It is also a further object in one form to provide light distribution means of the type described wherein light from more than one quasi point source may be mixed and distributed.

An object of the present invention is to provide efficiently distributed illumination from a compact luminaire-type of lighting.

Another object of the present invention is to provide a lighting arrangment having the ability to vary the intensity of light that is applied to architectural surfacing.

Another object of the present invention is to provide evenly and broadly distributed light on surfaces (such as ceilings) that are within 3 feet from the top of the luminaire.

Another object of the present invention is to provide a lighting arrangement having the ability to vary the crossectional brightness of the light patterned on architural surfaces.

Another object of the present invention is to provide mechanisms for variably dividing light from a luminaire to provide a proportionate ratio of brightness to ceilings and brightness to floors.

Another object of the present invention is to provide a mechanism for creating interchangeable light patterns on floors and ceilings.

Another object of the present invention is to optically radiate heat away from high temperature light sources (such as quartz halogen) in order to lower the ambient operating temperature in proximity to the light source.

Another object of the invention is to provide high efficiency and high performance lighting from a low cost luminaire.

Briefly stated, in accordance with the present invention, there is provided an illumination means including radial light collimation optics, containment optics and distribution optics for shaping light to illuminate space. The radial collimation means is formed to shape light from a quasi point source into a shape which may be viewed as a cylinder or as a disc extending in a radial direction and having a thickness in the axial direction. The containment optics contains and directs light efficiently to the distribution optics. The containment optics controls axial dispersion with respect to distance from the collimation optics. Light is contained within the axial dimension to limit axial dispersion. This provides the capability to maintain efficiency and, where desired, to minimize the axial dimension of the system of the present invention. Also, the size of the distribution optics, particularly in the axial dimension may be minimized while still providing for maximum capture of light. Distribution optics are radially outward of the collimation means. Containment optics may be a physical bridge between collimation optics and distribution optics. The containment means may be a structural member. The distribution optics may be concentric with the radial collimation means, or may comprise discrete elements. The distribution optics modulate light, directing and shaping it to fill selected spaces. Distribution optics may be formed to spread illumination from an aperture, whereby glare is reduced. Modifications may be made to the collimation optics to facilitate maximum capture of radiant flux from the source. In further forms, the collimation optics means is segmented to provide sectors of radiation for coupling to each of various forms of containment optics and distribution optics. The collimation optics may be segmented and may provide more than one form of collimation. Distribution optics may also be segmented. Further means may be provided for mixing and distributing light from more than one quasi point source so that waveband or other source characteristics may be mixed.

DESCRIPTION OF THE DRAWINGS

The means by which the foregoing objects and features of invention are achieved are pointed out in the claims forming the concluding portion of the specification. The invention, both as to its organization and manner of operation, may be further understood by reference to the following description taken in connection with the following drawings.

FIGS. 1 through 3 are each an elevation in cross section illustrating a different form of collimation optics.

FIG. 4 is an elevation in cross section illustrating collimation and containment optics.

FIG. 5 is an elevation in cross section illustrating optics performing a number of functions.

FIGS. 6, 7, and 8 are an axonometric view and plan views respectively of different forms of segmented collimation optics.

FIGS. 9, 10 and 11 are respectively an axonometric view, partially broken away, and a plan view and an elevation, each in cross section, illustrating a compound beam collimator including segmenting in the collimation optics.

FIGS. 15, 16 and 17 are each an axonometric view, partially broken away, illustrating a separate embodiment utilizing light bridging means extending from an element in collimation optics.

FIG. 18 illustrates containment optics including two parts, a solid bridge linking collimation optics and distribution optics as well as a containment ring lens.

FIG. 19 illustrates physical bridging from collimation means to containment means.

FIG. 22 is an illustration similar to that of FIG. 20 illustrating an alternative embodiment in which distribution optics are reflective rather than refractive.

FIG. 23 is a an elevation in cross section of a collimation and distribution means employing a light containment optics between the collimation and distribution optics.

FIGS. 23A and 23B illustrate alternate forms of exit apertures from distribution optics.

FIG. 24 is an axonometric view of a system mounted to a transmissive architectural panel.

FIGS. 27 and 28 are a cross sectional elevation and an axonometric view of a system with segmented distribution optics suitable for installation to an architectural panel.

FIGS. 29a and 29b illustrate alternative light exit means for inclusion in the embodiment of FIGS. 27 and 28.

FIGS. 30 and 31 are a cross sectional elevation and an axonometric view of another form of system with segmented distribution optics suitable for installation to an architectural panel.

FIG. 33 illustrates alternative light exit means for inclusion in the embodiment of FIGS. 30 and 31 for changing the shape of light directed from the linear distribution optics segments.

FIGS. 34 and 35 are a cross sectional elevation and an axonometric view of another form of system with multiple, concentric distribution optics members of differing axial dimensions suitable for installation to an architectural panel.

FIG. 36 is a perspective view illustrating an embodiment according to either of FIGS. 34 and 35 in use.

FIGS. 37 and 38 are a cross sectional elevation and an axonometric view, partially broken away, of another form of system with reflective distribution optics members.

FIG. 39 is a partial detail view illustrating alternative exit means for the light distribution means of FIG. 37.

FIGS. 40, 41, 42 are each an axonometric view with diametric cross section of a separate embodiment of distribution optics containing multiple light directing elements, with FIGS. 41 and 42 illustrating solid containment optics.

FIGS. 43 and 43A are a cross sectional elevation and an axonometric view, partially broken away, of another form of system with reflective containment optics and refractive ring distribution optics members.

FIG. 44 is a partial cross sectional detail illustrating an alternative to the embodiment of FIG. 43 in which the distribution optics comprises multiple refractive members.

FIG. 45 is a cross sectional elevation of an embodiment incorporating concentric refracting rings for segmenting transmitted light in the distribution optics.

FIGS. 50 and 51 are each a perspective illustration of a system according to the present invention providing both radial and cylindrical collimation and suitable for inclusion in architectural panels as well as having the ability to be suspended in space and wherein containment means are shaped to match the output from collimation means.

FIGS. 52, 53 and 54 are each a perspective view of a different form of system which can be utilized as a table lamp and wherein a different form of distribution optics provides a particular form of light distribution.

FIG. 55 is a perspective view of a system similar to that of FIGS. 52–54 but wherein multiple forms of collimation are provided.

FIG. 56 is a partial detail view of FIG. 55, partially broken away, illustrating collimation optics means for delivering light.

FIG. 57 is an axonometric view of an embodiment in which distribution optics comprises a parabolic or ellipsoidal reflector, which may have a flat, spherical or aspherical surface in the axial, or vertical, dimension.

FIG. 58 is a plan view of an embodiment in which the collimator in collimation optics is modified to provide conventional collimation within the segment which is not reflected.

FIG. 59 is a cross sectional plan view of an embodiment in which a reflector intercepts forwardly directed radially collimated light and redirects it toward the distribution optics.

FIG. 60 is a cross sectional plan view of a system including a horizontally disposed lamp providing radiant energy.

FIG. 61 is an axonometric illustration of a system including a solid block of refracting material in the distribution optics portion is formed.

FIGS. 62 and 63 are respectively an axonometric an a plan illustration of embodiments respectively corresponding to FIGS. 59 and 59 respectively and further including means for bidirectional transmission in a given planar degree of freedom.

FIG. 64 is an axonometric illustration of an embodiment which can be contained in the envelope of a rectangular parallelepiped and comprises multiple light sources.

FIGS. 65, 66 and 67 each show different forms of exit means that may be included in the embodiment of FIG. 64.

FIG. 68 is an alternate form of the embodiment of FIG. 64 continuous contours may be used to shape the boundary of the distribution optics and exit means.

FIG. 69 is an axonometric view, partially broken away wherein distribution optics comprises a shaped, axially extending band surrounding the radial collimation means.

FIGS. 70 and 71 are a cross sectional elevation and an axonometric view, partially broken away of another form of system suitable for installation to an architectural member comprising a ceiling panel.

FIGS. 72 through 75 are each a view of means for mixing light from more than one source for distribution in accordance with the present invention.

FIG. 78A is an isometric view of a luminaire containing elements for variably segmented illumination into bi-directional lighting.

FIGS. 78B, 78C, 78C are plan views of the luminaire shown in FIG. 78A illustrating changes in rotational relationships required for altering the ratio of brightness or pattern in the segmented illumination.

FIGS. 80A and 80B are cross-sectional views of a luminaire whose components are variably positioned in relation to each other for varying the ratio of segmentation of light as well as changing the crossectional brightness of the beam.

FIG. 82A is a partial cross-sectional view illustrating various components of a circular luminaire that provide an alternate method of changing the ratio of brightness of illumination projected toward ceiling and floor.

FIG. 82B is an isometric view of a luminaire similar to that of FIG. 82A showing further details including the structure for moving the reflector.

FIG. 84 is a schematic view of a torchierre lamp which has heat reduction and light distribution functions.

FIG. 89C is an isometric view of the arrangement shown in FIG. 89A.

FIG. 89D is an isometric view of the arrangement shown in FIG. 89B.

FIG. 90A is an isometric view of a negatively fluted reflector.

FIG. 90B is an isometric view of a positively fluted reflector.

FIG. 90C is a broken isometric view of a serially concave reflector.

FIG. 90D is a broken isometric view of a serially convex reflector.

FIG. 92A is a broken isometric view of a double elongated reflector with slots and arranged for longitudinal movement.

FIG. 92B is an isometric view of a double elongated reflector with slots and arranged for circumferential movement.

FIG. 92C is an isometric view of a double elongated reflector with holes and which may be arranged to move longitudinally and/or radially.

FIG. 94 is an isometric view showing one manner of connecting the reflector with other structure without producing shadows from the support structure.

FIGS. 95A, 95B and 95C are diagrammatic views of three different positions of a light source with respect to collimating means in an arrangement where they are movable with respect to each other along a center axis.

DESCRIPTION OF THE PREFERRED EMBODIMENTS

The present invention provides for use of radially collimated light for illumination of space. The use of shaped, radially collimated light is in contrast to the common prior art use of down-lights or other lighting devices providing only cylindrically collimated light. Radially collimated light lends itself to shaping by distribution optics. The present invention will provide for many forms of distribution and shaping of radially collimated light. In a further form, both radially and cylindrically collimated light may be distributed to meet specific lighting requirements. In an additional form of the invention, the collimation optics may provide a segmented output with selected segments having differing, rates and shapes of divergence. All or less than the entire angular extent of the source may be radially collimated.

Figure 75:
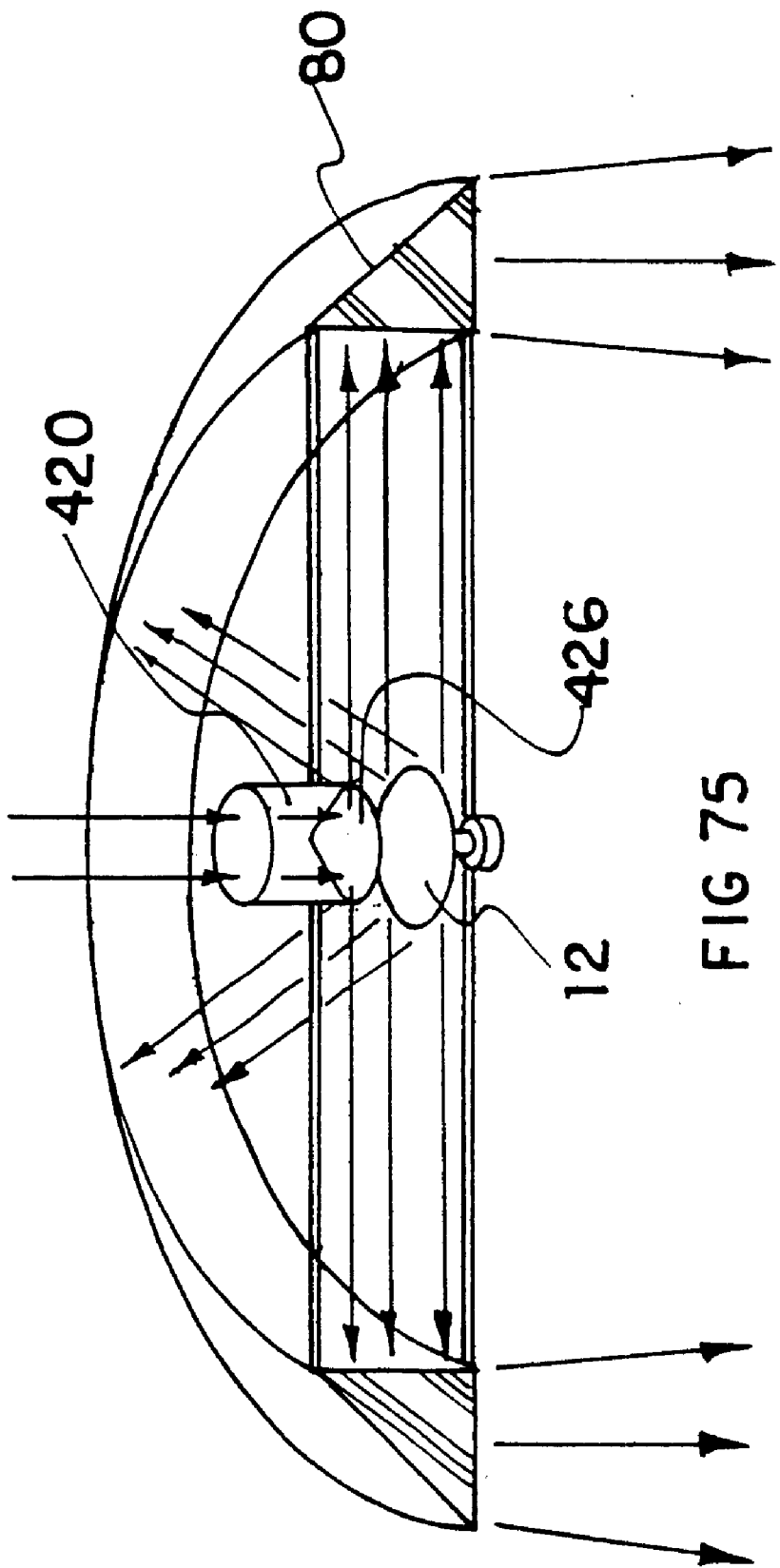

With respect mostly to FIGS. 1–75, containment optics limit dispersion of light in an axial dimension with respect to radial distance from the source and the collimation means. Containment optics controls divergence and efficiently directs light from collimation optics to distribution optics. It also may structurally connect collimation and distribution optics and further may unify structurally the collimation optics and distribution optics to create an architectural member. Containment optics can be in the form of a refractive ring, internally reflective surfaces in a hollow member or totally internally reflective surfaces in a solid, a structural member or an architectural surface. Also with respect mostly to FIGS. 1–75, distribution optics transform the radially collimated light into the desired shape for spatial illumination. The present specification begins with a description of collimation optics prior a description of the interactions with containment means and distribution optics. A radial collimator, including collimation optics means, is provided. Substantially omni-directional light is directed into a radial degree of freedom of freedom over an axial range corresponding to the axial range over which an entrance aperture of the collimator intercepts light from the source. Distribution optics means receive light from the collimation optics for reshaping and distribution.

As described in my above-identified application, a ring collimator can have a cross section of an asphere or a Fresnel lens. A particular type of ring can be matched to the structural requirement of a particular modulator included in distribution optics. The distribution device comprised of the distribution optics is remote from the collimation optics. A conveyance or transmission area is intermediate the collimation and distribution optics. While there is latitude in the degree of remoteness between the collimation and the distribution optics, it is important that the containment optics interacts to capture the collimated light and direct to the distribution optics so that efficiency is maintained.

As in standard cylindrical aspheres, efficiency is determined by the following: the "f" number of the lens itself and the ratio H/P, the height H of the ring lens and the size P of the radiant arc comprising the quasi-point source in the lamp, and efficiency of the lens.

It is important to note that quasi point sources currently available, are in fact not point sources. It is convenient to illustrate radially collimated rays from a quasi point source as being parallel. Within some broad degree of precision, this is true. However, in practical applications, a degree of divergence is present. This divergence creates limiting factors with respect to radial dimensions and efficiencies of prior art light distribution systems. The present invention recognizes and addresses this problem.

Initially, various embodiments of collimation optics are discussed. In the Figures, the same reference numerals are used to denote the same elements. The lines with arrowheads indicate the direction of light. FIGS. 1 through 3 are each an elevation in cross section illustrating a different form of collimation optics comprising a collimator 10. FIG. 4 illustrates a compound ring lens structure performing further functions. FIG. 5 is an elevation in cross section illustrating compound collimation optics. In the figures, the same reference numerals are used to denote corresponding elements. There are several types of a ring lens 12, also referred to as a collimating ring 12, or ring 12, that can be used in collimation optics. A highly desirable form is one having a minimum "f" number. "f" number is ratio of the radius from a radiant energy quasi point source 1, here comprising a metal halide lamp 2, to the face of the ring 12 divided by the height of the ring 12. Here, height is dimension in the axial direction. The axis defining the axial direction is an axis 11 about which the ring 12 is concentric. Preferably, the arc provided by the lamp 2 lies on the axis 11. A radially inner surface 14 of the ring 12 is close enough to the source 1 to catch a large part of the radial flux of the lamp 2. A value of "f"<1 is commonly acceptable . Light exits from a radially outward surface 16. The ring 12 may have a section that may be aspheric, spherical, or may comprise a Fresnel lens that is spherical or aspheric. This first type of collimator allows for a portion of the radial flux of the lamp to leave the confines of the ring. In this case the light may be directed in another pattern separate from the radial pattern.

The efficiency and accuracy of the front surface and the back surface of the ring lens 12 affects efficiency of the collimation optics. The front surface is the outer surface 16, which is an exit aperture for collimation optics, and the back surface is the inner surface 14, which is an entrance aperture of the collimation optics. Lens surface efficiency and accuracy are functions of lens manufacture and do not form a part of the present invention. They relate to smoothness of surface and accuracy of the shape provided by the lens manufacturer. The lens also is affected by the clarity of the glass from which it is constructed. They provide for uniformity of cross section of the transmitted light beam. They are relevant to the lens selection one skilled in the art would make to implement the present invention.

In the embodiment of FIG. 2, an inner surface 14' is provided which is convex, and improves upon light collection compared to the embodiment of FIG. 1. As illustrated in FIG. 3, an outer surface 16' of the lens ring 12 may have a Fresnel cross section. When using a large quasi point source, the use of a solid aspheric ring as in FIG. 1, in order to keep the ratio H/P high, the ring lens might have to be inordinately large, difficult to handle and expensive. A Fresnel ring provides for a larger effective height while maintaining a limited actual height.

Multiple lens collimators may be used to increase efficiency, as illustrated in the embodiment of FIG. 4, which also includes containment means. A compound ring lens 12 comprising, for example, first and second rings 12a and 12b, may be used. Unlike aspherical rings, a multiple lens ring may be used to form or to cause the radiating beam to be convergent. This can be significant in some forms in that it enables the use of distribution optics of reduced size in the axial dimension. In the embodiments of FIGS. 1 through 4, depending upon the "f" number, and the configuration of the quasi point source, some percentage of the radiant flux is allowed to leave through the central apertures of the ring in a vertical degree of freedom. In some applications, this is highly desirable in that down-lighting is provided in addition to radial collimation.

The embodiment of FIG. 5 illustrates a compound radial collimator which employs two simultaneously occurring methods of radial collimation. The first method is performed by the spherical or aspheric ring section 12. The other is performed by a refracting ring 20 which is internally reflective. The refracting ring 20 has a parabolic or ellipsoidal section. The inner diameter of the ring 20 is substantially in radial registration with the ring 12, and the ring 20 surrounds the ring 12 in the axial degree of freedom. By combining components to provide a composite design, the entire radial flux of the lamp 2 may be captured for radial projection. The H/P ratio has been increased by adding a combination of refracting and/or reflecting surfaces in registration with the central apertures of the ring lens.

FIGS. 6 and 7 are an axonometric illustration and a plan view respectively of a segmented collimation ring. First and second ring lens segments 21 and 22 concentric with the axis 11 lie on selected arcs. These arcs may be symmetrical about the axis 11. Remaining segments around the source 2 are each subtended by a conventional lens 24 and 26. The lenses 24 and 26 may each be spherical, aspherical or a flat window. In this embodiment, distributed light from the lens ring segments 21 and 22 is radially collimated. The light from the lenses 24 and 26 is cylindrically collimated, and may be provided to lineal distribution means. Examples of improved lineal distribution are disclosed in my co-pending patent application Ser. No. 08/006,641 entitled Lineal Light Distribution, and now U.S. Pat. No. 5,676,457 issued Oct. 14, 1997, and my U.S. Pat. No. 5,046,805, granted Sep. 10, 1991 entitled Tapered Optical Waveguides for Uniform Energy (Light) Including Energy Bridging and U.S. Pat. No. 5,130,908 granted Jul. 14, 1992 and entitled Architectural Member Comprising Illumination System, the disclosures of which are incorporated herein by reference.

FIG. 8 is a plan view illustrating that a different number of segments of radial collimation means, here 21, 21a, 22 and 22a may be provided. In this embodiment, each round lens interspersed between two ring lens segments is truncated in order to achieve efficiency in terms of catching a majority of the radial flux. As further illustrated, one or,more refractive segments may be replaced with a reflector 28 directing radiant flux back through the quasi point source to amplify the lumen output of the refracting lens which is at an angular distance of 180 degrees from the reflector. The substitution may be done in ring sections or the common lens sections.

FIGS. 9, 10 and 11 are respectively an axonometric view partially broken away of another form of the collimator 10, a plan view in cross section taken along lines X—X of FIG. 9, and a cross section in elevation taken along lines XI—XI of FIG. 9. This embodiment is a further form based on the embodiment of FIG. 5. As in the embodiment of FIG. 5, the compound optical radial collimator 10 includes a collimating ring 12, and refracting ring 20 in order to capture substantially 100% of the radial flux of lamp 2. Additionally, part of the radiant flux could be collimated by one or more of the lenses 26 for lineal distribution by other means (not shown) as discussed above with respect to FIGS. 6, 7 and 8. In this embodiment, the ring lens 12 is not segmented. Instead, radial bores 30 are each formed extending through the ring section 12 to receive each lens 26. The lenses 26, which may be spherical or aspheric and preferably plano-convex, are each mounted in a bore 30 with its plane surface adjacent the inner diameter 14 of the ring 12. The diameter of each lens is selected preferably so that a small "f" number is provided for the lens portions of the collimator as well as the ring portions.

Figure 12:
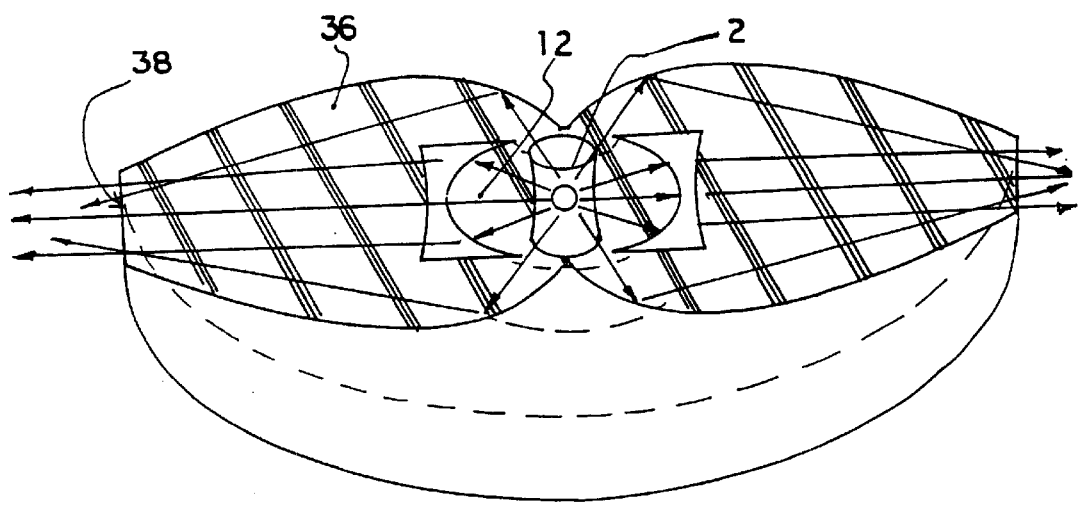
FIG. 12 is an axonometric view, partially broken away, of a system comprising an alternative form of containment optics.

Another type of collimator is illustrated in FIG. 12, which is an axonometric view broken away to show an elevation in cross-section. The embodiment of FIG. 12 may also be viewed as a further form of the embodiment of FIG. 5. A third element 36, which is a ring section 36, radially surrounds the rings 12 and 20 to receive the radiant flux projected therefrom and contain it in the axial dimension. In the embodiment of FIG. 12, the rings 12 20 and 36 are formed to be unitary. However, they may also be formed of discrete sections. The ring 36 has a taper so that as distance from the source 1 increases in the radial direction, thickness of the ring 36 decreases in an axial direction. In a preferred embodiment, the axial thickness of an exit aperture 38 is one third the axial thickness of the first ring 12. The axial thickness of the ring 36 is substantially less than the axial dimension of the first ring 12. This is done for the purpose of coupling light from a ring collimator 10 so that the ring 36 acts as containment optics, and the exit aperture 38 comprises distribution optics.

Figure 13:
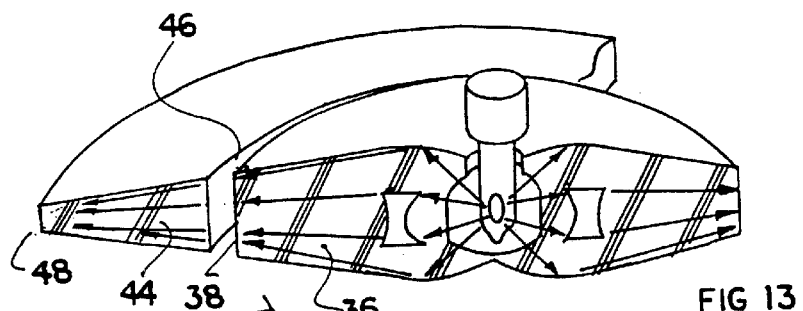
FIG. 13 is a view similar to FIG. 12 incorporating further containment optics in light distribution means.
Figure 14:
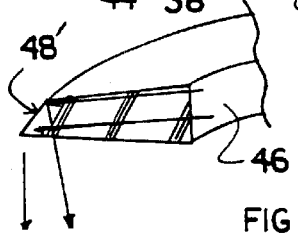
FIG. 14 is a partial, detail view of alternative light distribution means for use in the embodiment of FIG. 13.

The ring 36 may also be a conveyance means delivering light to further distribution optics. An example of this construction is illustrated in FIG. 13, which is an axonometric view partially broken away and illustrating a cross sectional elevation. The further distribution optics is an outer ring 44 having a radially inner surface 46 and an exit means comprising the face 48 from which light exits. Light leaving the conveyance means comprising the ring 36 leaves the exit aperture 38 and enters the ring 44 through the inner surface 46. The outer face 48 could be sand blasted or otherwise treated, as with hydrofluoric acid to provide diffused light. In another alternative form, upper and lower surfaces of the ring 44 may comprise optically modulating surfaces which allow light to leak out depending on its degree of collimation. The upper and lower surfaces may be formed to be specular in order to convey rather than diffuse light. In the embodiment of FIG. 14, which is a partial detail view, the exit means comprises a face 48' which is not perpendicular to exit light rays.

Figure 15:
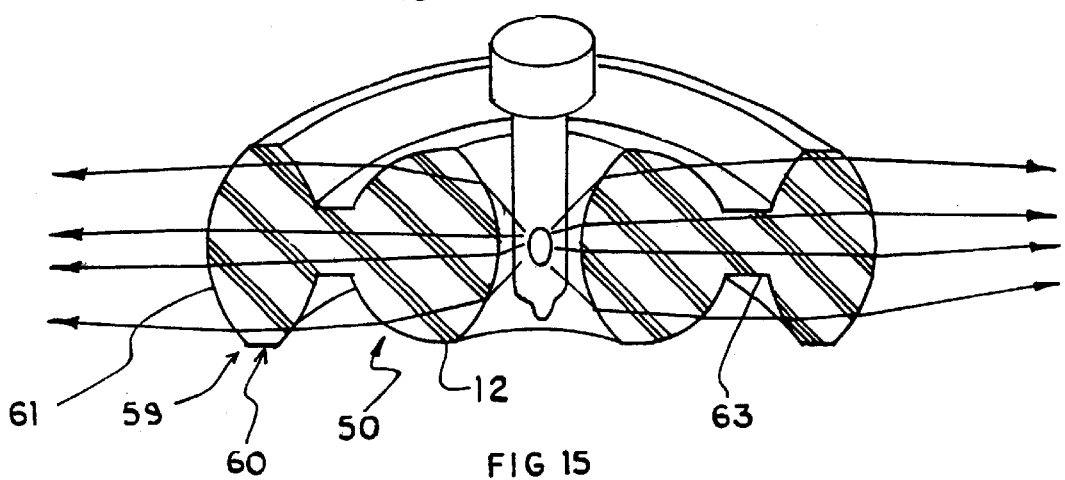

FIG. 15 is also an axonometric view broken away to illustrate an elevation in cross section. Another form 50 of ring collimator 10 includes a collimation ring section 12 that is spherical or aspheric and a distribution optics 59 comprising a lens ring 60 that is concentric with the collimation ring 12. The secondary ring 60 has a convex or bi-convex section and acts as containment means and has a radially outer exit aperture 61. The first and second rings 12 and 60 are joined by a radially extending, annular bridge portion 63 having substantially the same index of refraction. The bridge 63 utilizes light that is already parallel (collimated) and provides for direct transmission with substantially no losses at the transition interfaces to and from ring members 12 and 60. The bridge 63 is a component providing structural and optical connection between adjacent rings. The bridge section 63 need have no minimum radial length. The bridging may be done with an axially central portion which also forms the axially central portions of the other light distributing components.

The use of concentric rings 12 and 60 minimizes divergence of the radial beam. This operation is superior operation compared to that provided by the use of compound lenses for collimating. It known that the use of compound lenses is a prior art alternative for the purpose of minimizing divergence. However, compound lenses are often inefficient due to reflective and refractive losses at each of many surfaces. In accordance with the present invention, divergence is minimized while transmission losses are also minimized. The lens rings 12 and 60 are of substantially equal axial dimensions and spaced a radial distance apart so that light is contained in the axial dimension. Therefore, efficiency is maintained in that substantially all the radiant flux of the lamp 2 is directed to the exit aperture 61 while the axial dimension of the light distribution system is minimized.

FIG. 16 represents an embodiment formed with an additional outer ring 66 that is unitary with the collimator 50. Light from the source enters a convex surface at the inner face 14' of the inner ring 12. The entrance means 14' at the inner diameter of the ring collimator 50 may be a combination of concave and convex surfaces.

The embodiment of FIG. 17, a partial detail view, may provide for a higher degree of radial collimation due to the formation of the entrance means 14". The bridging may be done with an axially central portion 63 also forming the axially central portions of the other light distributing components.

FIG. 18 is an axonometric view of another form of light distributing ring in with an outer ring 66'. An annular disc 64 projects radially in registration which the position of the bridge portion 63. An exit aperture 38' has surfaces comprising a portion of the distribution optics. Projecting from either side of the disc 64 are prism rings 65 which are concentric and of varying diameter for intercepting radially directed light from the collimator 50 and directing the light away from the distribution means. The bridge portion 63 may be viewed as being eliminated or as having a zero length. The containment optics includes the bridge 63 and disc 64 and the second lens ring 60.

FIG. 19 illustrates an embodiment in which a ring element 66' is provided which is also unitary with the collimation optics 50. A first and a second wedge element 67a and 67b may each diverge from a base 73 comprising an entrance aperture at a radially inner end of the ring 66'. The wedge elements 67a and 67b have radial exit apertures 68a and 68b respectively. The substantial majority of radially collimated light is directed for distribution and is split into two parallel, radial discs. It is possible to optically feed a plurality of parallel plates, here, first and second plates 70a and 70b, which will be light conveyors, distributors, and/or distribution optics, depending on how they are used. The plates 70a and 70b each have radially inner surface extending in an axial degree of freedom comprising an entrance aperture 71a and 71b respectively in registration with the exit apertures 68a and 68b from containment means. The ring 66' is a light dividing containment ring with both the entrance aperture 73 and bridge 63 providing inputs.

Figure 20:
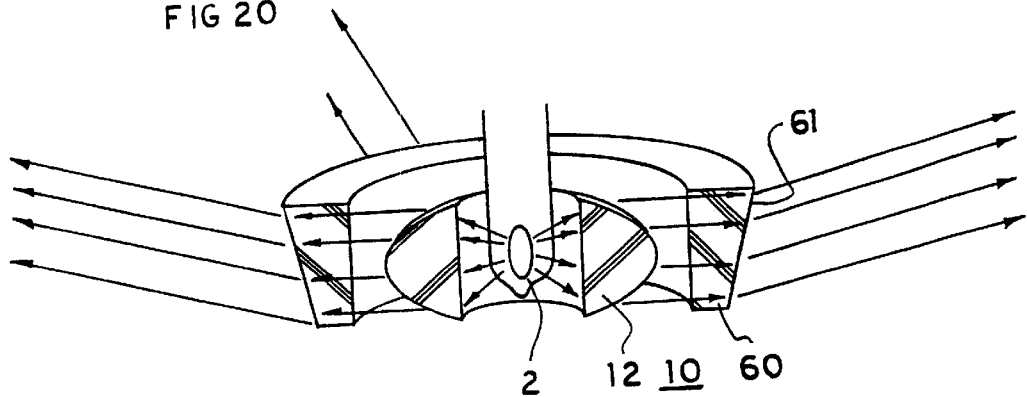
FIG. 20 is an axonometric view with diametric cross section of a compact system suited for distributing light on a surface for secondary illumination.
Figure 21:
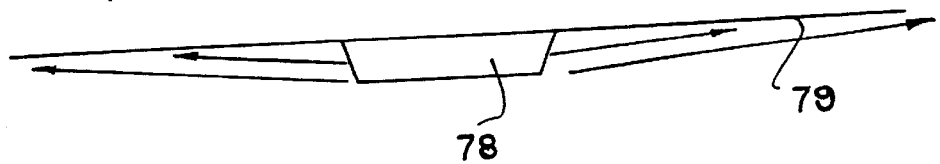
FIG. 21 is an elevation of the embodiment of FIG. 20 installed to an architectural surface.

In FIG. 20, another axonometric view, broken away to show a cross section at a diameter, the secondary ring 60 has an outer refracting surface 61. The smallest variation in the angled refracting surface 61 has an inordinate effect on the divergence of the distributed light. The wedge shaped optics ring 60 redirects the light it receives from a radial direction toward an adjacent architectural surface, resulting in a radial pattern of indirect illumination. The embodiment of FIG. 20 shows that space may be indirectly lighted by a radial collimator mounted within a refractive wedge ring to redirect the radial beam into a Belleville washer shape of selected thickness. This shape can also be described as a conical cylinder or a solid of revolution derived from rotating a parallelogram around an axis. The light is delivered to a ceiling, wall or other surface for indirect distribution. Prior art fixtures must be displaced from a ceiling in order to "wash" the surface with light. The present invention, as illustrated in FIG. 21, which is an elevation, permits a fixture 78 incorporating the system 10 to be flush with a ceiling 79. The lamp 2 may be mounted so that it is not visible in use. Glare is thus reduced compared to incandescent or fluorescent lamps.

In the embodiment of FIG. 22, an axonometric view partially broken away, the distribution optics 59 comprises reflective means. Co-axially mounted annular plates 74, in the present forms, two plates 74a and 74b intercept light transmitted from the lens ring 12 for further distribution.

FIG. 23 is a cross sectional elevation of an embodiment wherein the distribution optics 59 comprises a triangular prism ring 80. Either an aspherical or a composite radial collimator ring lens 12 may be used. The system 10 is mounted in a shallow cylindrical fixture 85 having an upper surface 86 having a reflective inner surface 88 extending radially around the source 1 and positioned axially immediately above the prism ring 80. In FIG. 23, the prism ring 80 has a surface 89 directing light to an exit aperture 90, which is flat. FIGS. 23A and 23B each respectively illustrate exit apertures 90' and 90" which are concave and convex. This device substitutes for what would normally be consider a down-light. A down-light generally provides a single cone of light.

FIG. 24 illustrates in axonometric form the embodiment of FIG. 23 with the upper surface 86 removed. Radially disposed structural ribs 93 are mounted on the upper surface of a transmissive architectural member, which may be a transparent ceiling panel 94. The panel 94 acts as containment optics and includes exit aperture means. Containment optics limit divergence in the axial direction.

The containment optics may be a hollow chamber with internally reflecting surfaces or a solid member utilizing total internal reflection. Containment optics may end at an entrance aperture of distribution optics to provide for optical functioning of the system and to provide for mechanical connection of the collimation and distribution optics. The containment means may extend radially beyond the distribution optics, for example to form a shape such as serving as an architectural member.

Figure 25:
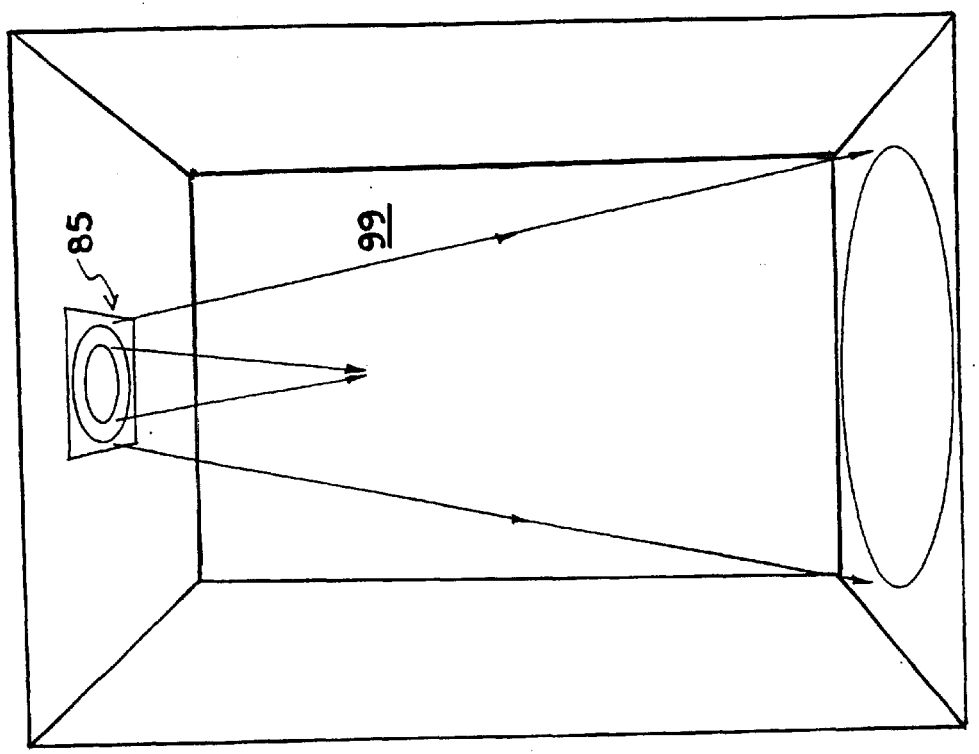
FIG. 25 is a perspective view illustrating an embodiment according to either of FIGS. 23 or 24 in use.

As seen in FIG. 25, a perspective view of a room 99 incorporating the embodiment of FIG. 23 or 24, the resulting light distribution is in the form of a cylinder whose walls are diverging. Rather than forming a single cone as in a downlight, the resulting pattern is the integral of wedges each originating at a point on the refracting ring. The distribution here is in the form of a cylinder of walls of increasing thickness with distance from the modulation means. The section is a triangle. The divergence of the cylindrical wall thickness of the triangular walls of the illumination pattern is controlled by the internally reflective surface 88 in the distribution optics 59. FIG. 25 shows a potential photometric distribution of this optical combination in perspective. Photometrics could be shown in the form of geometry or brightness of the beam at different location at varying distances from the source and varying in position across the beam. A down-light has a focal point plus light spread from uncaptured rays.

The illumination in FIG. 25 comprises the above-described shape of a cylinder with walls diverging at an outer diameter and converging at an inner diameter. This shape may also be explained as a truncated cone. A second cone projects downwardly from the plane at which the first cone is truncated. That second cone has no light in it. Coverage is dependent on the rate of divergence of light leaving the secondary optic. Floor coverage will vary also vary with the shape of the exit means 90 as illustrated in FIGS. 23A and 23B. The f number of the radially collimating portion and the conventional lens portions are substantially equal. Consequently, efficiency in capturing light from the source is achieved. Such an apparatus functions to distribute radially collimated light for modulation as described below. Conventionally collimated light from the lenses is distributed for a second and diverse type of illumination. This type of illumination may be in the form of a projected spotlight or in the form of lineally divergent ring of illumination. The divergence between the cylinder walls may be controlled by changing or by making any or all of the surfaces of the secondary prism ring convex, concave or a combination of both.

Figure 26:
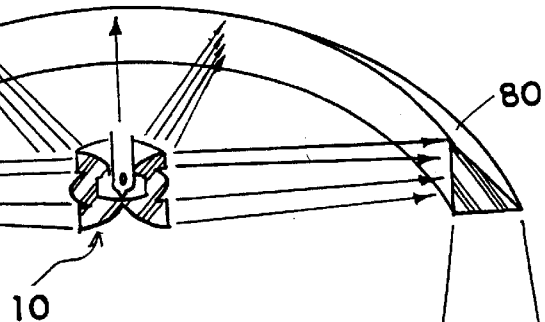
FIG. 26 is an axonometric view with a diametric cross section illustrating a system similar to that of FIG. 23 which utilizes a collimation optics of FIG. 5.

The embodiment illustrated in FIG. 26, which is an axonometric view broken away along a diameter, illustrates an embodiment similar to that of FIG. 24, but wherein the collimation optics 10 comprises compound collimation means as in the embodiment of FIG. 5.

FIGS. 27 and 28 illustrate in cross sectional and axonometric form, respectively, a further form of distribution means in which the secondary optical ring of the distribution optics 59 may be geometrically segmented into segments 100 and 102. The segments 100 and 102 of the ring of distribution optics 59 may continuously surround the radial collimator 12 while the segments 100 lie on a first concentric circle, and the segments 102 lie on another concentric circle. Segments in differing concentric bands may be used to provide different rates of divergence. For example, the outer ring segments 102 may have a concave exit aperture as seen in cross-section in FIG. 29a to provide a more rapid rate of divergence. The inner ring segments 100 may have a convex exit aperture 90" as seen in cross-section in FIG. 29b to provide a more concentrated illumination on the opposing surface at which the light strikes.

Figure 32:
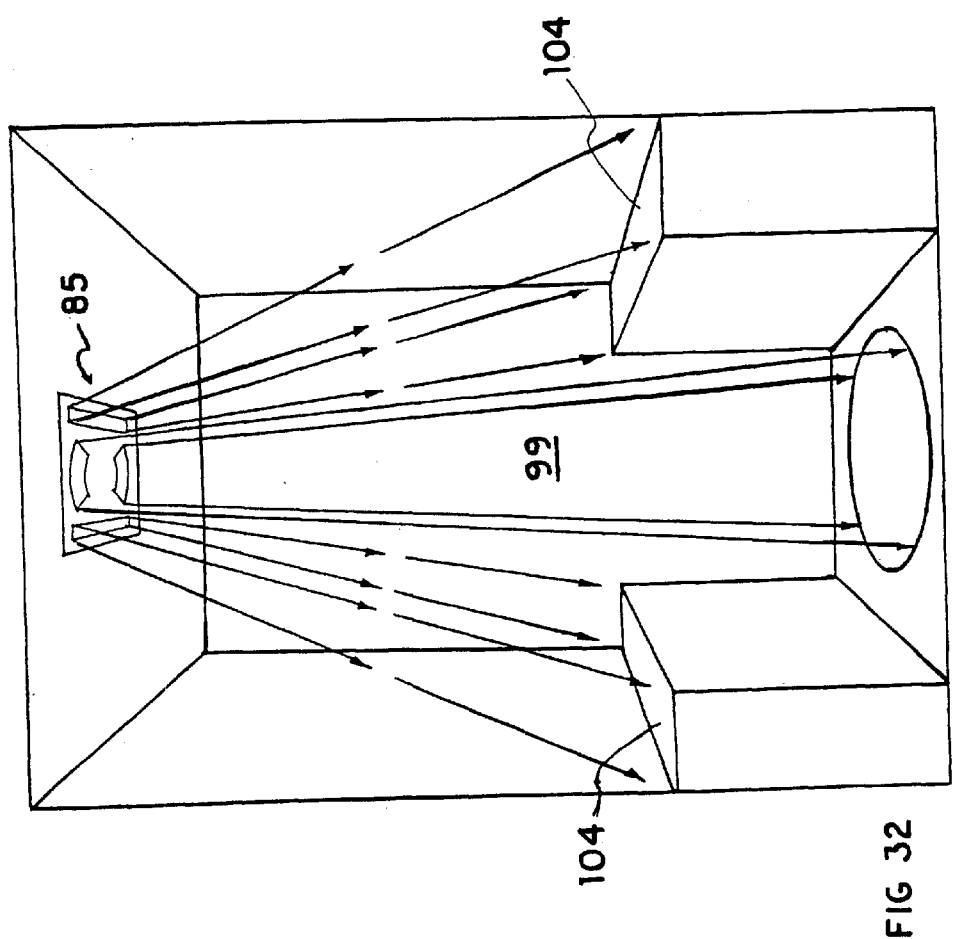
FIG. 32 is a perspective view illustrating an embodiment according to either of FIGS. 30 and 31 in use.

FIGS. 30 and 31 are a cross-sectional elevation and an axonometric view of another form of system with segmented distribution optics suitable for installation to an architectural panel. FIG. 32 is a perspective view illustrating an embodiment according to either of FIGS. 30 and 31 in use. In the embodiments of FIGS. 30 through 32, outer segments 102' are non-concentric. They are straight. This embodiment is suited for redistributing light for specific tasks. In FIG. 32, one such specific task is illustrated. It is desired to illuminate the center of the room 99 as well as to direct illumination to two opposed work surfaces 104 in the form of lineal bands of light rather than cones. In this case, light is shaped, or contoured to fit the surface onto which it is projected.

In FIG. 33, which is a partial detail view of an alternative form of distribution optics 59, the radially inner surfaces of the distribution optics may be faceted, resolved into facets 105, each subtending a selected angular extent and each at a selected angle to the vertical, to further shape the resulting light pattern. Such facets will prevent sideways light scattering. Facets provide surfaces perpendicular to incident light so that the face angle of the prism is relatively perpendicular to the radially collimated light. In this manner, the angle of incidence is minimized. The distribution optics further aid the shaping of the lineal light pattern.

FIGS. 34 and 35 are a cross-sectional elevation and an axonometric view of another form of system with multiple, concentric distribution optics members of differing axial dimensions suitable for installation to an architectural panel 94, which, in part, contains the light within the axial dimensions. FIG. 36 is a perspective view illustrating an embodiment according to either of FIGS. 34 and 35 in use. In FIGS. 34 and 35, a combination of features of FIG. 20 and FIG. 22 is used. The light from the radial collimator 10 is, in effect, divided in an axial direction and directed toward two secondary optical rings 106 and 108 comprising the distribution optics 59 and intercepting a differing portion of the axial extent of the radial collimated light. The ring 106 has a canted outer surface 107 to create a canted disc as in FIG. 20, while the ring 108 has an internally reflective surface 109 formed to create a cone, as in the embodiment of FIG. 24. The illumination directed from the outer ring 106 will be indirect since it will foreseeably hit an adjacent architectural surface prior to illuminating persons or things in a room. In FIG. 36, both direct and indirect illumination of the area beneath the lighting panel is provided. A radially extending plate 105 may be placed against the axially inward surface of the ring 108 so as to further comprise segmented containment means.

FIGS. 37 and 38 are a cross-sectional elevation and an axonometric view, partially broken away, of another form of system with reflective distribution optics members. FIG. 39 is a partial detail view illustrating alternative exit means for the light distribution means of FIG. 37. In FIG. 37, the radial illumination from the collimator 10 is further controlled by reflective discs 110 and 112 which comprise a fixture containing the light distribution system. The disc 110 forms a shallow cone intermediate the collimation optics 12 and the distribution optics 59 and acts as light containment means which reflects incident light to the distribution optics 59. The disc 112 surrounds and further concentrates the light in the distribution optics 59, in this case on to a reflective ring comprising the inner surface 113 of the disc 112. The reflective ring may or may not be constructed as part of the shallow reflective cone. As seen in FIGS. 37 and 38, light is modulated by reflectors rather than refractors. In FIG. 39, a straight, canted reflective surface 113' is provided rather than a continuously curved surface.

FIGS. 40, 41, and 42 are each an axonometric view with diametric cross section of a separate embodiment of distribution optics containing multiple light directing elements. In FIGS. 40, 41 and 42, further forms of distribution optics 59 are illustrated. FIG. 40 shows axially stacked concentric refractive rings 120 of differing diameters. FIG. 41 shows a single, stepped refractive disc 124 which may be considered to be similar to a plurality of rings 120 formed unitarily with a common inner diameter. FIG. 42 shows a single stepped refractive disc 130 with successive internally reflective surfaces on alternate sides of an axial centerline. This fixture may be suspended as a pendant lighting fixture and project rings of divergent light towards a ceiling and towards a floor simultaneously. FIGS. 41 and 42 disclose solid containment means.

FIGS. 43 and 43A are a cross-sectional elevation and an axonometric view, partially broken away, of another form of system with shallow conical reflective means 140 which reflects light to distribution optics members comprising concentric prism rings 144. Light from the radial collimator 10 is divided in the axial dimension. One portion of the light is directed toward the reflective surface 142 of a shallow cone 140. The center prism ring catches a greater proportionate share of light from the radial collimator as shown.

Alternatively, concentric prism rings 144' may be provided having varying, successively increasing axial dimensions as in FIG. 44, a partial cross sectional illustration. The resulting illumination is in the form of concentric diverging rings.

FIG. 45 is a partial cross sectional detail illustrating an alternative to the embodiment of FIG. 43 in which light is refracted by a prism ring 152 rather being reflected to distribution optics for distribution.

Figure 46:
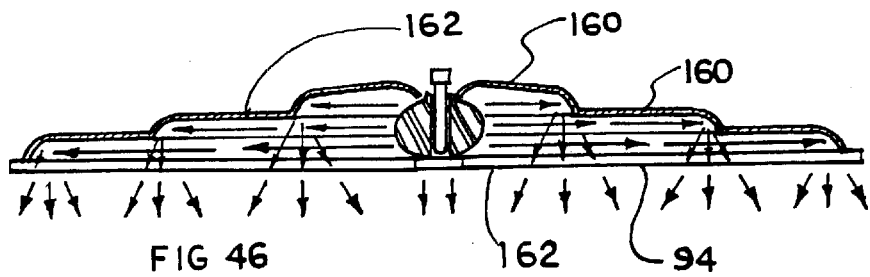
FIGS. 46 and 47 are a cross sectional elevation and an axonometric view of another form of system suitable for installation to an architectural panel with segmented reflective distribution optics.
Figure 47:
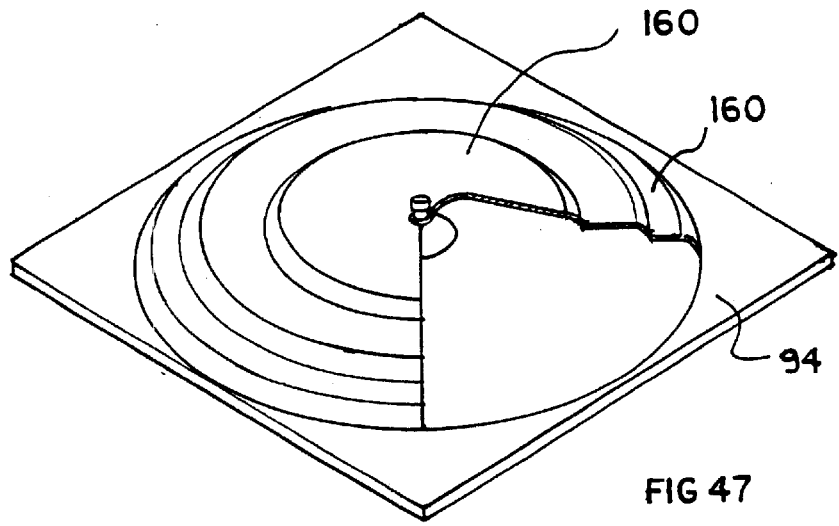

FIGS. 46 and 47 are a cross-sectional elevation and an axonometric view, partially broken away, of another form of system suitable for installation to an architectural panel with segmented reflective distribution optics. Concentrically disposed, axially displaced reflectors 160, each similar to the reflector cones 110 and 112 of the embodiment of FIG. 37. A central aperture of each succeedingly larger diameter reflector registers with the outer diameter of the preceding reflector. Parallel axially displaced, radially disposed plates 162 comprises segmented containment optics surrounding the collimation means.

Figure 48:
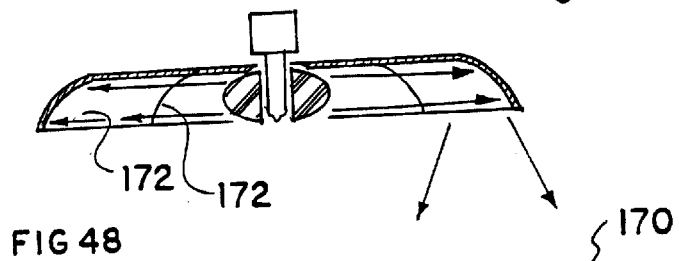
FIGS. 48 and 49 are a cross sectional elevation and an axonometric view of another form of system suitable for installation to an architectural panel with segmented reflective distribution optics wherein shadow eliminating light patterns are provided.
Figure 49:
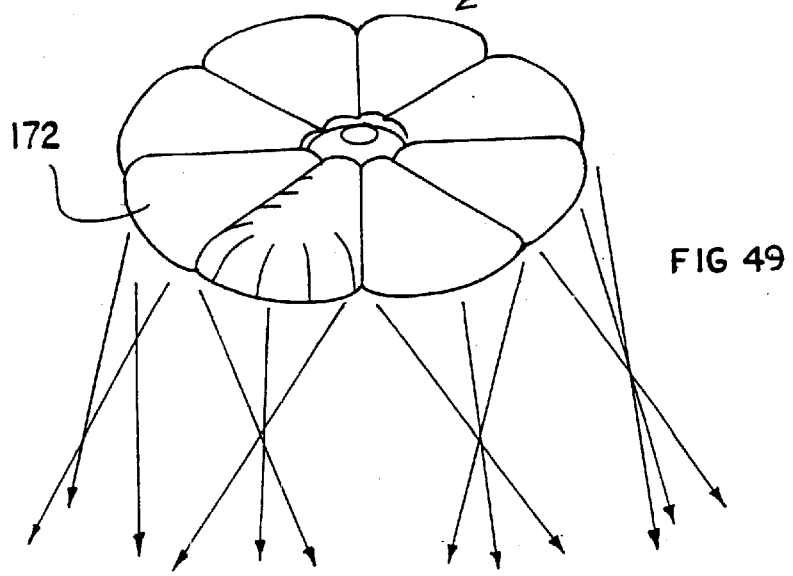

FIGS. 48 and 49 are a cross-sectional elevation and an axonometric view of another form of system suitable for installation to an architectural panel 94 (for example, of the type disclosed in FIGS. 23 and 24) with segmented reflective distribution optics wherein shadow eliminating light patterns are provided. In the embodiment of FIGS. 48 and 49, the light is redirected as to form overlapping shapes on a preselected surface. A reflective disc 170 is divided into sectors each subtending a preselected arc surrounding the source. In the present embodiment, each disc segment subtends 45 degrees, and the segments resemble a chrysanthemum pattern. Reflecting surfaces 172 at each exit aperture segment and redirect light to form a ring of overlapping shape. Light directed from exit apertures defines a ring of overlapping shapes, This overlapping illumination reduces shadowing since light is directed toward a given position from a number of angles.

FIG. 50 is a perspective view from above a section of ceiling which may comprise a lighting panel 180 which is transparent, translucent or opaque with light transmitting apertures. The panel 180 acts as an architectural integrator and an optical alignment device. The panel is also the supporting structural element for light distribution means. The light distribution means includes a collimator 10. In the embodiment of FIG. 50, the collimator is of the segmented type described with respect to FIG. 6 above. Alternatively, the collimator of FIG. 9 can be used. In this embodiment utilizing the collimator of FIG. 6, radial collimation ring segments are concentrically aligned with ring modulating segments. Lens collimation means feed tubes 184, which direct collimated light to optical utilization means as described above. As illustrated in FIG. 51, the lighting panel may be included in a system as disclosed in my U.S. Pat. No. 5,130,908. In these embodiments containment means are shaped to match the output from collimation means.

In the embodiments of FIGS. 52, 53 and 54, table lamps are illustrated. A radial collimator 10 is mounted to a central stand 200. A refracting or reflecting ring 202 is mounted concentrically with the collimator. A containment plate 201 surrounds the collimator 10 at an axial end thereof. In the embodiment of FIG. 52, the ring 202 provides for diffused, rapidly expanding radial light distribution. The ring section may be bi-convex, bi-concave, circular or be of a thin band of diffusion material. Diffusion material could be fabric or ground glass. Other ring structures could contain beaded or prismatic glass for refraction.

FIG. 53 utilizes a prismatic ring 202' for up-lights. The embodiment of FIG. 54 includes a composite ring 202" having first and second ring members 203 and 204 surrounding the collimator and axially adjacent, i.e. as seen in FIG. 54, one is on top of the other. Both up-lighting and down-lighting are provided. It is within the teachings of the present invention to provide any combination of selected ring members, each for its purpose as described above.

In the embodiment of FIG. 55, the central collimator 10 is modified to provide multiple collimation. FIG. 56 is a detailed view, partially broken away to illustrate radial bores 19 which each receive a lens 18. As in the embodiment of FIGS. 9–11, conventional collimation is provided from each lens, while radial collimation is provided from the remainder of the collimator. As seen in FIG. 55, each lens 18 feeds a containment means, which may be a tube 210, having utilization means 214 coupled thereto. The utilization means 214 may comprise a sphere containing a mirror lens combination.

Another generalized form of the present invention is particularly suited for lighting spaces exterior to automobiles as well as interior architectural spaces. FIG. 57 is an axonometric view of an embodiment in which distribution optics comprises a parabolic or ellipsoidal reflector, which may have a flat, spherical or aspherical surface in the axial, or vertical, dimension; FIG. 58 is a plan view of an embodiment in which the collimator in collimation optics is modified to provide conventional collimation within the segment which is not reflected; FIG. 59 is a cross sectional plan view of an embodiment in which a reflector intercepts and redirects forwardly directed radially collimated light; FIG. 60 is a cross sectional plan view of a system including a horizontally disposed lamp providing radiant energy; and FIG. 61 is an axonometric illustration of a system including a solid block of refracting material in the distribution optics portion is formed.

In the embodiment of FIG. 57, a single element or multi-element radial collimator 10 may be used. The cylinder of light produced by the collimator is directed toward a parabolic or ellipsoidal reflector 240, which may have a flat, spherical or aspherical surface in the axial, or vertical, dimension. The reflected rays form a collimated beam whose cross-section is in the from of a rectangle and which is collimated in one direction parallel to a radius. The transverse dimension is in substantially constant proportion to the axial dimension. The non-reflected rays which leave the radial collimator 10 provide for illumination angularly displaced from the selected radius. The extent of angular coverage can be determined by the extent of the reflector. In the operation of this embodiment, the radial disc projection is altered by the distribution optics, the reflector, from a 360 degree pattern to a pattern that is unidirectional in a selected planar degree of freedom. Such a construction may be utilized to produce automobile headlights. Such headlights have the advantage of being thin in the axial direction, giving flexibility to designers of auto body sections incorporating headlights. Also, radiant energy is directed in a direction in which it is needed. Axial divergence can be provided for if desired by altering the reflective surface to the convex or concave.

FIG. 58 illustrates an embodiment in which the collimator 10 is modified to provide conventional collimation within the segment which is not reflected. A lens 250 replaces a selected angular extent of the collimator ring 12. In the embodiment of FIG. 59. a reflector 254 intercepts and redirects the radiant disc of light which has not been directed toward the reflective surface 240. In some cases, it will be desirable to reflect all light rather than mixing reflected and directly transmitted light. The reflector 254 puts light back through the radial collimator 10 so that all light can be collimated in the direction of illumination.

The embodiment of FIG. 60 provides for a horizontally disposed lamp 2. The axis of the lamp can be in the same plane as the radiant energy. The generalized collimator 10 takes the form of a collimator 260 which is segmented or bored to permit insertion of the metal halide lamp 2. FIG. 61 is an illustration of a refractor 266, which is a solid block of refracting material: A front face 268 of the refractor may be shaped as an exit aperture. The reflector 240 may be embodied in a rear surface of the refractor 266. This structure may be suited for use with a metal halide lamp.

FIGS. 62 and 63 are, respectively, an axonometric and a plan illustration of embodiments corresponding to FIGS. 57 and 58, respectively, and further including means for bi-directional transmission in a given planar degree of freedom. Reflector means 280 (FIG. 62) are provided for bidirectional transmission in a given planar degree of freedom. The radial collimator 10 is placed at a focal point of overlaid, intersecting parabolic or ellipsoidal reflectors 281 and 282 (FIGS. 62 and 63). The intersecting portions of the reflectors are removed, and the radial collimator 10 is mounted in the central portion of that intersection.

FIG. 64 is an axonometric illustration of an embodiment which can be contained in the envelope of a rectangular parallelepiped, a shelf 300. This may take the form, for example, of an illuminated shelving system or lighting system to illuminate paintings on a wall. The shelf 300 comprises a member defining the envelope of a three dimensional solid. In the embodiment illustrated in FIG. 64, multiple lamps are provided. The shelf comprises a rectangular solid having a rectangular projection in plan and in a first side view, and a trapezoidal cross section in an orthogonal transverse degree of freedom.

In FIG. 64, a first radial collimator 10 directs light to an internally embedded parabolic surface 310. The reflector 310 is positioned so that rays reflected from the parabolic surface 310 leave directly perpendicularly to exit means 302. A second radial collimator 10a is provided which directs light to a reflective back surface 320.

The embodiment of FIG. 65 shows a form of exit means which provides for lineal distribution from a convex exit face 302, and which may be used with the embodiment of FIG. 64.

FIG. 66 is another form of exit means showing a detailed view of the embodiment of FIG. 64 for directing light downwardly from an exit face 302'.

In FIG. 67, exit means 302" comprises a refractor by which light is refracted both upwardly and downwardly. As taught in the present specification, the exit means 302 may take any one of a number of different forms.

Alternatively, as seen in FIG. 68, continuous contours may be used to shape the boundary of the shelf 302. The shelf may be solid colored material or hollow with internally reflective surfaces. FIG. 68 is an alternate form of the embodiment of FIG. 64 in which it is shown that continuous contours may be used to shape the boundary of the distribution optics and exit means.

Reflected rays are incident on the exit means at each of a number of angles. Again, in accordance with the present invention, the two collimators could take differing forms such as described above. The reflectors may also each be selected to a given performance.

FIG. 69 is an axonometric view, partially broken away, wherein distribution optics 59 comprises a shaped, axially extending band 326 surrounding the radial collimation means 10. In the embodiment of FIG. 69, a shaped, axially extending band surrounds the radial collimation means. The band 326 in the illustrated form has an intersection with a plane lying in the radial degree of freedom comprising an eight pointed star. This embodiment has utility in providing an illuminated shape. Legs 327 of the star are formed by rectangles which are parallel to the axis. The legs 327 forming the illuminated shape may be sandwiched between parallel, axially displaced transparent circular plates 330. Consequently, light diffusing materials may be used which do not have the structural strength to maintain their disposition without support. The shapes formed by this material, which may be diffracting or diffusing, may be symmetrical or asymmetrical or may form the contour of an organic shape. Means (not shown) may also be provided for selected or continuous changing of the shape.

FIGS. 70 and 71 are a cross-sectional elevation and an axonometric view, partially broken away, of another form of system suitable for installation to an architectural member comprising a ceiling panel. A collimation optics means 10 is housed in a box 340 which may comprise an architectural member or a lighting fixture. Light distribution means may comprise various means described above. These may include an upper surface 344 axially above the collimation optics 10 which scatters light, a reflective surface 346 operating in a manner similar to exit means 113 in FIG. 37 above, reflective vertical surfaces 350 and an axially lower diffusing plate 360. Also, prisms 332 may be provided within box 340 for directing light rays through diffusing plate 360 as shown at 334. In an experimental embodiment, this embodiment provided twice the light output with one fifth the energy input as prior art embodiments utilizing fluorescent tubes. Even illumination is provided on the plate 360. It may be used as an artificial skylight.

The embodiments of FIGS. 72 through 75 illustrate that light can be combined from two quasi point sources. Metal halide light can be quite cool. By combining sources, the intensity of metal halide light can be combined with warmer wavelengths of an incandescent source. Alternatively, particularly as seen in FIG. 75, light can be delivered from a lineal light distribution means such as is described in my above cited co-pending application. Even solar illumination may be piped in and combined with light from the lamp 2.

FIGS. 72 and 73 are an axonometric view partially broken away and a cross-sectional view of an embodiment similar to that of FIGS. 23 and 24. A collimating lens assembly 401 comprising a lens ring 12 and a lens ring 400 coaxially mounted and both fitting within the axial extent of containment optics. A metal halide source is centered within the lens ring 12, and an incandescent source 2' is centered within the lens ring 400. Light is mixed at the internally reflecting face 89.

Figure 74:
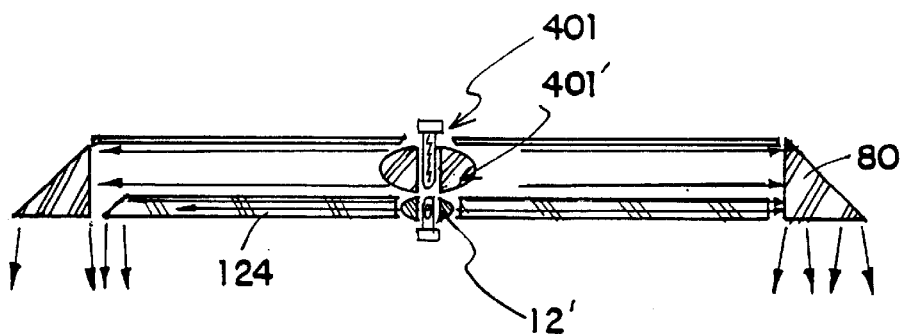

In the embodiment of FIG. 74, also a cross section, lens rings 400' and 12' have differing axial dimensions but have the same overall combined axial dimension as the lens rings 400 and 12. Additionally, a containment and distribution ring 405 may surround one lens ring, such as lens ring 12' and operate in a manner similar to a ring 124 in the embodiment of FIG. 41. Mixing takes place in the illuminated volume.

In the embodiment of FIG. 75, also an axonometric view broken away, the source 2' and lens ring 400 are replaced by a source distributor 420 which fits in the envelope of a lens ring. A central conical reflector 426 receives a light input from lineal light distribution means as described in my above-cited application relating to lineal light distribution. The conical reflector 426 is equivalent to a quasi point source and ring collimator in that the source distributor 420 can provide a radially collimated disc of light like that provided by a quasi point source. Operation proceeds as in the embodiment of FIGS. 72 and 73. Many forms of lighting may be combined in this manner.

Figure 76A:
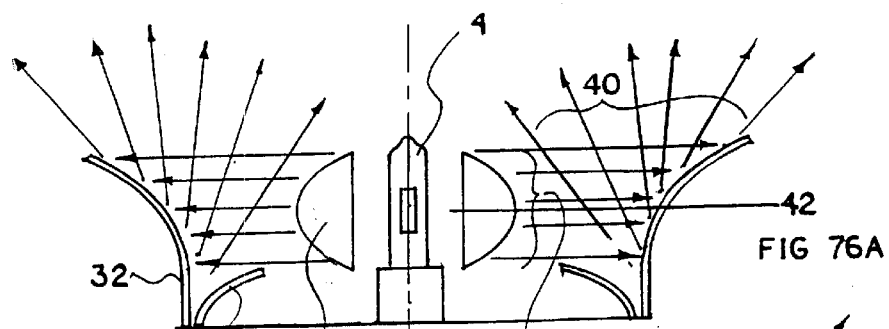
FIG. 76A is a cross-sectional view of an embodiment of the present invention showing a circular luminarie with the parts positioned for mono-directional lighting.
Figure 76B:
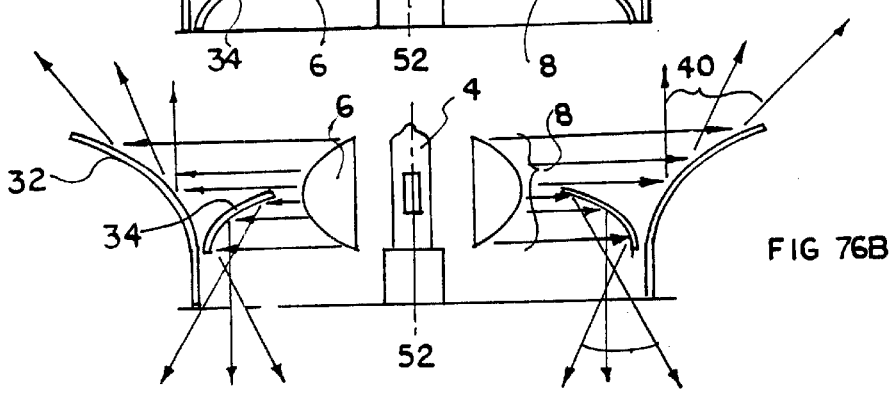
FIG. 76B is a cross-sectional view of the circular luminaire of FIG. 76A with the parts positioned for bi-directional light.

As used in the claims and in this specification, light direction changing means includes both reflectors and refractors, as well as any other arrangements which changes the direction of light. FIGS. 76A and 76B show a ring (circular) luminaire or torchiere having components and light paths therein. The lamp or light source 4 is surrounded by ring lens 6 which is similar to the lens 12 of the previously described embodiments which produces a radially collimated beam 8 and projects it toward the primary reflector 32 which surrounds the light source and forms reflected beam 40. It should be noted that the radially collimated beam 8 would contain rays which are expanding along the radiating axis 42. This expansion of rays requires the height of the primary reflector 32 to be greater than that of the ring lens 6. Interception of the radially collimated beam 8 by the primary reflector 32 is shown in FIGS. 76A and 76B.

FIG. 82, with a system that includes a means of containment of the beam 8, allowing for a reduced height in the primary reflector 32. The curvature of primary reflector 32 controls the axial expansion of reflected beam 40. In one possible configuration, this curvature would produce a cross-section of the reflected beam 40 so as to provide evenly distributed illumination over a broad area of the ceiling above the luminaire.

In FIG. 76A the secondary reflector 34 is not in a position to intercept the radially collimated beam 8. In FIG. 76B, secondary reflector 34 has been shifted along central axis 52 so that it intercepts radially collimated beam 8, with reflected rays of beam 8 forming reflected beam 54 which reflects downwardly. At the same time the collimated light is reflected upwardly by the primary reflector.

Figure 77A:
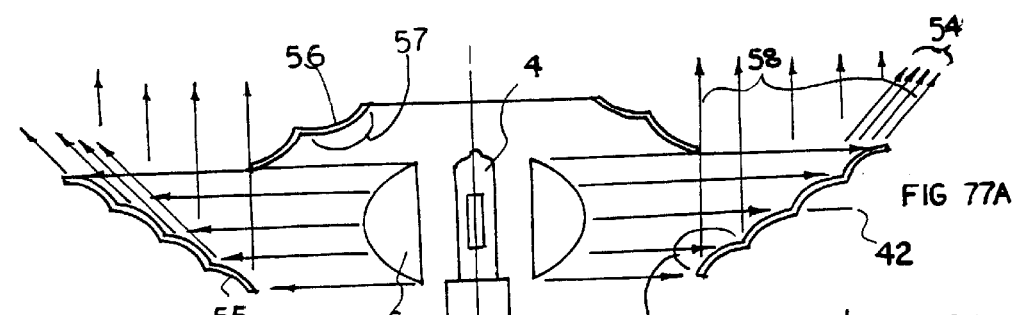
FIG. 77A is a cross-sectional view of a circular luminaire (similar to the one shown in FIG. 76) with a variation in the cross-sections of the reflectors and showing the parts positioned for mono-directional lighting.
Figure 77B:
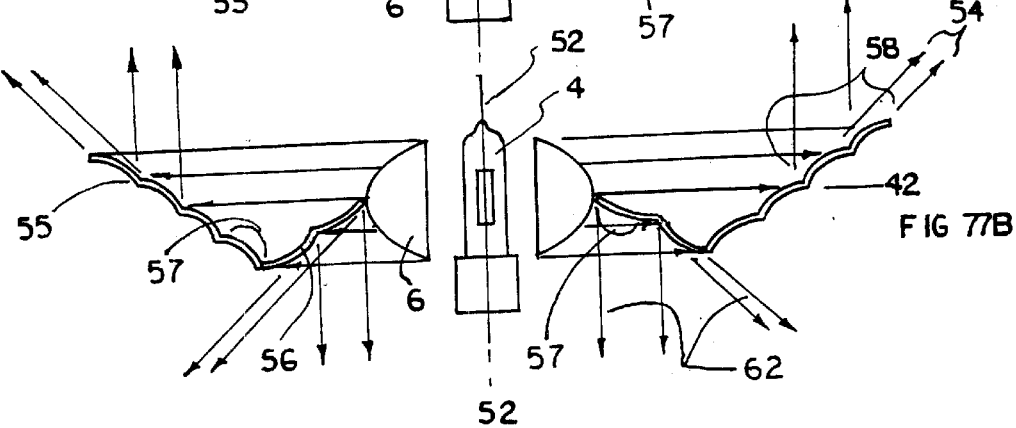
FIG. 77B is a cross-sectional view of the circular luminarie of FIG. 77A with the parts positioned for bi-directional lighting.

FIGS. 77A and 77B are crossectional views of a ring (circular) luminaire or torchiere showing components and light paths therein. The function of the system shown is similar to that of the system shown in FIGS. 76A and 76B, yet differ in the following description.

The reflective surface of the primary and secondary reflectors 55 and 56, respectively, in FIGS. 77A and 77B are radially segmented, with each ring segment 57 reflecting a similar beam pattern. As secondary reflector 56 is shifted along central axis 52, intercepting varying portions of radially collimated beam 8, the overall light distribution patterns within reflected beam 58 remain the same as they do in reflected beam 54, with a change in the ratio of brightness 58 and 54.

Note that in FIG. 77A, secondary reflector 56 is shown on the wide side of primary reflector 55. It may also be situated on the narrow side of 55 when not intercepting radially collimated beam 8.

FIG. 78A is an isometric view of a luminaire or torchiere containing elements for variably dividing light into bidirectional paths. The lamp 4 is surrounded by a ring lens 68 which is segmented into spherical or aspherical sections, each section projecting an individual beam.

In FIG. 78A, ring lens 68 is divided into 8 segments, while FIGS. 78B, 78C and 78D show 68 in 4 segments for simpler graphic depiction of principles, although any number of segments may be used. Individual radial beams 70 are projected toward segmented secondary reflector 72 from the ring lens 68. As shown in FIG. 78A the secondary reflector 72 is in a position which allows beams to pass through the openings 76 therein. While the rays from the ring lens 68 are generally designated 70, in FIG. 78A the upper ones are shown as 241 and the lower ones as 242, and there are many other rays in between. The upper ones 241 reach primary reflector 243 at a longer radius thereon and produce reflected beams 244, while the lower ones reach primary reflector 243 at a shorter radius thereon and produce reflected beams 245. If segmented secondary reflector 72 is rotated to be in a rotated orientation as shown in FIG. 78B, beams 70 will be reflected by segmented secondary reflector 72 away from the torchierre in the opposite direction from beams 244 and there will be no reflection of light of beams 70 from primary reflector 243. If segmented secondary reflector 72 is in a rotated position as shown in FIG. 78C, beams 70 will pass through the openings 76 in segmented reflector 72 and be reflected away from the luminaire within reflected beams 244, 245 (and when ribs 239 are used, also beams 235) (shown in FIG. 78A).

If secondary segmented reflector 72 is in a rotated orientation as in FIG. 78D, which allows some, but not all, the beams 70 from the ring lens to pass through, radial beams 70 will be proportionally divided by reflector 72 and one portion reflected upwardly by primary reflector 243, and the other portion will be reflected away from the torchierre in the opposite direction from beams 244.

The individual beams can be scattered as shown at 235 so all beams merge as diffused light on architectural surfaces. One way to accomplish this is shown using concave ribs 234 at selected radial positions where there are beams. See FIG. 76A at the left where there is no special scattering and the reflected beams are shown at 244 and 245, and rib 234 at the right where there are scattered rays or beams 235; this scattering means can be used when and where desired.

Figure 79A:
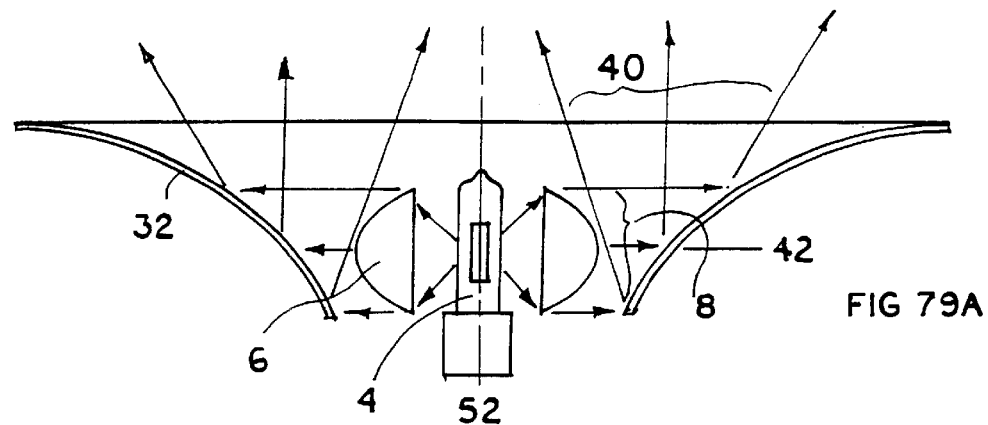
FIG. 79A is a cross-sectional view of a luminaire whose components are positioned for one type of cross-sectional brightness of the projected light emanating from the luminarie lighting.
Figure 79B:
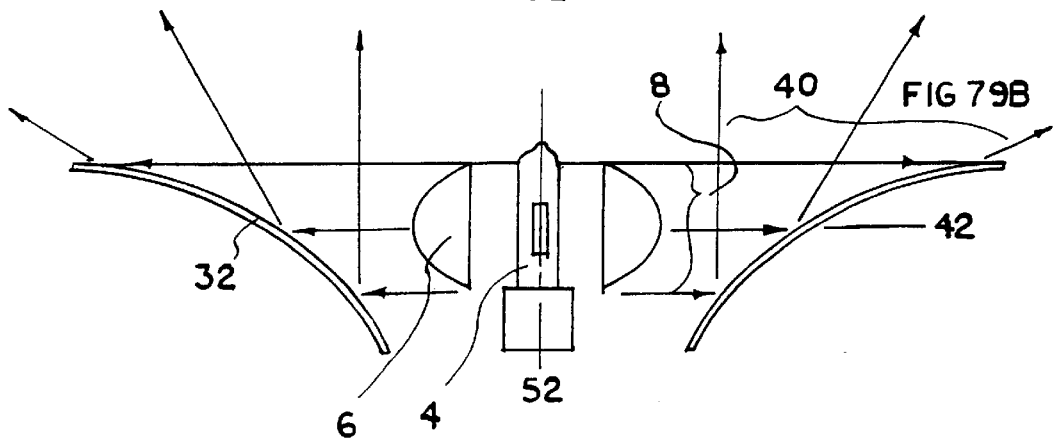
FIG. 79B is a cross-sectional view of the luminaire of FIG. 79A whose components are positioned for another type of cross-sectional brightness of the projected light.

FIGS. 79A and 79B are cross-sectional views of a circular luminaire or torchiere, the components of which are designed to variably alter the cross-sectional brightness and angle of radial dispersion (the angle changes the higher the rays are on the reflector) on an architectural surface. The components and their functions are as follows: The light source 4 is surrounded by a ring lens 6 which produces a radially collimated beam 8 and projects it toward the primary reflector 32. As shown in FIG. 79A the beam is reflected from the lower portion of the reflector 32 and the light rays are reflected in the pattern 40 shown in FIG. 79A which includes rays which converge above the light source 4. The light source 4 is connected with ring lens 6 to move vertically along axis 52. When light source 4, together with the ring lens 6, is shifted along central axis 52, the radially collimated beam 8 strikes a different part of the curvature of primary reflector 32, resulting in a change of the reflected beam shown as 40 in FIG. 79A to be as shown at 40' in FIG. 79B, and there are no converging rays above the light source.

FIGS. 80A and 80B show a variation of the luminaire or torchiere depicted in FIGS. 79A and 79B. Thus, it too is the type in which the light source and the ring lens move vertically with respect to the reflector. Primary reflector 82 is comprised of radial reflecting sections 84 and 92. When radially collimated beam 8 is shifted along axis 52, all light from ring lens 6 may be reflected as reflected beam 40 or reflected beam 40' or divided proportionally between 40 and 40' depending upon the position of the collimated beam along the curved surface of the reflector. When the light source 4/ring lens 6 elements are moved vertically to the lower-most position, there is only light 40' provided; when they are moved vertically to the upper-most position, there is only light 40 provided; and when they are moved vertically to a position between the upper-most and lower-most positions, the light is divided proportially between beams 40 and 40' depending upon the portion of the curvature of reflector 84 which the collimated beam 8 impinges upon.

Figure 81B:
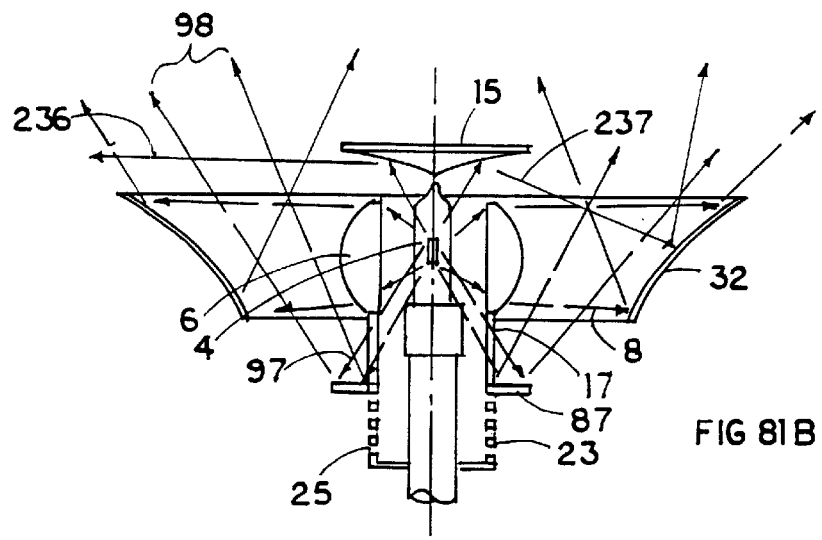
FIG. 81B is across-sectional view of a luminaire similar to the embodiment shown in FIG. 81A, providing further light control using a movable reflector.
Figure 81C:
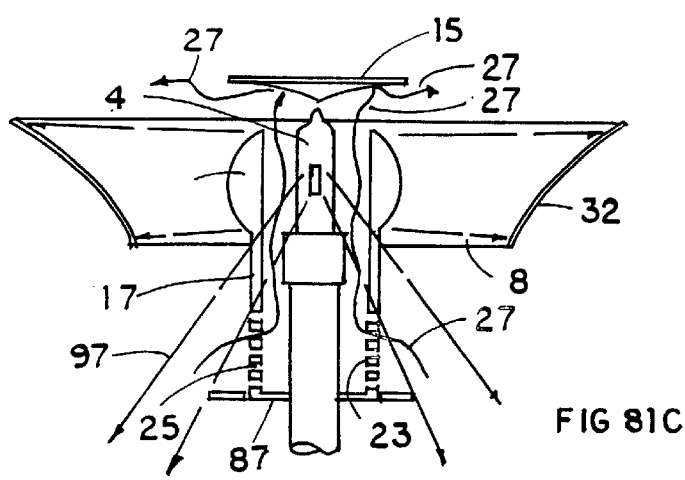
FIG. 81C is a cross-sectional view of the luminaire shown in FIG. 81B in which the movable reflector is in a different position.
Figure 81A:
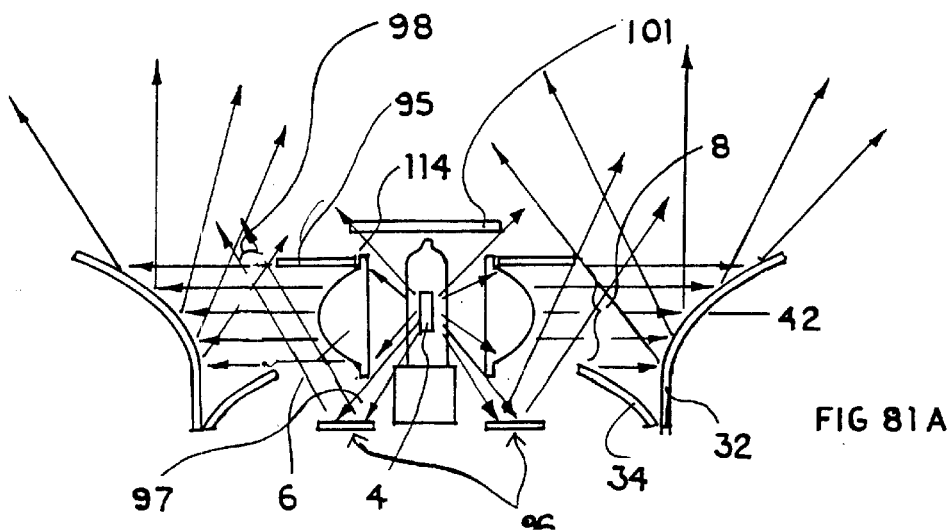
FIG. 81A is a cross-sectional view of a luminaire as shown in FIG. 76A with the addition of optical elements which further control light distribution and resulting diffusion.

FIG. 81A is a cross-sectional view of a luminaire or torchiere as described on FIG. 76A, which includes light source 4, ring lens 6, collimated beam 8, primary reflector 32, and secondary reflector 34. The additional optical elements that increase light control are described as follows: containment ring 95 has a reflective or semi-reflective surface which controls the expansion of radially collimated beam 8 and redirects rays toward reflector 32. The redirection by containment ring 95 of rays diverging from radial axis 42 allows for a shorter reflector 32. Without the containment ring 95 a shorter reflector. 32 would allow these rays to escape upwardly above the top of reflector 32. Tertiary reflector or lower containment ring 96 reflects light rays 97 (rays not collected by ring lens 6) away from the torchiere as reflected beam 98. Light source change cover 101 is shown as a transparent or translucent material allowing light rays 114 to pass through. This cover is temporarily removed from its position to allow the light source to be replaced when required. Light source change cover 101 may also be a heat reflecting mirror or a heat (infrared) filter or an insulator means. This type of function is described in detail in connection with FIG. 83.

FIGS. 81B and 81C show an arrangement similar to that of FIG. 81A where the luminaire or torchiere has a light source 4, ring lens 6, collimated beam 8 primary reflector 32 surrounding the collimating means as well as a movable lower reflector 87 (similar in function to lower reflector 96 of FIG. 81A) shown in its upper-most position in FIG. 81B and its lower-most position in FIG. 81C. This embodiment also has an upper reflector/protector 15 (which may be constructed have parabolic or elliptical sides if desired or constructed as element 101 in FIG. 81A) directly above the light source 4 to reflect light and deflect heat, so that the heat does not travel directly upwardly and to provide protection from the heat of the light source.

The left profile shown is a parabola and the rays 236 reflect above reflector 32. The right profile shown is an ellipse and the rays 237 reflect toward the reflector 32.

There is a transparent (transluscent or diffusing) sleeve 17 below the collimation means. The movable lower reflector 87 reflects the light rays upwardly toward the ceiling. It can be flat or concave or convex. There is a ventilation sleeve 23 having holes 25 which are for example, no larger than 0.063 inches in diameter to meet current Underighter Labs. (U.S.) standards. These may need to be different if the standard changes or if used in another country.

Convective heat may travel into the holes in the sleeve from outside the sleeve and then, when heated by the light source, travel upwardly until deflected by the upper reflector/protector 15, shown having a flat top surface and side which are curved to be elliptical or parabolic and reflect the light away from the vicinity directly above the light source. In FIG. 81C the light rays 97 are not reflected upwardly by reflector 87 and thereofre continue to travel downwardly toward the floor. The convection currents are shown as arrows 27 flowing into holes 25 in sleeve 23 from the outside, upwardly through sleeve 23 and through sleeve 17, between the light source 4 and the collimating ring lens 6 and then deflected by deflector 15 to move laterally so that the area above the light source does not become extremely hot as occurs with certain types of luminare lighting.

Figure 81D:
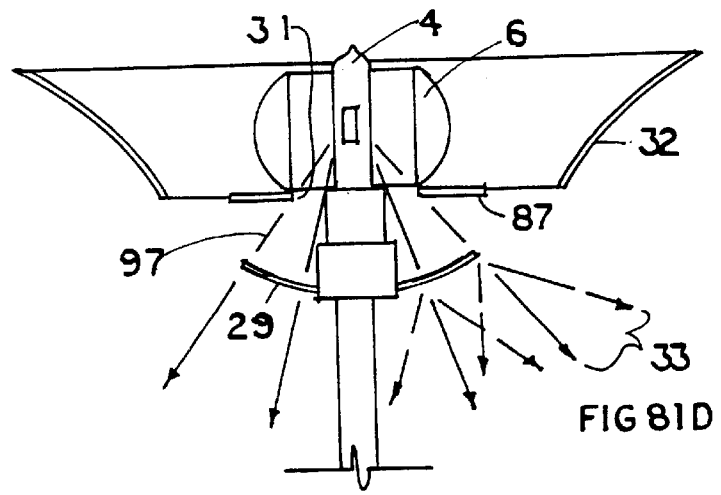
FIG. 81D is a cross-sectional view of a luminarie similar to the embodiment shown in FIGS. 81C and 81D which further includes a curved lower reflector, with the movable reflector in an upper position.
Figure 81E:
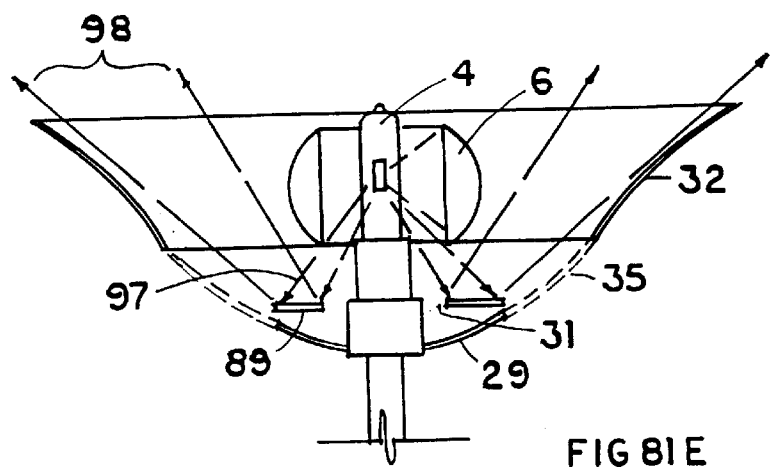
FIG. 81E is a cross-sectional view of the luminaire shown in FIG. 81D with the movable reflector shown in a lower position.

FIGS. 81D and 81E shows a luminarie or torchiere having a movable lower reflector 87 as well as a lower refractor 29. The usual light pattern provides collimated light to the primary reflector 32. However, the light 87 which is directed downwardly from the light source 4 is effected by the structure shown in these figures. In FIG. 81D the light is collimated and reflects upwardly from the curved primary reflector 32 as disclosed in other embodiments of the present invention. However, the light rays 97 which are directed downwardly from the light source 4 passes through the opening 31 in the lower movable reflector ring 87 and impinges upon the curved refractor 29 which distributes the light downwardly and provides diverging rays 33 to spread out the light pattern toward the floor. The lower movable reflector ring or disk 87 may be flat, concave or convex. The curved refractor 29 may be extended as shown in dashed lines 35 to extend all the way to the bottom of the primary reflector 32. It may be transparent, refracting or transluscent.

In FIG. 81E the lower movable reflector is shown in its lower position where it reflects the downwardly directed rays 97 from the light source 4 (and which are shown in the previous figure and impinge upon the refractor). However, in this position this light is prevented from reaching the refractor by the lower, movable ring reflector 87 which reflects the light which emanates from the light source to the reflector, upwardly, as shown at 98, and thereby increases the amount of light provided in the upward direction by this luminarie since use is made of the light which would otherwise be downwardly directed.

FIG. 82A is a diagram illustrating a light source 4 and a ring lens for collimating light, as shown at 91. This FIG. shows various components of a circular torchiere that provide an alternate method of changing the ratio of brightness of illumination projected toward ceiling and floor. The method illustrated in FIGS. 76A and 76B show the secondary reflector 34 shifting along axis 52, intercepting the radially collimated beam 8 while the position of primary reflector 32 remains consistent to radial axis 42. The method illustrated in FIG. 82A is that of both the secondary reflector 34 and the primary reflector 32 (which may be physically attached to each other) shifting simultaneously along central axis 52 and changing their positions in relationship to radial axis 42.

Further illustrated in FIG. 82A are structural elements as well as components required for shifting either secondary reflector 34 or both secondary reflector 34 and primary reflector 32 along central axis 52.

These components and their functions are as follows. There is a collar 115 whose function is to retain and support light source socket 116 and to be a structural hub to ring supports 117. Ring supports 117 are structural supports bridging reflector rings 118 and light source change cover (which may be a disk) 101. Ring supports 117 are made of thin material so as not to form shadows in the radially collimated beam 8. Slider tube 121 is attached to structural supports 122 (which would be constructed of either transparent or translucent material or a thin wire or strut, allowing light reflected off the secondary reflector 34 to pass through unobstructed). Structural supports 122 are themselves attached to either secondary reflector 34 or the combined reflectors 34 and 32. Slider tube 121 may be a compression fit (such as a spring tube) over collar 115, or may be moved by threaded rings or activated by a slot and lever type device. There is a slot 37 in the supports slide.

FIG. 82B is an isometric view of a similar luminarie or torchiere having a light source 4 surrounded by a fixed ring collimating lens 6 (support not shown). Rods 39 which also support a primary reflector 32 which radially surrounds the light source 4. A support tube 41 supports the torchiere as a base and has a pin 43 extending outwardly therefrom. A slider sleeve 45 fits over the base and has an inclined groove 47 into which the pin 43 fits and is slidable. The sleeve 45 may rotate with respect to the base so that when the sleeve is turned, the height of the sleeve on the base changes. The slider sleeve 45 has an expanded ring portion 49 which fits around the bottoms 51 of the rods so that the sleeve can rotate. The base or support tube 41 extends through the sleeve 45 and projects above it and the bottoms of the rods 39 are bent at 53 and shaped to be, entrapped by expanded area 49.

Thus, when the sleeve 45 turns the height of the reflector 32 moves. The rods 39 are sufficiently thin that they do not cast a shadow which effects the light pattern of the torchiere. If desired the sleeve 45 can be directly attached to the reflector 32 to eliminate the support rods 39. In this case the reflector 32 and ring lens 6 can be attached. Another arrangement for eliminating shadows of supports is shown in FIG. 94 and is discussed below.

Alternatively, rods 39 may be attached directly to lens 6 to alter the position of lens 6 in relation to lamp 4, the function of which is further explained in connection with FIGS. 95A, 95B and 95C.

Figure 83:
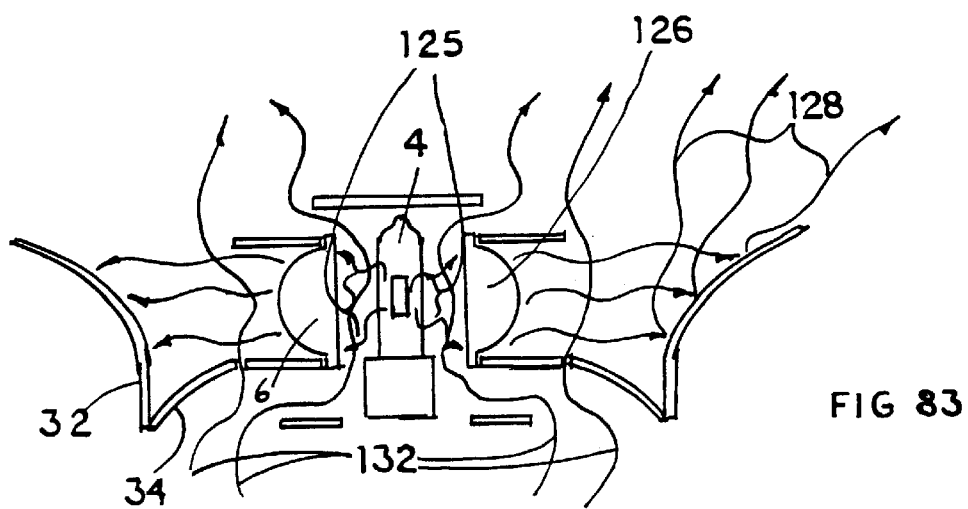
FIG. 83 is a cross-sectional view of a luminaire similar to FIG. 81 illustrating the use of the components to lower the operating temperature of the area surrounding the lamp.

FIG. 83 is a cross-sectional view of a luminaire or torchiere similar to FIG. 81A with the following functional description of the components: Ring lens 6 collects, radially collimates, and projects infrared radiation 125 from the light source 4 as a radially collimated beam of infrared light 126 toward reflector 32, which then reflects the infrared radiation away from the luminarie or torchiere as reflected beam 128. Convective airflow shown graphically as 132 further removes heat away from the luminaire or torchiere. These functions are provided at the same time that the visible light follows its path from source to ring lens 6 which collimates light which is then reflected from reflector 32.

FIG. 84 is a drawing of a torchierre lamp which utilizes the heat reduction functions, light distribution functions and structural elements as described in FIGS. 76 through 86. The function of variable light patterning, variable control of brightness ratios of reflected beams 40 and 40' on floor plane 134 and ceiling plane 136, respectively, allow for varied illuminating usages and lighting applications of the torchiere. The torchierre lamp has a stand 138 and a base 146. Other usages and applications of the heat reduction and light distribution functions include, but are not limited to, table lamps, hanging lamps, desk lamps, and the like.

Figure 85:
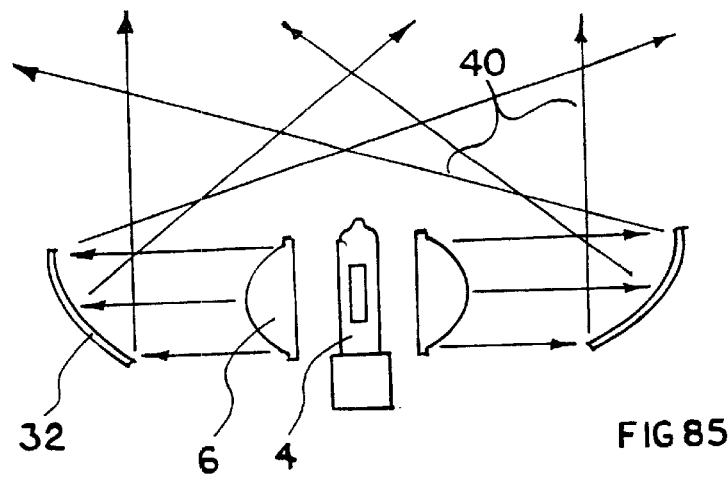
FIG. 85 is a cross-sectional view showing an alternate reflector shape to that shown in FIG. 76A.

FIG. 85 is a view showing an alternate reflector shape to that shown in FIG. 76A. Primary reflector 32 reflects beam 40 over the top of light source 4 at an acute angle in order to form broad distribution on the ceiling above.

Figures 86A, 86B, 86C:
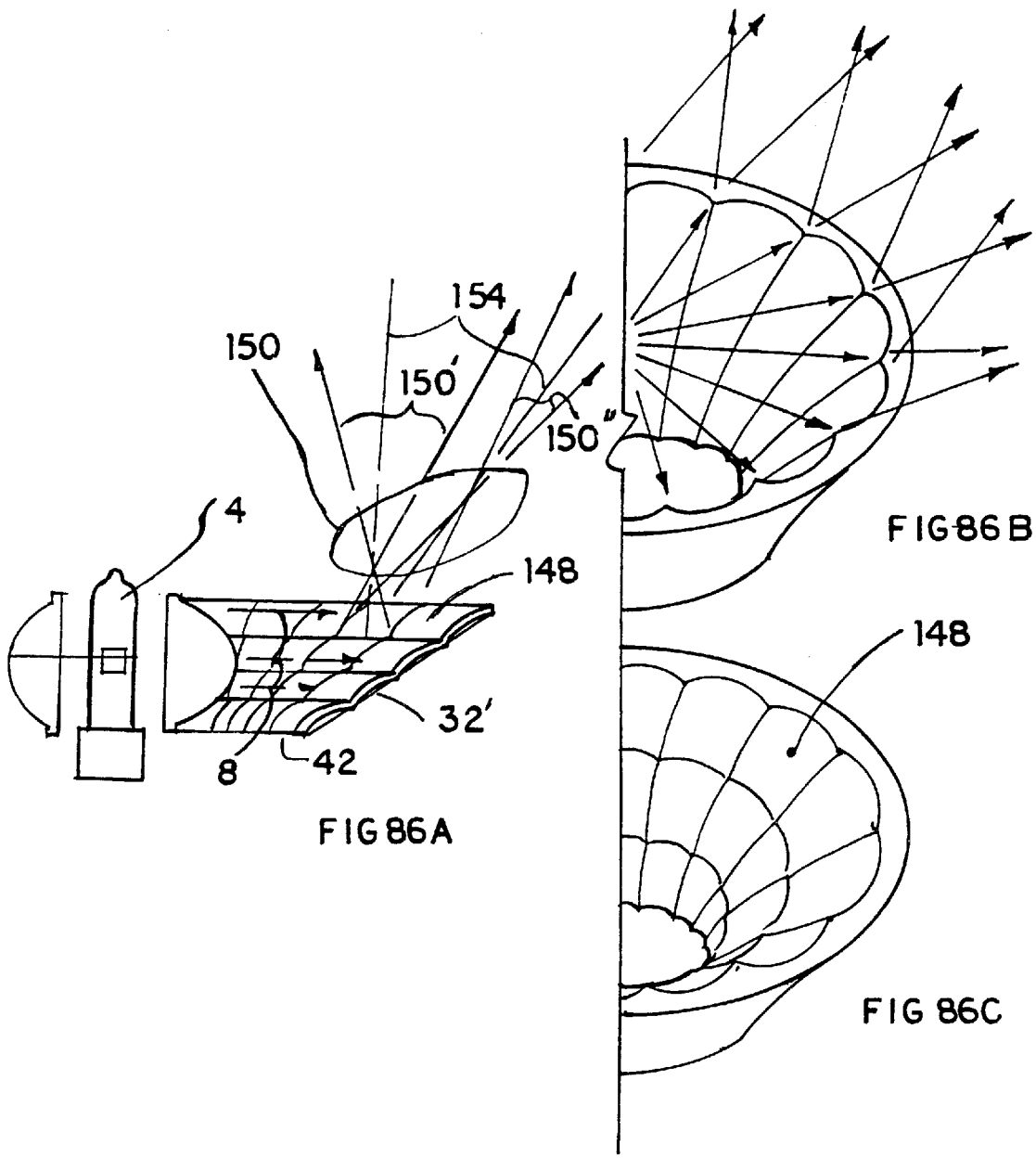
FIG. 86A is a cross-sectional view of a circular luminaire having a primary reflector comprised of geometrically or randomly placed concave or convex surfaces.
FIGS. 86B and 86C are partial isometric views of primary reflectors showing two types of surfacing which may be used with the circular luminaire of FIG. 86A.

FIG. 86A is a cross-sectional view of a circular luminaire or torchiere, the primary reflector 32 (and/or 34 secondary reflector, not shown) which is comprised of geometrically or randomly placed concave or convex surfaces. FIGS. 86B and 86C are partial isometric views of primary reflectors showing two types of surfacing.

FIG. 86A illustrates a radially collimated beam 8 striking the surface of primary reflector 32 which contains an array of compound curved segments 148. Each surface 148 is designed to reflect a portion of radially collimated beam 8 so as to form an integrated pattern of overlapping beam segments 150 on ceiling, floor, or walls. An example of the light distribution of a reflection of beam segment 150 is represented by rays 154 which are asymmetrically expanding as they travel away from reflector 32' on a radial axis 42. Rays 150' and 150" represent the concentric expansion of rays 150 with rays 150' representing the angle of radial expansion and 150" representing the angle of horizonntal distribution.

Figure 87:
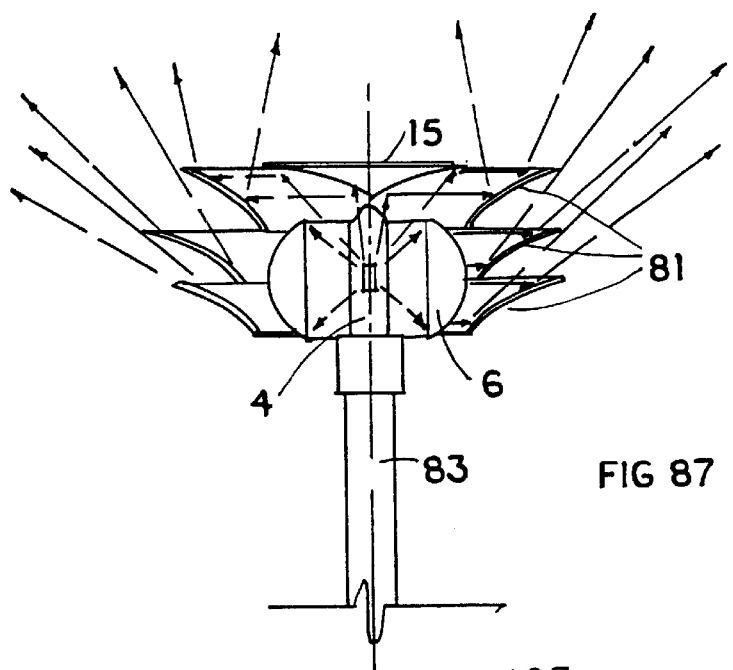
FIG. 87 is a cross-sectional view of a luminaire showing the reflector in the form of spaced slats and an upper reflector above the light source.

FIG. 87 is another type of luminaire or torchiere in which the primary reflector is formed of multiple reflecting louvres 81 which surround the light source 4 and the collimation means 6, and has a protective reflector/deflector 15 which may be made of insulating material. The torchiere is mounted on a stand 83 (partially shown) and all the light is reflected upwardly as shown.

Figure 88:
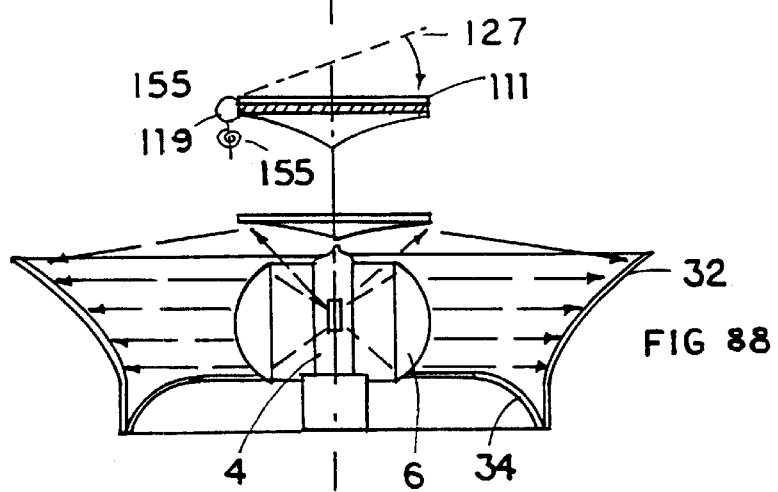
FIG. 88 is a cross-sectional view of a luminarie showing two reflectors and an upper reflector above the light source.

FIG. 88 is a luminarie or torchiere similar to that of FIG. 87 with the primary reflector 32 being curved and having a curved secondary reflector 34. The protective reflector/deflector 15 can be parabolic or an elliptical reflector ring. As another feature it may be insulated on top and/or allow air to pass therethrough between the topmost surface or element 111 and one of the under surfaces, or could be made of a porus materal. The device can be hinged at 119 and spring loaded toward the closed position with spring 155 so that it can be moved out of position as shown in dashed lines 127 when the light source 4 is to be replaced, and it will return to its proper position after the light source is changed.

The embodiments of FIGS. 81A, 81B, 81C, 83, 87 and 88, all have structure above the light source which assists in preventing all of the heat from the light source from going directly upwardly, but rather the structure diverts the heat. Those arrangements which provide insulation means thereby provide a safer lighting arrangement since the high temperatures usually appearing directly above the light source do not exist in these embodiments. The insulation drastically reduces the heat directly above the light source on the other side of the insulating means from the light source. It has been found that an opaque insulator is best for this purpose. Various arrangements of insulating means may be used. For example, it has been found that two pieces of 0.022" thick shiny aluminum with an air space between them, will provide sufficient insulation that immediately above the upper sheet of aluminum the temperature will be as low as 150 degrees F. after continuously using a halogen light. This is far below the temperature required for fire safety purposes.

Another arrangement is an upper layer of insulating material and a lower element slightly spaced therefrom and formed into a shape with a flat top and sides which are ellipsoid or paraboloid as shown and described in connection with FIGS. 81B and 81C. FIG. 88 shows a structure in which the insulating means is hinged and constantly biased into closed position so that the safety feature should always be provided.

The present invention provides means for directing the light from the light source outwardly radially, and is thereafter used to provide upward lighting onto the ceiling including directly above the light source. Therefore, it is possible to provide a heat barrier (which may also be a light barrier) directly above the light source without adversely effecting the lighting above the light source.

Figure 89A:
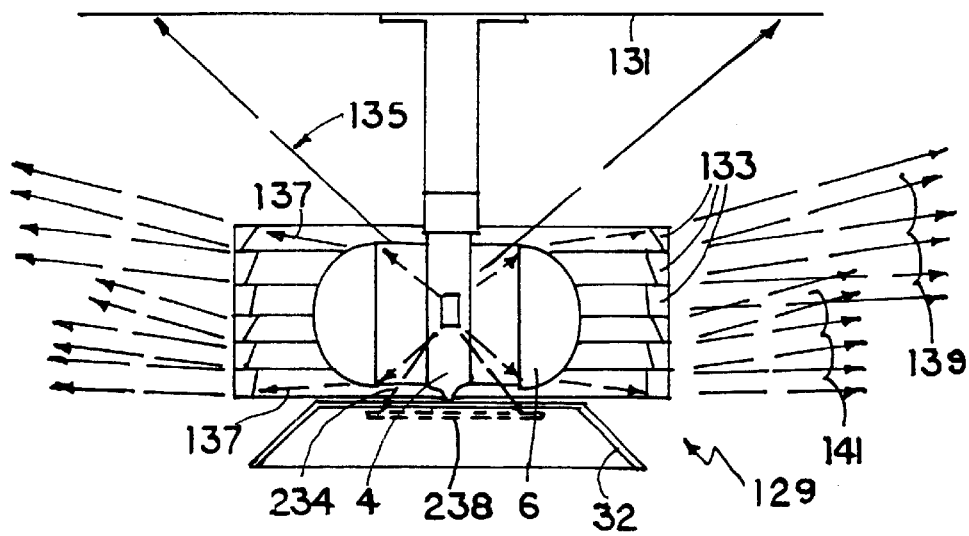
FIG. 89A is a cross-sectional view of a radialy directed lighting arrangement depending from a ceiling and having outer refracting surfaces with a reflector shown in its lower position.
Figure 89B:
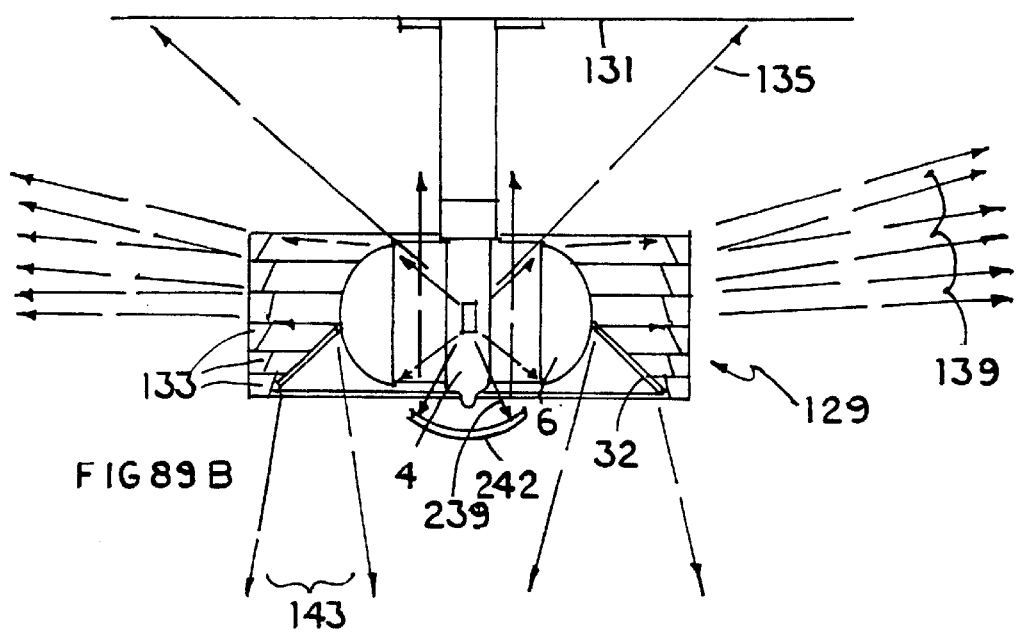
FIG. 89B is a cross-sectional view of the arrangement shown in FIG. 89A with the reflector shown in a higher position.

FIGS. 89A and 89B show a light 129 suspended from an architectural surface 131 such as a ceiling. There is a light source 4 surrounded by colimating means 6 directing the light 137 primarily radially to surrounding wedge prism rings 133 of various types which provides light ray patterns as shown at 139 and 141. There can be duplicate sets of rings 133 to provide duplicate sets of ray patterns and the light patterns are minimally effected when radially colimated light is intercepted by the reflector. The rings 133 can be part of a system of interchangeable rings, and the rings themselves may be rectilinial or polyhedral or oval rather than round.

The wedge prism rings 133 can be of differing refractive angles and may be assembled to be interchangeable. Light rays from the light source 4 which impinge upon the ring lens are collimated; however, the light rays from the source which are directed upwardly as shown at 135 above the ring lens, or downwardly below the ring lens are not collimated. Such upwardly directed rays are shown at 135 and may be used as indirect lighting or to infill holes in light patterns formed by rays 139, and downlight reflector 32 is shown in its lower position in FIG. 89A, where it will have little effect upon the light from the light source 4. However, when the downlight reflector 32 is moved upwardly as shown in FIG. 89B, the collimated light (and the imperfectly collimated light as well as the light which goes directly downwardly without being collimated) is reflected downwardly as shown at 143.

As shown in FIG. 89B there may be a spherical reflector (4 at focal point) rays 239 are collimated and projected up through the hole in the ring lens. There is a light control element 238 which would absorb the light or refract it (referring to the downward rays 239).

As shown in FIGS. 89C and 89D each sequential ring 145 has a different wedge angle 147 selected to spread the rays 149 in a predetermined angle toward the ceiling on which the system is mounted. The reflector 32 (shown as conical in this FIG.) is shown in the raised position in FIG. 89D in which it intercepts radially collimated light from the ring collimator 6 and reflects it downwardly in a downlight pattern 151 and the reflector 32 may be set in any position between the raised and lower postitions. The baffle rings 153 control glare by intercepting non-collimated light and to prevent observers from looking into the light source 4 by reducing the view angles.

The reflector 32 in the lowered position shown in FIG. 89C allows radially collimated light to project to the prism rings 145. The reflector 32 may be deep enough to accept all the radially collimated light and reflect it downwardly. The reflector 32 may be constructed to be sufficiently deep that in its uppermost position it intercepts all of the radially collimated light and reflects it downwardly.

Figure 89E:
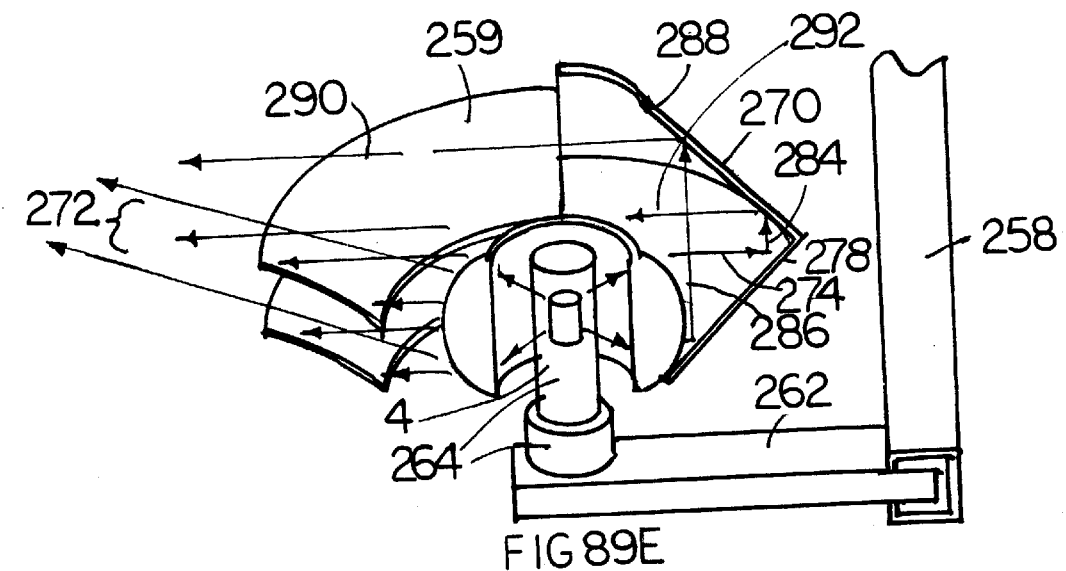
FIG. 89E is an isometric view similar to FIGS. 89B and 89C, showing a track mounted arrangement.
Figure 89F:
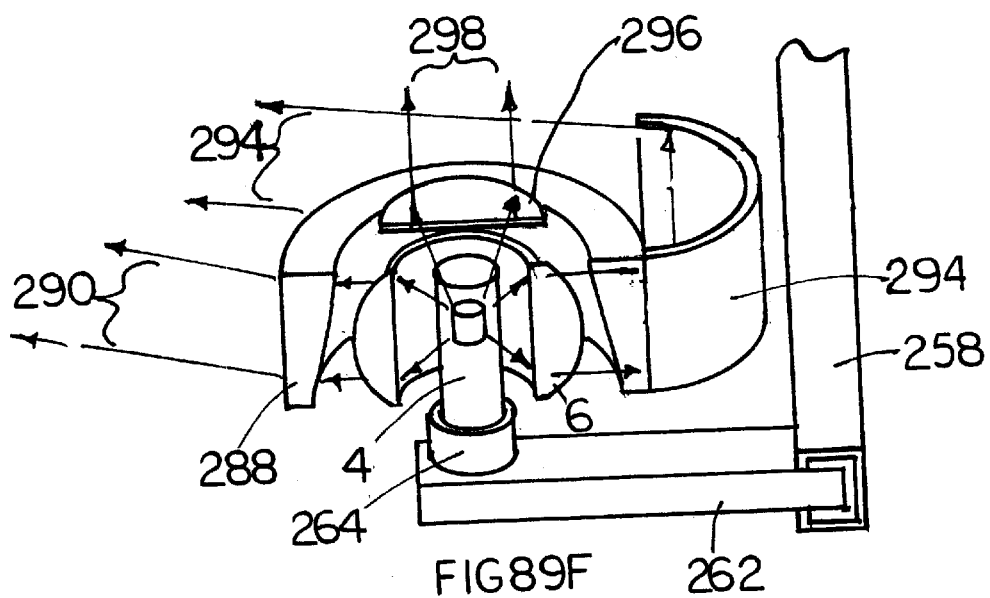
FIG. 89F is an isometric view similar to FIGS. 89A and 89B, showing a track mounted arrangement.

FIGS. 89E and 89F show somewhat similar lighting arrangements adapted to be used in the form of track lighting to provide track mounted indirect ring fixtures, the use of which is shown in a room in FIG. 96 and described below. In FIG. 89E there is a light source 4, which can be a lamp halogen or high intensity discharge (HID) and a collimating means 6 directing light radially. There are radially disposed reflector rings 256 having a curvature to evenly distribute light toward the ceiling. This arrangment is shown with the track 258 mounted onto the wall. There is a support 262 having an electical system for providing power to the lighting source and which mounts the lamp socket 264 and the arrangement to the track which in turn is mounted to the wall. The light from the light souce 4 passes through the collimating means 4 and is directed radially to the reflector rings 256 as shown as 272. On the track side of the light source there is a beam reversing reflector 270 which receives radially collimated light 274 and 276 from the top and bottom (as well as at other locations), respectively, of lens 6 and reflects it upwardly, as at 284 and 286, respectively, from the reflector's lower section 278, from where it is reflected from the reflector's upper section 288, as at 290 and 292, respectively, and thereby reverses the beam direction over the ring lens assembly, i.e., the light which is reflected has a path above the lens 6.

In FIG. 89F there is a similar light source 4 and a collimating means 6 directing light radially. There is a radial wedge shaped refractor 288 receiving the collimated light 322 which bends it slight upwardly as shown at 290. There is a beam reversing, reflector 292 which receives radially collimated light that has been directed an an acute angle towards the ceiling due to wedge shaped refractor 288, and reflects the beam 294 to pass behind the collimating means 6 and the wedge refractor 288 as shown in FIG. 89F. While not shown, there is a similar beam to beam 294 which passes in front of the collimating means 6 and the wedge refractor 288 as shown in FIG. 89F. Both reflectors 270 (FIG. 89E) and 292 (FIG. 89F) may be used in conjunction with refractors, and be used alternately with reflectors 256 and refractors 288. One half of the reflector 292 is shown; the other half is not shown, but is the same, thereby forming a wing-like structure which provides the beam 294 which passes in front of the collimating means 6 and the wedge refractor 288 in FIG. 89F. The light rays 292 are shown by upper and lower arrows representing rays in the upper and lower portions of beam 292. Both of these are reflected, the upper one being designated 324 (the lower one not being shown) and 324 being reflected to form the beam 294.

There is an optical window or refractor 296 shown above the light source and which receives non-collimated light from the top of the light source to infill light on the architectural surface above the fixture that does not recieve light from theradially disposed optics as shown at 298.

FIGS. 90A and 90B show reflectors 156 and 157 with negative 158 and positive 164 fluting, respectively. The negative fluting 158 creates converging and then diverging reflected rays 165 (converging until the focal point, and then diverging rays). The positive fluting 164 creates diverging reflected rays 166. The central axis of radial collimation is shown as 167 in FIG. 90B. Each central angle of radial collimation 168 along the axis of radial collimation is reflected by specular flutes resulting in equal converging or diverging beam patterns. For example, the two set of rays shown as part of rays 166.

FIGS. 90C and 90D show reflectors 169 and 171 with serially concave 173 and serially convex 174 fluting, respectively. The angle of reflection incline 175 determines the general angle of beam spread. These can be used as fixed reflectors when used with radially collimated light, and may be used with radially collimated light to produce down light patterns.

It is desired to have reflections with a consistent beam pattern as the reflector moves. Fluting does this since it creates a wide beam and fluting remains consistent along angle 175. The constant angle of reflector walls helps with consistency. This is a modification of the conical reflector.

All of the reflectors of FIG. 90 may be used with radially collimated light to produce shown light patterns.

Figure 91A:
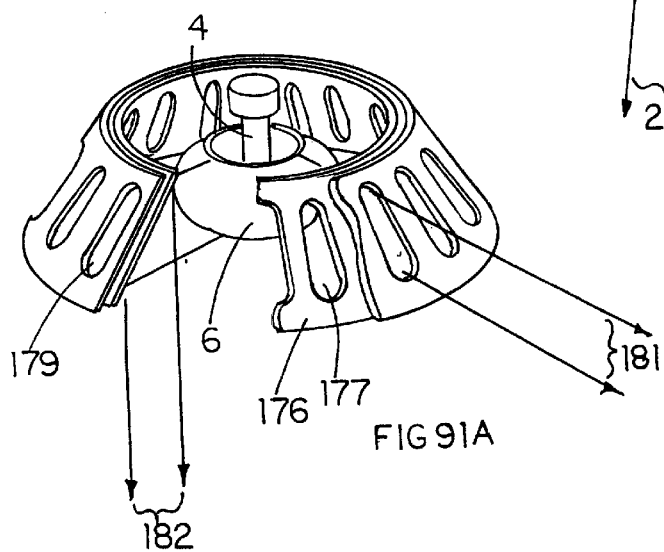
FIG. 91A is a broken isometric view of a double reflector with slots.

FIG. 91A is a double reflector with slots. It has a light source 4 and a collimation means 6. A portion is shown broken away for clarity so that the internal structure may be seen. The reflectors 176 (inner) and 177 (outer) are movable with respect to one another so that one may be fixed, or both may be movable circumferentially. There are slots 178 in the inner ring reflector 176 and slots 179 in the outer ring reflector 177, the slots 178 and 179 being of equal dimension but the places between adjacent slots are solid and are at least as wide as the slots so that the light projecting radially can be blocked completely in one position of the rings with respect to one another. As relative movement takes place the slots 178 and 179 will become aligned at which point the maximum amount of light will project radially as shown at 181 and the remainder be reflected downwardly as shown as 182. As the slots become misaligned, less and less light is projected radially through the reflector until a point is reached where the radial light is blocked completely and all the light is reflected downwardly.

As an example the outer ring 177 may rotated around the inner ring 176, both ring reflectors being conical with specular inner surfaces and little space between the rings. The rays reflected by the inner ring or the combined inner and outer conical reflectors are shown. The amount of light reflected depends on the degree of alignment between the inner and outer reflectors.

Figure 91B:
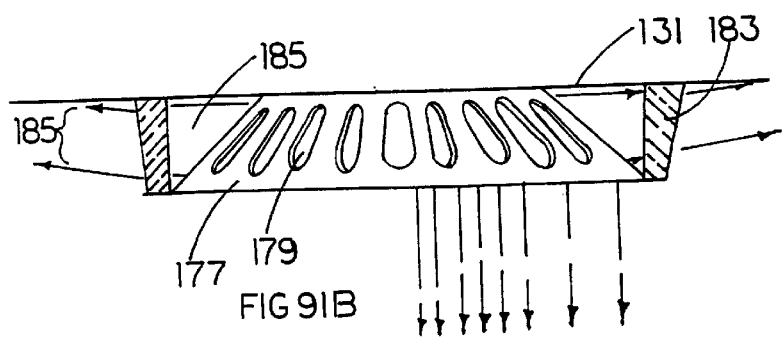
FIG. 91B is a broken isometric view of a double reflector with slots and a ring wedge prism.

FIG. 91B is similar to the arrangement of FIG. 91A but has a ring wedge prism 183 which surroungs the ring reflectors (only the outer one 177 is visible in this FIG.) which directs the portion of light allowed to pass through the slots 179 to be directed toward the architectural surface 131 on which the lighting device is mounted. The drawing shows light 185 passing through the slots to the prism, light 186 passing through the prism, and light 187 being reflected downwardly from the inside surface of the inner reflector, this being from the light reflected from the solid portions of the reflectors.

The device may be stem mounted so that ring 185 does not have to be mounted to the surface as shown in FIGS. 89A and 89B.

FIG. 92A is a broken isometric view of a double elongated reflector, having an upper reflector 188 and a lower reflector 189, each with slots 190 and 191, respectively, and arranged for longitudinal movement. Portions are broken away for clarity. There are two closely concentric cylindrical reflectors 188 and 189 which may be made of punched metal or reflective film, for example, or transparent or translucent material. There is an elongated linear discharge material light tube 192, such as a flourescent lamp, as the elongated light source. This system provides a variable amount of light both direct and indirect from a flourescent tube light source. One or both reflectors 188 and 189 may be movable so that the circumferential slots 190 and 191 can be aligned or misaligned or somewhere between these positions. Movement can be along the light axis. Light is reflected from the solid portions of the reflecors upwardly as shown at 193, and light which passes through the aligned or partially aligned slots passes downwardly as shown at 194.

FIG. 92B is an isometric view of a double elongated reflector, having an upper reflector 195 and a lower reflector 196 each with sslots 197 and 198, respectively, and arranged for circumferential movement. In this arrangement, which is similar to that of FIG. 92A, the slots 197 and 198 are arranged along the longitudinal axis and movement of one or both reflectors is circumferential so as to gradually align or misalign the slots and thereby change the amount of light which passes through the slots and is not reflected. The light which does not pass through the slots is reflected upwardly as shown at 199 and the light which passes through the slots is directed downwardly as shown at 206.

FIG. 92C is an isometric view or a double elongated reflector, having an upper reflector 207 and a lower reflector 208, each with holes 209 and 211, respectively, and which may be arranged to move longitudinally and/or radially. This arrangement is similar to those of FIGS. 92A and 92B, but has holes rather than slots. Since there are holes, the relative movement between the two reflectors can move longitudinally and/or circumferentially to align and misalign the holes. The light which does not pass through the holes is reflected upwardly as shown at 213 and the light which passes through the holes is directed downwardly as shown at 215.

Figure 93:
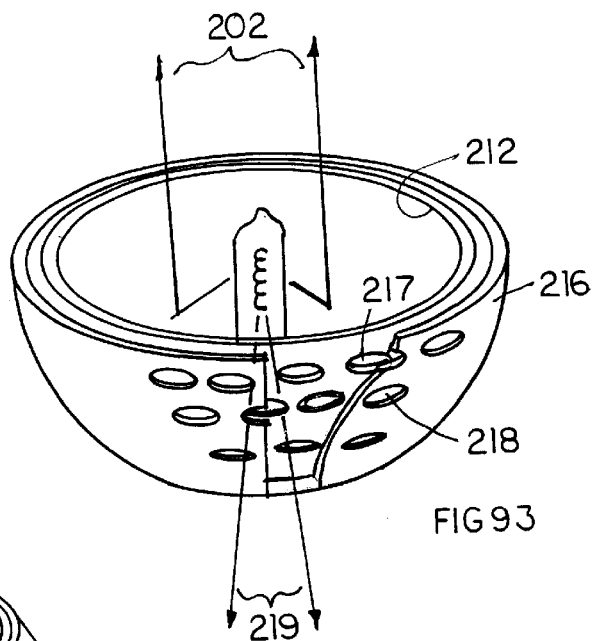
FIG. 93 is an isometric view of a bowl-shaped double reflector with holes.

FIG. 93 is an isometric view of a bowl-shaped double reflector, having an upper reflector 212 and a lower reflector 216, each with holes 217 and 218, respectively. This arrangment is somewhat similar to those of FIG. 92. The double reflector, which is generally bowl-shaped, has holes 217 and 218 which can be aligned or misaligned or can take an infinite number of positions between the two. The inner and outer bowl reflectors 212 and 216 may rotate concentrically about one another. When the holes 217 and 218 are aligned light 219 can pass downwardly through them. When they are entirely misaligned all the light is reflected upwardly from the bowl-reflectors as shown at 220. The holes may be round or can be of a decorative pattern. If the bottoms of the bowl-reflectors are solid then no light will be projected downwardly when the holes are entirely misaligned. However, if the bottoms of the bowl-reflectors are open, then a certain amount of light will always be directed downwardly.

FIG. 94 is an isometric view showing one manner of connecting the reflector with other structure without producing shadows from the support structure. This type of feature is also available with the embodiment shown in FIG. 82B. This arrangement has a light source and means for radially collimated the light therefrom. There are ring-like upper and lower plates 225 and 226, respectively, at the top and bottom, which act as supports for the lens ring, respectively, to reflect and/or block any light which escapes the collimation means or is imperfectly collimated. In this example, a certain type of reflector 221 is shown being used, but the principle can be used in any of the arrangements disclosed in this specification. The plates 225 and 226 are connected by inclined wires 222. Other connecting wires 223 connect the plates to the reflector 221. The latter wires 223 are arranged so they are not radial with respect to the light source and collimation means so as to reduce or eliminate shadows from the wires. Thus the wires and the wire assembly are always at an angle (as it transverses) to the radially collimated light or reflected light, so as not to cause a visable shadow in the light pattern formed by rays 224 as it appears on the surface it illuminates. The radially collimated light is shown at 227 and the reflected light forms the rays 224. This principle can be used in connection with other arrangements such as the one shown in FIG. 82A. This arrangement of wire supports may be used in embodiments such as those shown in FIGS. 89A and 89B.

FIGS. 95A, 95B and 95C are diagrammatic views of three different positions of the arc or filament of a light source 228 with respect to collimating means 229 in an arrangement wherein they are movable with respect to one another along a central axis. The arc or filament of the light source may be shifted on the central axis 230. The direction of the radially collimated light is shifted in the opposite direction as shown in these figures. In FIG. 95A the arc is in the upper position and the light travels downwardly as shown at 231, in FIG. 95B the arc is in the lower position and the light travels upwardly as shown at 232 and in FIG. 95C the arc is in a central position and the light travels horizontally.

Track mounted lighting can be used with many of the embodiments of the present invention. These can be as shown in FIGS. 89E and 89F and spaced as to provide evenly overlapping patterns of illumination.

At the left and on the ceiling there is another set of track mounted lighting 314 which is the same as shown at the right that is the same illumination but with the fixtures mounted vertically to provide lighting onto the ceiling towards the adjacaent wall shown at 316 and also along the length of the wall as shown at 318.

The above teachings will enable those skilled in the art to make many modifications in the specific teachings above to provide many forms of systems for distributing and shaping light in accordance with the present invention.

It will now be apparent to those skilled in the art that other embodiments, improvements, details and uses can be made consistent with the letter and spirit of the foregoing disclosure and within the scope of this patent, which is limited only by the following claims, construed in accordance with the patent law, including the doctrine of equivalents.

What is claimed is:

1. Light distribution means for distributing and shaping light from a quasi point source comprising:
   radial collimation optics surrounding a quasi point light source around an axis;
   light direction changing means shaped to receive light from said radial collimation optics and direct it in generally one direction along said axis; and
   means for moving (1) said quasi point light source means and said radial collimation optics and (2) said light direction changing means with respect to one another along the axis for changing the direction or shape of the light which is directed by said light direction changing means.

2. Light distribution means as defined in claim 1 wherein said light direction changing means includes primary light direction changing means shaped to receive light from said radial collimation optics and direct it in one general direction along said axis, and secondary light direction changing means shaped to receive light from said radial collimation optics and direct it generally in the opposite direction along said axis, only one of said primary and secondary light changing means being movable with respect to the light source.

3. Light distribution means as defined in claim 2 wherein said moving means allows movement of said secondary light direction changing means with respect to said primary light direction changing means for changing the amount of light which is directed by said primary light direction changing means and said secondary light direction changing means with respect to each other.

4. Light distribution means as defined in claim 3 wherein at least one of said primary light direction changing means and said secondary light direction changing means is a shaped reflector.

5. Light distribution means as defined in claim 3 wherein at least one of said primary light direction changing means and said secondary light direction changing means is a refractor.

6. Light distribution means as defined in claim 4 wherein the shaped reflector is conical.

7. Light distribution means as defined in claim 4 wherein the shaped reflector is fluted.

8. Light distribution means as defined in claim 7 wherein shaped reflector is conical.

9. Light distribution means as defined in claim 4 wherein said primary light direction changing means is a primary reflector and said secondary light direction changing means is a secondary reflector, said secondary reflector has cut-out segments and being disposed between the light source and the primary reflector, said secondary reflector being rotatable with respect to said radial collimation optics whereby the light from the collimation optics to said primary reflector may be continuously adjusted from being completely blocked to being completely open.

10. Light distribution means as defined in claim 9 wherein said radial collimation optics is formed in segments having the same angular spacing as said secondary reflector segments.

11. Light distribution means as defined in claim 1 wherein said light direction changing means includes primary light direction changing means shaped to receive light from said radial collimation optics and direct it in one general direction along said axis and at the same time allow a portion of such light to pass therethrough, and secondary light direction changing means shaped to receive light from said radial collimation optics and direct it generally in the same direction along said axis and, at the same time allow a portion of such light to pass therethrough, said primary and secondary light direction changing means having cut-outs and being movable so as to continuously change the amount of light passing therethrough, whereby when the cut-outs are partially aligned some light passes therethrough and is not reflected.

12. Light distribution means as defined in claim 1 wherein said light direction changing means is a reflector having at least two different curvatures.

13. Light distribution means as defined in claim 1 wherein said light direction changing means includes primary light direction changing means shaped to receive light from said radial collimation optics and direct it in one general direction along said axis, and secondary light direction changing means shaped to receive light from said radial collimation optics and direct it generally in the opposite direction along said axis, both of said primary and secondary light changing means being movable with respect to the light source.

14. Light distribution means as defined in claim 1 wherein said light direction changing means includes primary light direction changing means shaped to receive light from said radial collimation optics and direct it in one general direction along said axis, and secondary light direction changing means shaped to receive light from said radial collimation optics and direct it generally in the opposite direction along said axis, whereby movement of said light source with respect thereto continuously changes the relative amounts of tight reflected in said one general direction and said opposite direction.

15. Light distribution means as defined in claim 3 wherein the light source is a high intensity light source, and further comprising insulating means directly above the source for providing a cooler volume in the vicinity directly above the light source.

16. Light distribution means as defined in claim 15 wherein said insulating means has lower portions which are shaped to direct the heat away therefrom.

17. Light distribution means as defined in claim 16 further comprising a sleeve below the light source, said sleeve having openings therein to allow cool air into the vicinity of the light source.

18. Light distribution means as defined in claim 15, wherein said secondary light direction changing means is a reflector which is movable and arranged so that when in the lower position thereof it reflects light from the light source which has not passed through the collimating optics.

19. Light distribution means as defined in claim 18 further comprising a lower refractor below the lowest position of said secondary light direction changing means and positioned to receive and refract any light which passes said secondary light direction changing means without being reflected.

20. Light distribution means as defined in claim 1 wherein said light direction changing means is a reflector arranged to reflect light above the light source and collimating optics.

21. Light distribution means as defined in claim 1 wherein said light direction changing means is a reflector including an array of sections with each section being formed of curved surfaces.

22. Light distribution means as defined in claim 1 wherein said light direction changing means is a reflector including a plurality of reflecting louvers.

23. Light distribution means as defined in claim 3 where said primary light direction changing means includes refraction means, and said secondary light direction changing means includes a reflector.

24. Light distribution means as defined in claim 23 wherein said refraction means includes a plurality of wedge prism rings.

25. Light distribution means as defined in claim 24 wherein said primary light direction changing means further includes baffle rings between the wedge prism rings for controlling glare and to prevent observers from looking directly into the light source by reducing the view angles.

26. Light distribution means as defined in claim 23 wherein said means is connected in a track lighting arrangement.

27. Light distribution means for distributing and shaping light from a quasi point source comprising:
   quasi point source light means;
   collimation means surrounding said quasi point source light means around an axis for providing radially collimated light;
   primary reflector or refractor means shaped to receive light from said radial collimation optics and direct it in one general direction along said axis; and
   secondary reflector or refractor means shaped to receive light from said radial collimation optics and direct it in a desired direction.

28. Light distribution means as defined in claim 27 further comprising elongate support members for supporting at least some of the structure of at least one of said collimation means, primary reflector or refractor means and said secondary reflector or refractor means, said elongate support members being unaligned radially and axially with respect to the light source means and the collimation means.

29. Light distribution means as defined in claim 27 wherein said secondary reflector or refractor means directs light from the radial collimation optics in the opposite general direction to the light directed by said primary reflector or refractor means along said axis.

30. Light distribution means as defined in claim 27 wherein said secondary reflector or refractor means directs light from said radial collimation optics in the same general direction as the light directed by said primary reflector or refractor means along said axis.

31. Light distribution means as defined in claim 27 further comprising means for moving said secondary reflector or refractor means with respect to said primary reflector or refractor means for changing the amount of light which is reflected or refracted by each said reflector or refractor means with respect to each other.

32. Light distribution means for distributing and shaping light from a quasi-point light source, comprising:
   quasi-point light source means;
   collimation means surrounding said light source means for providing radially collimated light from the source means; and
   at least one reflector or refractor means surrounding said collimation means for directing the light in a diverging pattern and predetermined direction and broad distribution of the light.

33. Light distribution means as defined in claim 32, further comprising elongate support members for supporting at least some of the structure of at least one of said collimation means and reflector or refractor means, said elongate support members being unaligned radially and axially with respect to the light source means and the collimation means.

34. Light distribution means as defined in claim 32, wherein said light source means is a high intensity light source, said reflector or refractor means being a reflector means for directing light received from the collimation means upwardly, and further comprising insulating means directly above the light source means for providing a cooler environment in the vicinity directly above the light source.

35. Light distribution means as defined in claim 34, wherein said insulating means is movably connected in position so that it can be moved to allow the light source to be replaced.

36. Light distribution means as defined in claim 35, wherein the movably connected insulating, means is constantly biased into closed position.

37. Light distribution means for distributing and shaping light from a light source comprising:
   primary reflector means shaped to receive light from a light source and direct a portion of it in one general direction to provide usable light while allowing the remaining portion to pass therethrough; and
   secondary reflector means positioned and shaped to receive any light which the primary reflector allows to pass through and direct a portion of it in the one general direction to provide further usable light while allowing the remaining portion to pass therethrough and to provide further usable light.

38. Light distribution means as defined in claim 37 wherein said reflector means have holes therein which allows light to pass therethrough.

39. Light distribution means as defined in claim 38 wherein said primary reflector means and said secondary reflector means may be moved with respect to one another whereby the alignment of said holes may be selectively varied to vary the amount of light passing therethrough.

40. Light distribution means as defined in claim 38 wherein said primary reflector means and/or said secondary reflector means are frusto-conical, or bowl, or frusto-cylindrical in shape.

41. Light distribution means as defined in claim 40 wherein both the light source and the primary reflector means and/or said secondary reflector means are elongate in the same direction.

42. Light distribution means as defined in claim 40 further comprising collimating means for surrounding the light source and providing radially collimated light to said primary reflector means.

43. Light distribution means as defined on claim 42 further comprising refracting means surrounding said reflector means.

44. Light distribution means defined in claim 11 further comparing a refractor surrounding said reflectors radially and positioned to recieve light which passes through said cut-outs.

45. Light distribution means, comprising:
quasi-point light source; and
a radial collimating ring lens surrounding said light source about an axis, said light source and said collimating ring lens being constructed and arranged to be movable with respect to one another in the direction of the axis.

* * * * *